(12) United States Patent
Iwaki et al.

(10) Patent No.: US 12,000,467 B2
(45) Date of Patent: Jun. 4, 2024

(54) STEPLESS SPEED CHANGE STRUCTURE

(71) Applicant: Kanzaki Kokyukoki Mfg. Co., Ltd., Amagasaki (JP)

(72) Inventors: Koji Iwaki, Amagasaki (JP); Tomoyuki Tsuji, Amagasaki (JP)

(73) Assignee: Kanzaki Kokyukoki Mfg. Co., LTD, Amagasaki (JP)

( * ) Notice: Subject to any disclaimer, the term of this patent is extended or adjusted under 35 U.S.C. 154(b) by 0 days.

(21) Appl. No.: 17/819,136

(22) Filed: Aug. 11, 2022

(65) Prior Publication Data

US 2023/0049519 A1 Feb. 16, 2023

(30) Foreign Application Priority Data

Aug. 12, 2021 (JP) ................. 2021-131663
Oct. 29, 2021 (JP) ................. 2021-177068

(51) Int. Cl.
| | |
|---|---|
| *F16H 61/423* | (2010.01) |
| *F16H 39/14* | (2006.01) |
| *F16H 47/04* | (2006.01) |
| *F16H 61/4008* | (2010.01) |
| *F16H 61/425* | (2010.01) |
| *F16H 61/433* | (2010.01) |
| *F16H 61/435* | (2010.01) |

(52) U.S. Cl.
CPC ............ *F16H 47/04* (2013.01); *F16H 39/14* (2013.01); *F16H 61/4008* (2013.01); *F16H 61/423* (2013.01); *F16H 61/425* (2013.01); *F16H 61/433* (2013.01); *F16H 61/435* (2013.01)

(58) Field of Classification Search
CPC .... F16H 61/423; F16H 61/425; F16H 61/433; F16H 61/435; F16H 61/421; F16H 61/431

See application file for complete search history.

(56) References Cited

U.S. PATENT DOCUMENTS 5,160,245 A * 11/1992 Geringer ............... F04B 49/002
91/506
5,678,463 A * 10/1997 Brambilla ............... F16H 47/02
74/731.1

(Continued)

FOREIGN PATENT DOCUMENTS

JP 3161907 B2 4/2001
JP 2002-283870 A 10/2002

*Primary Examiner* — Thomas E Lazo
(74) *Attorney, Agent, or Firm* — Sterne, Kessler, Goldstein & Fox P.L.L.C.

(57) ABSTRACT

A pump operation piston biased by a neutral spring mechanism and a larger volume operation spring biased by a larger volume operation spring in a larger volume direction operatively move pump and motor volume adjusting members, respectively, is provided. A first pressure control valve commonly controls supply-discharge of pressure oil that presses the pump operation piston in a first slide direction and the motor operation piston in a smaller volume direction. A second pressure control valve controls supply-discharge of pressure oil that presses the pump operation piston in a second slide direction. Biasing forces of the neutral spring mechanism and the larger volume operation spring are so set that, after the pump operation piston is moved in the first slide direction by a predetermined distance, the motor operation piston starts moving.

11 Claims, 30 Drawing Sheets

(56) References Cited

U.S. PATENT DOCUMENTS

| | | | |
|---|---|---|---|
| 6,202,016 B1* | 3/2001 | Stephenson | F16H 61/478 701/64 |
| 2008/0155980 A1* | 7/2008 | Sakata | F16D 31/02 60/433 |

* cited by examiner

STEPLESS SPEED CHANGE STRUCTURE

CROSS-REFERENCE TO RELATED APPLICATIONS

This application claims priority to Japanese Patent Application No. 2021-131663, filed Aug. 12, 2021, and Japanese Patent Application No. 2021-177068, filed Oct. 29, 2022, which are hereby incorporated by reference herein in their entireties.

TECHNICAL FIELD

The present invention relates to a stepless speed change structure including a hydrostatic transmission (HST) that has a variable displacement type hydraulic pump and a variable displacement type hydraulic motor.

BACKGROUND ART

Conventionally, there is proposed a stepless speed change structure that includes a hydrostatic transmission (hereinafter referred to as "HST") having a variable volume type hydraulic pump and a variable volume type hydraulic motor, s a single speed change operating member, a pump-directed operating arm provided at an operation end portion of a movable swash plate in the hydraulic pump, a motor-directed operating arm provided at an operation end portion of a movable swash plate in the hydraulic motor, and a press-pull rod operatively connected to the speed change operating member in a state where the press-pull rod connects a free end portion of the pump-directed operating arm and a free end portion of the motor-directed operating arm (see Japanese Patent No. 3161907, hereinafter referred to as "Patent Document 1").

A first flexible mechanism is provided at a connection portion between the press-pull rod and the motor-directed operating arm. The first flexible mechanism is so configured to move the pump-directed operating arm without moving the motor-directed operating arm in accordance with the operation of the speed change operating member within an operating range of the speed change operating member that corresponds to a speed range from zero speed until a predetermined speed of a rotational output of the HST.

Further, a second flexible mechanism is provided at a connection portion between the press-pull rod and the pump-directed operating arm. The second flexible mechanism is so configured to move the motor-directed operating arm without moving the pump-directed operating arm in accordance with the operation of the speed change operating member within an operating range of the speed change operating member that corresponds to more than or equal to the predetermined speed of the rotational output the HST.

The stepless speed change structure described in the Patent Document 1 is useful in enabling volume changes of both the hydraulic pump and the hydraulic motor with the single speed change operating member. However, because the first and second flexible mechanisms are provided for this purpose, it is difficult to adjust the timing for moving, without interruption, the motor-directed operating arm relative to the movement of the pump-directed operating arm. Further, there is a problem that a mechanical link mechanism for connecting the speed change operating member with the pump-directed operating arm and motor-directed operating arm has to be large and complicated.

Also, there is provided another stepless speed change structure in which volumes of both a variable volume hydraulic pump and a variable volume hydraulic motor can be changed by a single speed change operating member (see Japanese Unexamined Patent Application Publication No. 2002-283870, hereafter referred to as "Patent Document 2").

However, the stepless speed change structure described in the Patent Document 2 also has a problem that it is difficult to adjust a start timing of changing the volume of the hydraulic motor, and a mechanical link mechanism that connects the speed change operating member with an operation end portion of the movable swash plate of the hydraulic pump and an operation end portion of the movable swash plate of the hydraulic motor is large and complicated.

SUMMARY OF THE INVENTION

The present invention has been made in view of the conventional technologies; therefore it is an object of the present invention to provide a stepless speed change structure that includes a variable volume hydraulic pump and a variable volume hydraulic motor, and that, while simplifying and compacting the structure, enables to change volumes of both the hydraulic pump and the hydraulic motor by a single speed change operating member.

In order to achieve the object, a first aspect of the present invention provides a stepless speed change structure including a hydrostatic transmission and a speed change operating member, wherein the hydrostatic transmission includes a variable displacement hydraulic pump so configured that a volume of a pump body changes in accordance with an operation of a pump volume adjusting member and a variable displacement hydraulic motor so configured that a volume of a motor body changes in accordance with an operation of a motor volume adjusting member, and wherein the speed change operating member is configured to change a speed change state of the hydrostatic transmission, the stepless speed change structure further including: a pump operation piston that is movable bidirectionally in first and second slide directions on one side and the other side in an axial direction, and that is directly or indirectly engaged with an operation end portion of the pump volume adjusting member (30) such that movements of the pump operation piston in the first and second slide directions cause the pump volume adjusting member to be operated in first and second operating directions, respectively; a neutral spring mechanism that holds the pump operation piston at a neutral position when no external force is added to the pump operation piston and generates a biasing force toward the neutral position when the pump operation piston is moved in the first and second slide directions from the neutral position; first and second slide oil chambers that are so configured that pressure oil, which has been supplied thereinto, presses and moves the pump operation piston in the first and second slide directions, respectively, against the biasing force of the neutral spring mechanism; a motor operation piston that is movable bidirectionally in a smaller volume direction on one side and a larger volume direction on the other side in an axial direction, and that is directly or indirectly engaged with an operation end portion of the motor volume adjusting member such that movements of the motor operation piston in the smaller volume direction and the larger volume direction cause the motor volume adjusting member to be operated in a smaller volume direction and a larger volume direction, respectively; a larger volume operation spring that biases the motor operation piston in the larger volume direction; a smaller volume operating oil chamber that is so configured that pressure oil, which has been supplied thereinto, presses and moves the motor operation piston in the smaller volume direction against the biasing force of the larger volume operation spring; and a first pressure control valve that commonly switches supplying and discharging of pressure oil to and from the first slide oil chamber and the smaller volume operating oil chamber in accordance with the operation of the speed change operating member; a second pressure control valve that switches supplying and discharging of pressure oil to and from the second slide oil chamber in accordance with the operation of the speed change operating member; wherein biasing forces of the neutral spring mechanism and the larger volume operation spring are so set that, after pressure oil within the first slide oil chamber causes the pump operation piston to move in the first slide direction so that the neutral spring mechanism is brought into a predetermined retained-elastic state, pressure oil within the smaller volume operating oil chamber causes the motor operation piston to start moving in the smaller volume direction while compressing the larger volume operation spring.

The stepless speed change structure according to the first aspect of the present invention makes it possible to realize first and second speed change states by a single speed change operating member while simplifying and compacting the structure, the first speed change state configured so that the pump volume adjusting member is moved in accordance with the operation of the speed change operating member with the motor volume adjusting member held at the maximum volume position, the second speed change state configured so that the motor volume adjusting member is moved independently or together with the pump volume adjusting member in accordance with the operation of the speed change operating member after the pump volume adjusting member is moved to the first and second operating direction movement ends or to near the first and second operating direction movement ends.

In a first configuration of the first aspect, the neutral spring mechanism is configured to be brought into the predetermined retained-elastic state at the time when the pump operation piston has the pump volume adjusting member positioned at a first operating direction movement end.

In a second configuration of the first aspect, the neutral spring mechanism is configured to be brought into the predetermined retained-elastic state at the time when the pump operation piston has the pump volume adjusting member positioned at a predetermined position before a first operating direction movement end.

In a first example of the second configuration of the first aspect, the biasing forces of the neutral spring mechanism and the larger volume operation spring are so set that the motor operation piston causes the motor volume adjusting member to be positioned at a smaller volume direction movement end at the time when the pump operation piston causes the pump volume adjusting member to be positioned at the first operating direction movement end.

In a second example of the second configuration of the first aspect, the biasing forces of the neutral spring mechanism and the larger volume operation spring are so set that the motor operation piston causes the motor volume adjusting member to be positioned at a predetermined position before a smaller volume direction movement end at the time when the pump operation piston causes the pump volume adjusting member to be positioned at the first operating direction movement end.

The stepless speed change structure according to the first aspect may further include a first supply-discharge line fluidly connected to the first slide oil chamber and the smaller volume operating oil chamber, and a second supply-discharge line fluidly connected to the second slide oil chamber.

In this case, the first pressure control valve is configured to take a supplying position that fluidly connect the first supply-discharge line to a charge line for replenishing operation oil to the hydrostatic transmission, and a discharging position that has the first supply-discharge line drained, and the second pressure control valve is configured to take a supplying position that fluidly connects the second supply-discharge line to the charge line, and a discharging position that has the second first supply-discharge line drained.

The stepless speed change structure according to a first mode of the first aspect may further include a pump hydraulic servo mechanism that hydraulically operates the pump volume adjusting member in accordance with the movement of the pump operation piston, and a motor hydraulic servo mechanism that hydraulically operates the motor volume adjusting member in accordance with the movement of the motor operation piston.

The motor hydraulic servo mechanism may include a motor servo piston, a larger volume servo spring, a spring chamber housing the larger volume servo spring, a smaller volume servo oil chamber and a motor servo switching valve.

The motor servo piston is moved bidirectionally in a smaller volume servo direction on one side and in a larger volume servo direction on the other side in an axial direction in accordance with a switching movement of the motor servo switching valve, and is engaged with the end portion of the motor volume adjusting member such that, the motor servo piston operates the motor volume adjusting member in the smaller volume direction as being moved in the smaller volume servo direction, and has the motor volume adjusting member positioned at the minimum volume position when positioned at a minimum volume servo position, meanwhile the motor servo piston operates the motor volume adjusting member in the larger volume direction as being moved in the larger volume servo direction, and has the motor volume adjusting member at the maximum volume position when positioned at a maximum volume servo position.

The larger volume servo spring is configured to bias the motor servo piston in the larger volume servo direction. The smaller volume servo oil chamber is so configured that pressure oil, which has been supplied into the smaller volume servo oil chamber, presses and moves the motor servo piston in the smaller volume servo direction against the biasing force of the larger volume servo spring. The motor servo switching valve is operatively connected to the motor operation piston in such a manner as to take a larger volume position and a smaller volume position, respectively, in accordance with the movement of the motor operation piston in the larger volume direction and smaller volume direction. The smaller volume servo direction in which the larger volume servo spring biases the motor servo piston is identical to the larger volume direction in which the larger volume operation spring biases the motor operation piston.

In a stepless speed change structure according to a second mode of the first aspect, the pump operation piston is mechanically connected to the operation end portion of the pump movable swash plate in such a manner as to operates the pump volume adjusting member in the first and second operating directions, respectively, in accordance with the movements of the pump operation piston in the first and second slide directions, and the motor operation piston is mechanically connected to the operation end portion of the motor volume adjusting member in such a manner as to operate the motor volume adjusting member in the smaller volume direction and larger volume direction, respectively, in accordance with the movements of the motor operation piston in the smaller volume direction and the larger volume direction.

In order to achieve the object, a second aspect of the present invention provides a stepless speed change structure including a hydrostatic transmission and a speed change operating member, wherein the hydrostatic transmission includes a variable displacement hydraulic pump so configured that a volume of a pump body changes in accordance with an operation of a pump volume adjusting member, and a variable displacement hydraulic motor so configured that a volume of a motor body changes in accordance with an operation of a motor volume adjusting member, and wherein the speed change operating member is configured to change a speed change state of the hydrostatic transmission, the stepless speed change structure including: a pump operation connecting mechanism that operates the pump volume adjusting member from a neutral position in first and second operating directions; a motor operation connecting mechanism that operates the motor volume adjusting member in a smaller volume direction and a larger volume direction, wherein the pump operation connecting mechanism includes a pump spool that is operatively connected to the speed change operating member in such a manner as that pump spool takes a pump spool neutral position in accordance with the operation of the speed change operating member to the neutral position, and moves from the pump spool neutral position in a first slide direction on one side and a second slide direction on the other side in an axial direction, respectively, in accordance with the operations of the speed change operating member from the neutral position in the first and second operating directions, wherein the motor operation connecting mechanism includes a motor spool that is placed coaxially in series on one side of the pump spool in the axial direction and that is movable bidirectionally in a smaller volume direction on one side and a larger volume direction on the other side in an axial direction, and a larger volume operation spring that biases the motor spool in the larger volume direction, the motor operation connecting mechanism so configured as to operate the motor volume adjusting member in the smaller volume direction and the larger volume direction, respectively, in accordance with the movements of the motor spool in the smaller volume direction and larger volume direction, wherein there is provided a flexible portion between the pump spool in a state of being positioned at the pump spool neutral position and the motor spool in a state of being positioned at a larger volume direction movement end, the flexible portion allowing the pump spool to move by a predetermined distance in the first slide direction with the motor spool held at the larger volume direction movement end, and wherein only the pump spool moves in the first slide direction with the motor spool held at the larger volume direction movement end when the pump spool is moved to an end of the flexible portion in accordance with the operation of the speed change operating member, and the pump spool presses and moves the motor spool in the smaller volume direction when the pump spool is moved in the first slide direction beyond the flexible portion.

The stepless speed change structure according to the second aspect of the present invention makes it possible to realize first and second speed change states by a single speed change operating member while simplifying and compacting the structure, the first speed change state configured so that the pump volume adjusting member is moved in accordance with the operation of the speed change operating member with the motor volume adjusting member held at the maximum volume position, the second speed change state configured so that the motor volume adjusting member is moved independently or together with the pump volume adjusting member in accordance with the operation of the speed change operating member after the pump volume adjusting member is moved to the first and second operating direction movement ends or to near the first and second operating direction movement ends.

In the second aspect, the pump spool may be preferably positioned at the end of the flexible portion at the time when the speed change operating member causes, through the pump operation connecting mechanism, the pump volume adjusting member to be positioned at the first operating direction movement end.

The stepless speed change structure according to the second aspect may further include a neutral spring mechanism that directly or indirectly holds the pump spool at the pump spool neutral position, and that generates a biasing force for directly or indirectly pressing the pump spool toward the pump spool neutral position when the pump spool is moved from the pump spool neutral position to the first and second slide directions.

In the stepless speed change structure according to the second aspect, the pump operation connecting mechanism may preferably include a pump hydraulic servo mechanism that hydraulically operates the pump volume adjusting member in accordance with the operation of the speed change operating member.

The pump hydraulic servo mechanism is configured to include a pump servo piston movable in a first servo direction on one side and a second servo direction on the other side in an axial direction, first and second servo oil chambers configured so that pressure oil, which has been supplied into the first and second servo oil chambers, presses and moves the pump servo piston in the first and second servo directions, respectively, and a pump servo switching valve. The pump servo piston moves in the first and second servo directions in accordance with a switching movement of the pump servo switching valve, and is engaged with an operation end portion of the pump volume adjusting member such that the pump volume adjusting member is operated in the first and second operating directions, respectively, in accordance with the movement of the pump servo piston in the first and second servo directions.

Operating the speed change operating member to a predetermined position before the first operating direction operation end, through the pump operation connecting mechanism, moves the pump spool to the end of the flexible portion while operating the pump servo switching valve so that the pump servo piston has the pump volume adjusting member positioned at the first operating direction movement end.

When the speed change operating member is operated between the predetermined position and the first operating direction operation end, the pump spool is positioned at a slide position that corresponds to an operating position of the speed change operating member through the pump operation connecting mechanism in a state where the pump volume adjusting member is held at the first operating direction movement end by the pump servo piston.

In order to achieve the object, a third aspect of the present invention provides a stepless speed change structure a hydrostatic transmission and a speed change operating member, wherein the hydrostatic transmission includes a variable displacement hydraulic pump so configured that a volume of a pump body changes in accordance with an operation of a pump volume adjusting member, and a variable displacement hydraulic motor so configured that a volume of a motor body changes in accordance with an operation of a motor volume adjusting member, and is configured so that an output rotational speed becomes zero speed when the pump volume adjusting member is positioned at a neutral position and an output rotational direction becomes forward and reverse directions, respectively, when the pump volume adjusting member is moved from the neutral position to forward and reverse areas, and wherein the speed change operating member is configured to change the rotational direction and the rotational speed of the output of the hydrostatic transmission, the stepless speed change structure including: a pump operation piston that is movable bidirectionally in first and second slide directions on one side and the other side in an axial direction, and that is directly or indirectly engaged with an operation end portion of the pump volume adjusting member such that movements of the pump operation piston in the first and second slide directions cause the pump volume adjusting member to be operated in first and second operating directions, respectively; a neutral spring mechanism that holds the pump operation piston at a neutral position when no external force is added to the pump operation piston and generates a biasing force toward the neutral position when the pump operation piston is moved in the first and second slide directions from the neutral position; first and second slide oil chambers that is so configured that pressure oil, which has been supplied thereinto, presses and moves the pump operation piston in the first and second slide directions, respectively, against the biasing force of the neutral spring mechanism; a motor operation piston that is movable bidirectionally in a smaller volume direction on one side and a larger volume direction on the other side in an axial direction, and that is directly or indirectly engaged with an operation end portion of the motor volume adjusting member such that movements of the motor operation piston in the smaller volume direction and the larger volume direction cause the motor volume adjusting member to be operated in a smaller volume direction and a larger volume direction, respectively; a larger volume operation spring that biases the motor operation piston in the larger volume direction; a smaller volume operating oil chamber that is so configured that pressure oil, which has been supplied thereinto, presses and moves the motor operation piston in the smaller volume direction against the biasing force of the larger volume operation spring; a first pressure control valve that supplies and discharges pressure oil to and from the first slide oil chamber, respectively, in accordance with the operation of the speed change operating member that operates the pump volume adjusting member in the first and second operating directions, a second pressure control valve that supplies and discharges pressure oil to and from the second slide oil chamber, respectively, in accordance with the operation of the speed change operating member that operates the pump volume adjusting member in the first and second operating directions, and a flow path switching valve that introduces pressure oil of the first and second slide oil chambers into the smaller volume operating oil chamber, respectively, when the speed change operating member is positioned in forward and reverse operation areas, wherein biasing forces of the neutral spring mechanism and the larger volume operation spring are so set that, after pressure oil within the first slide oil chamber causes the pump operation piston to move in the corresponding slide direction so that the neutral spring mechanism is brought into a predetermined retained-elastic state, pressure oil within the smaller volume operating oil chamber causes the motor operation piston to start moving in the smaller volume direction while compressing the larger volume operation spring.

The stepless speed change structure according to the third aspect of the present invention makes it possible to realize first and second speed change states by a single speed change operating member while simplifying and compacting the structure, the first speed change state configured so that the pump volume adjusting member is moved in accordance with the operation of the speed change operating member with the motor volume adjusting member held at the maximum volume position, the second speed change state configured so that the motor volume adjusting member is moved independently or together with the pump volume adjusting member in accordance with the operation of the speed change operating member after the pump volume adjusting member is moved to the first and second operating direction movement ends or to near the first and second operating direction movement ends.

In a first configuration of the third aspect, the neutral spring mechanism is configured to be brought into the predetermined retained-elastic state at the time when the pump operation piston has the pump volume adjusting member positioned at first and second operating direction movement ends.

In a second configuration of the third aspect, the neutral spring mechanism is configured to be brought into the predetermined retained-elastic state at the time when the pump operation piston has the pump volume adjusting member positioned at a predetermined position before a first operating direction movement end and a predetermined position before a second operating direction movement end.

In a first example of the second configuration of the third aspect, the biasing forces of the neutral spring mechanism and the larger volume operation spring are so set that the motor operation piston causes the motor volume adjusting member to be positioned at a smaller volume direction movement end at the time when the pump operation piston causes the pump volume adjusting member to be positioned at the first and second operating direction movement ends.

In a second example of the second configuration of the third aspect, the biasing forces of the neutral spring mechanism and the larger volume operation spring are so set that the motor operation piston causes the motor volume adjusting member to be positioned at a predetermined position before a smaller volume direction movement end at the time when the pump operation piston causes the pump volume adjusting member to be positioned at the first and second operating direction movement ends.

In order to achieve the object, a fourth aspect of the present invention provides a stepless speed change structure including a hydrostatic transmission, a planetary gear mechanism and a speed change operating member, wherein the hydrostatic transmission includes a variable displacement hydraulic pump so configured that a volume of a pump body changes between a first operating direction movement end and a second operating direction movement end in accordance with an operation of a pump volume adjusting member, and a variable displacement hydraulic motor so configured that a volume of a motor body changes in accordance with an operation of a motor volume adjusting member, wherein planetary gear mechanism so configured to receive rotational powers from a drive source and the hydrostatic transmission at first and second elements, respectively, and output a combined rotational power, which has been formed by combining these rotational powers, from a third element, and wherein the speed change operating member is configured to change a speed change state of the hydrostatic transmission, the stepless speed change structure including: a pump operation piston that is movable bidirectionally in first and second slide directions on one side and the other side in an axial direction, and that is directly or indirectly engaged with an operation end portion of the pump volume adjusting member such that movements of the pump operation piston in the first and second slide directions cause the pump volume adjusting member to be operated in first and second operating directions, respectively; a second slide spring that biases the pump operation piston in the second slide direction; a first slide oil chamber that is so configured that pressure oil, which has been supplied thereinto, presses and moves the pump operation piston in the first slide direction against the biasing force of the second slide spring; a motor operation piston that is movable bidirectionally in a smaller volume direction on one side and a larger volume direction on the other side in an axial direction, and that is directly or indirectly engaged with an operation end portion of the motor volume adjusting member such that movements of the motor operation piston in the smaller volume direction and the larger volume direction cause the motor volume adjusting member to be operated in a smaller volume direction and a larger volume direction, respectively; a larger volume operation spring that biases the motor operation piston in the larger volume direction; a smaller volume operating oil chamber that is so configured that pressure oil, which has been supplied thereinto, presses and moves the motor operation piston in the smaller volume direction against the biasing force of the larger volume operation spring; and a first pressure control valve that commonly switches supplying and discharging of pressure oil to and from the first slide oil chamber and the smaller volume operating oil chamber in accordance with the operation of the speed change operating member; wherein a gear ratio of the planetary gear mechanism is so set that the rotational speed of the combined rotational power becomes zero speed when the pump volume adjusting member is positioned at the second operating direction movement end, and is accelerated in one rotational direction as the pump volume adjusting member is operated from the second operating direction movement end to the first operating direction movement end, and wherein biasing forces of the second slide spring and the larger volume operation spring are so set that, after pressure oil within the first slide oil chamber causes the pump operation piston to move in the first slide direction so that the second slide spring is brought into a predetermined retained-elastic state, pressure oil within the smaller volume operating oil chamber causes the motor operation piston to start moving in the smaller volume direction while compressing the larger volume operation spring.

The stepless speed change structure according to the fourth aspect of the present invention makes it possible to realize first and second speed change states by a single speed change operating member while simplifying and compacting the structure, the first speed change state configured so that the pump volume adjusting member is moved in accordance with the operation of the speed change operating member with the motor volume adjusting member held at the maximum volume position, the second speed change state configured so that the motor volume adjusting member is moved independently or together with the pump volume adjusting member in accordance with the operation of the speed change operating member after the pump volume adjusting member is moved to the first and second operating direction movement ends or to near the first and second operating direction movement ends.

In the fourth aspect, the hydrostatic transmission is preferably configured so that the rotational speed of the output becomes a reverse direction maximum speed when the pump volume adjusting member is positioned at the second operating direction movement end, is decelerated from the reverse direction maximum speed to zero speed as the pump volume adjusting member is operated in the first operating direction from the second operating direction movement end to a neutral position between the second operating direction movement end and the first operating direction movement end, and is accelerated from zero speed to the forward direction maximum speed as the pump volume adjusting member is operated in the first operating direction from the neutral position to the first operating direction movement end.

In a first configuration of the fourth aspect, the second slide spring is configured to be brought into the predetermined retained-elastic state at the time when the pump operation piston has the pump volume adjusting member positioned at a first operating direction movement end.

In a second configuration of the fourth aspect, the second slide spring is configured to be brought into the predetermined retained-elastic state at the time when the pump operation piston has the pump volume adjusting member positioned at a predetermined position before a first operating direction movement end.

In a first example of the second configuration of the fourth aspect, the biasing forces of the second slide spring and the larger volume operation spring are so set that the motor operation piston causes the motor volume adjusting member to be positioned at a smaller volume direction movement end at the time when the pump operation piston causes the pump volume adjusting member to be positioned at the first operating direction movement end.

In a second example of the second configuration of the fourth aspect, the biasing forces of the second slide spring and the larger volume operation spring are so set that the motor operation piston causes the motor volume adjusting member to be positioned at a predetermined position before a smaller volume direction movement end at the time when the pump operation piston causes the pump volume adjusting member to be positioned at the first operating direction movement end.

The stepless speed change structure according to a first mode of the fourth aspect preferably may further include a pump hydraulic servo mechanism that hydraulically operates the pump volume adjusting member in accordance with the movement of the pump operation piston, and a motor hydraulic servo mechanism that hydraulically operates the motor volume adjusting member in accordance with the movement of the motor operation piston.

In the stepless speed change structure according to a second mode of the fourth aspect, the pump operation piston is mechanically connected to the operation end portion of the pump movable swash plate in such a manner as to operates the pump volume adjusting member in the first and second operating directions, respectively, in accordance with the movements of the pump operation piston in the first and second slide directions, and the motor operation piston is mechanically connected to the operation end portion of the motor volume adjusting member in such a manner as to operate the motor volume adjusting member in the smaller volume direction and larger volume direction, respectively, in accordance with the movements of the motor operation piston in the smaller volume direction and the larger volume direction.

The stepless speed change structure according to any one of the first to fourth aspect preferably may further include a biasing force adjusting mechanism capable of adjusting the biasing force of the larger volume operation spring.

In a case where the stepless speed change structure includes a motor operation piston case forming a housing space for the motor operation piston, the motor operation piston is housed in the housing space in an axially bidirectionally movable manner while dividing the housing space into the smaller volume operating oil chamber and a spring chamber on the opposite side of the smaller volume operating oil chamber, the spring chamber housing the larger volume operation spring, wherein the biasing force adjusting mechanism has a spring receptor that is engaged with a proximal end side of the larger volume operation spring, which is opposite side of a distal end side with which the motor operation piston is engaged, and the spring receptor is supported by the motor operation piston case in a fixed position adjustable manner.

BRIEF DESCRIPTION OF THE DRAWINGS/FIGURES

Figure 2:
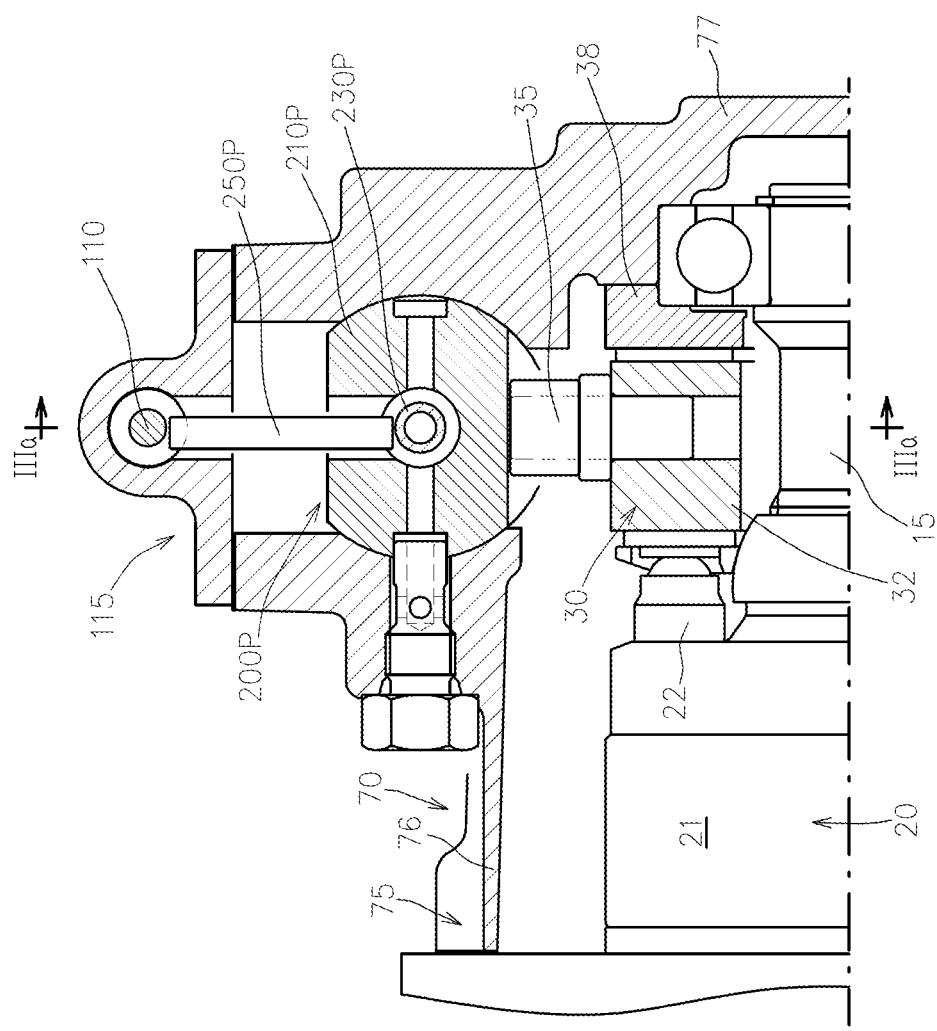
FIG. 2 is a cross-sectional view along the line II-II in FIG. 1.
Figure 3:
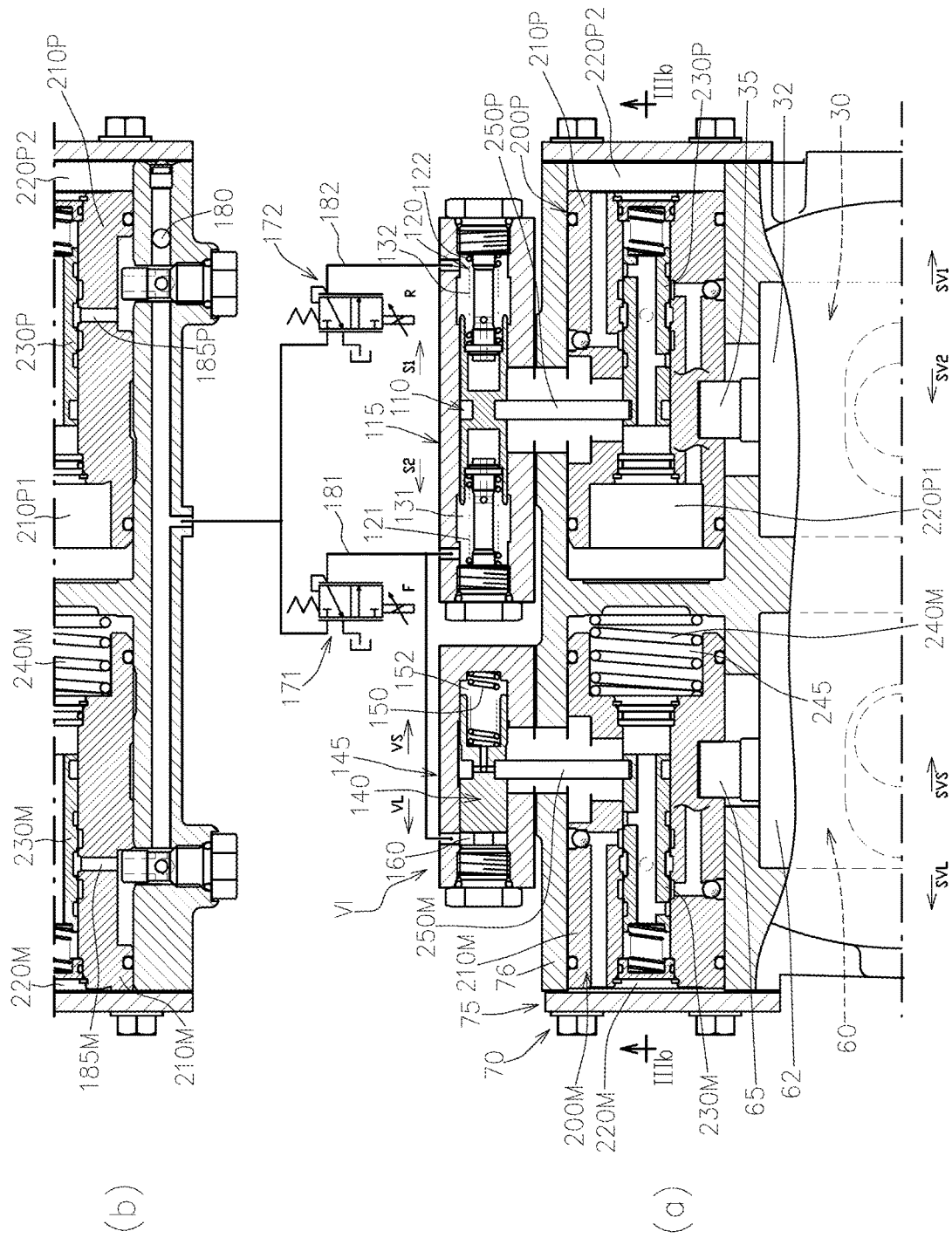

FIG. 3 has part (a) showing a cross-sectional view along the IIIA-IIIA line in FIG. 2, and part (b) showing a cross-sectional view along the line in part (a) of FIG. 3.

Figure 4:
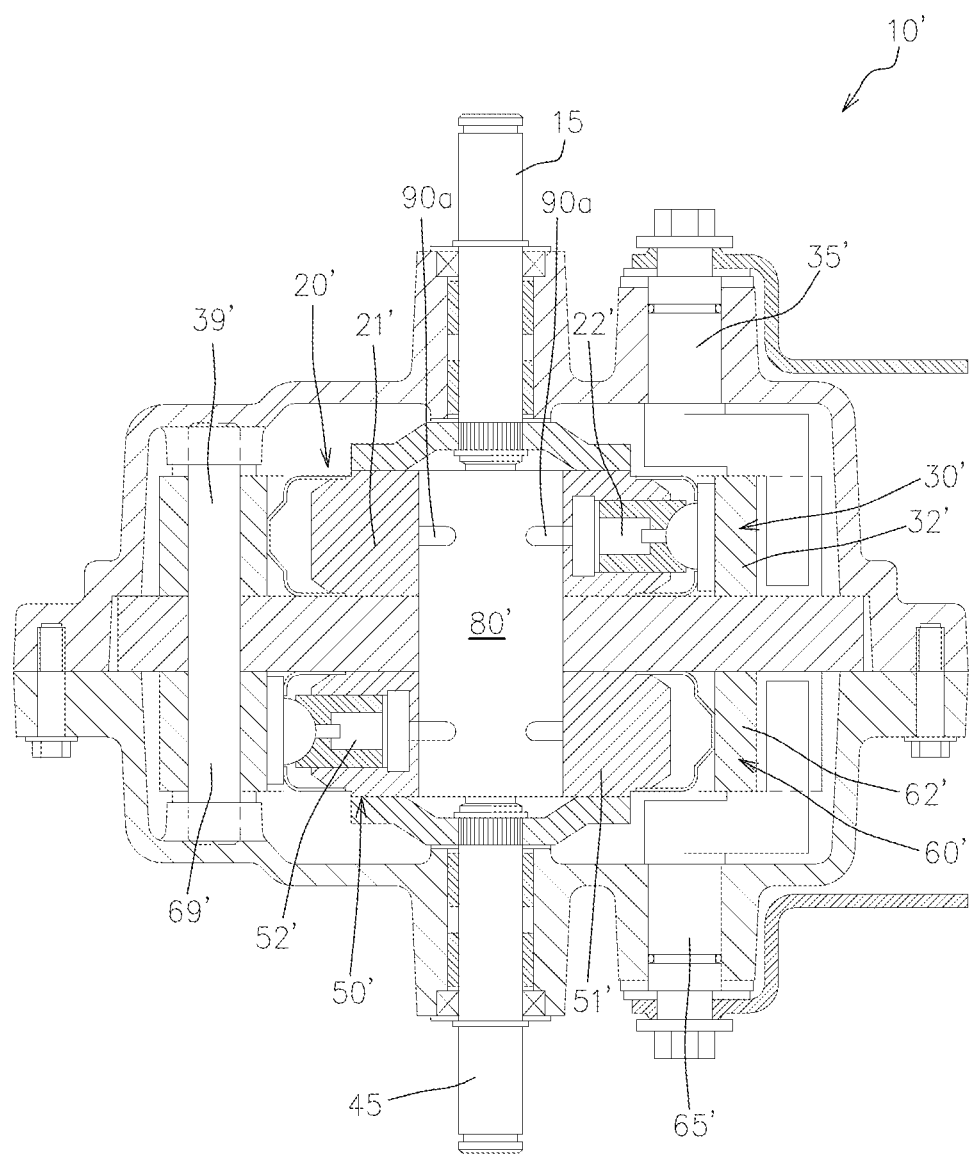

FIG. 4 is a cross-sectional view of a modified example of the HST that is applicable to the stepless speed change structure according to the present invention.

Figure 5:
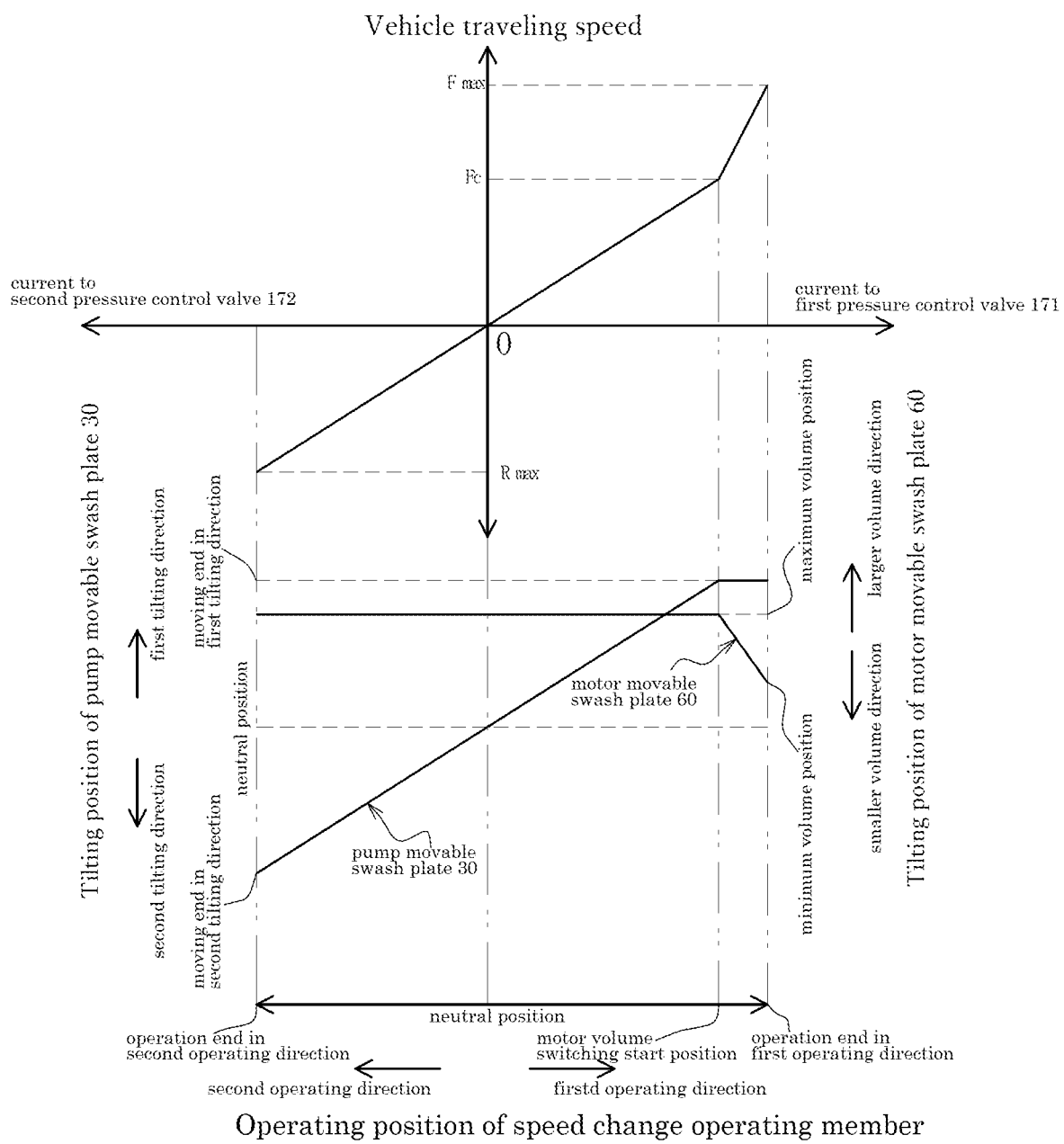

FIG. 5 is a graph illustrating a relation among an operating position of a speed change operating member, a tilting position of a pump movable swash plate, a tilting position of a motor movable swash plate and an output speed of the stepless speed change structure.

Figure 6:
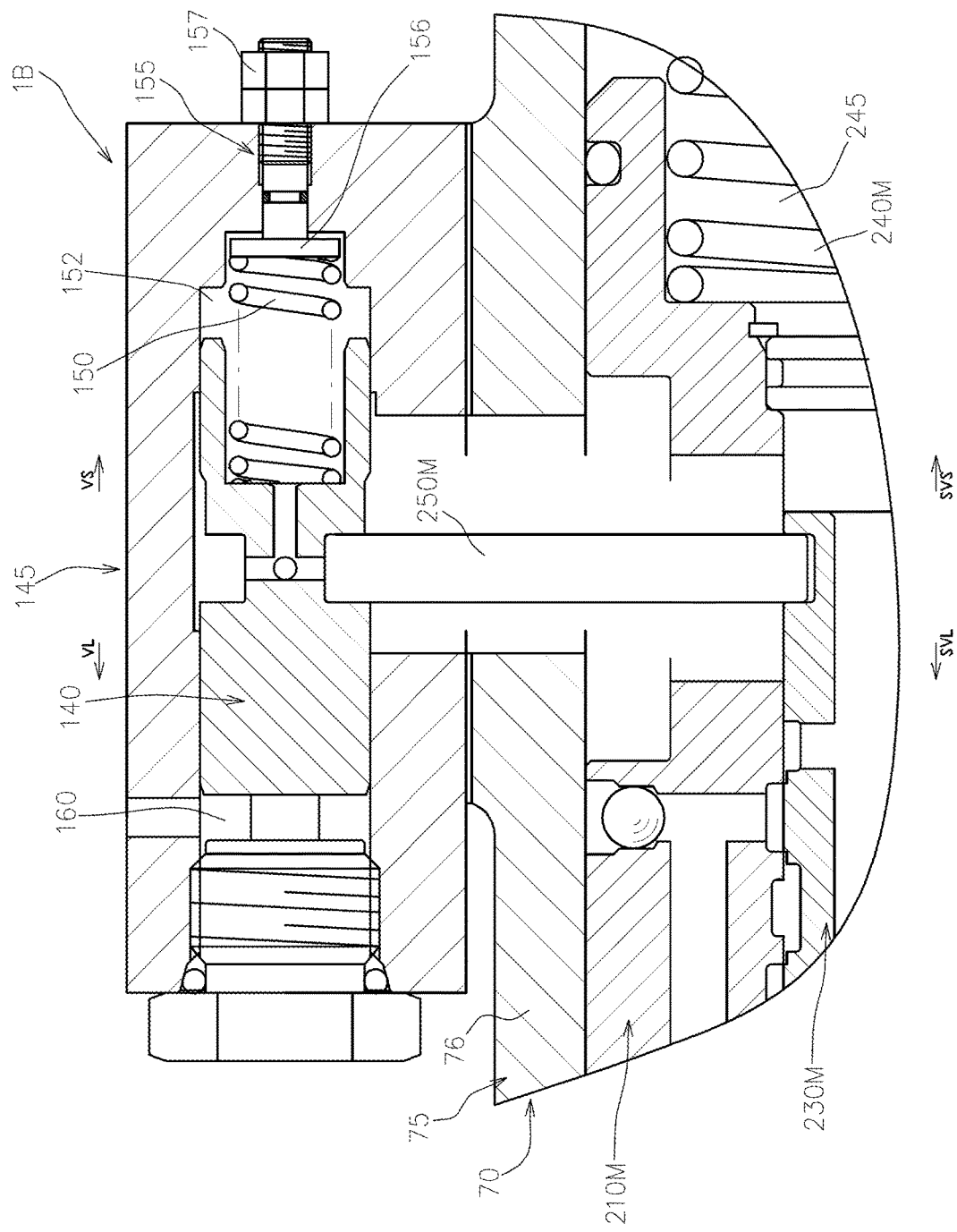

FIG. 6 is a partial cross-sectional view of a stepless speed change structure according to a modified example of the first embodiment, and corresponds to part VI in FIG. 3.

Figure 7:
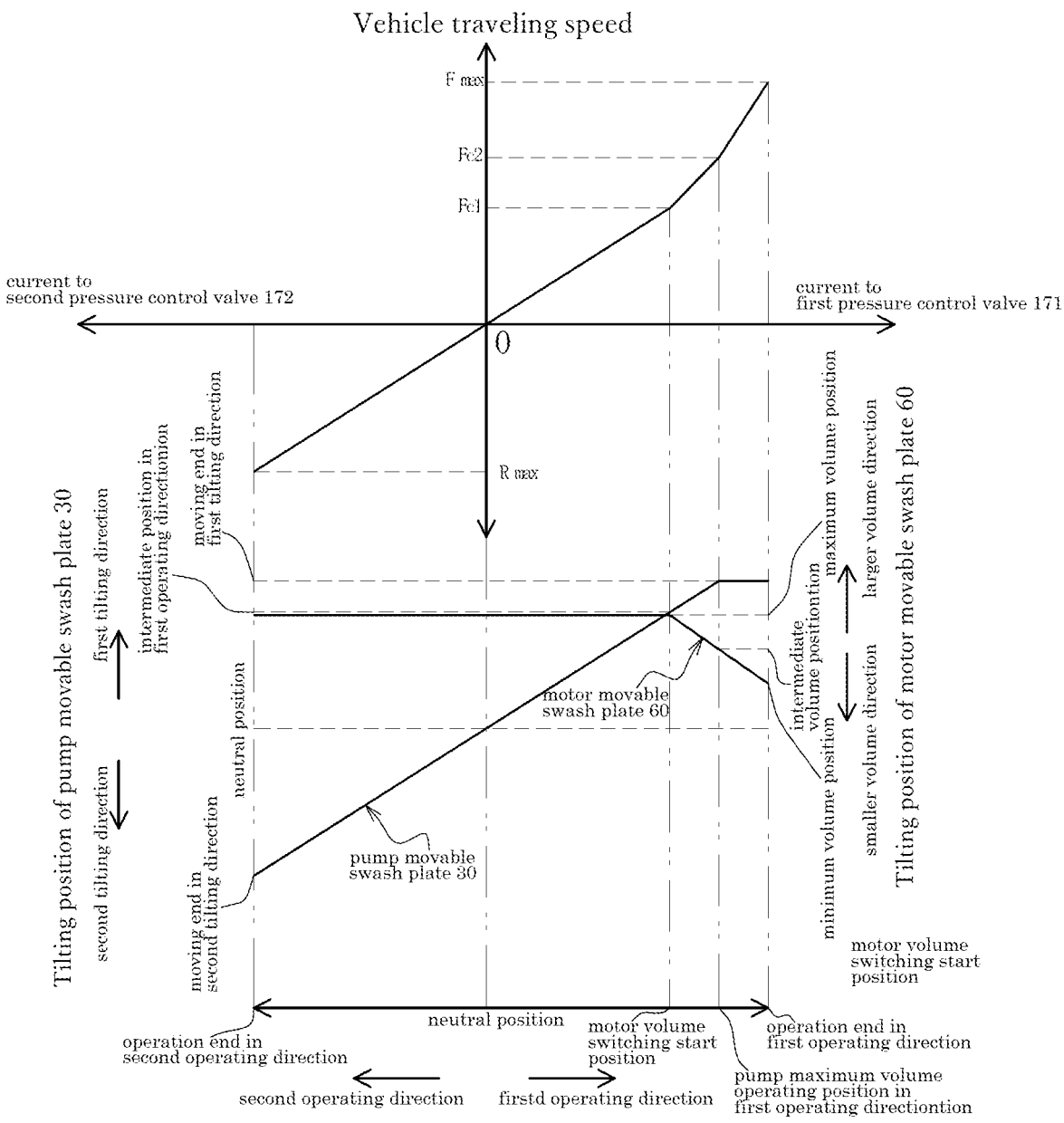

FIG. 7 is a graph illustrating a relation among the operating position of the speed change operating member, the tilting position of the pump movable swash plate, the tilting position of a motor movable swash plate and the output speed of the stepless speed change structure, in a case where the pump operation piston (that is, the pump movable swash plate) and the motor operation piston (that is, the motor movable swash plate) are operated in accordance with another operation pattern different from that in the first embodiment.

Figure 8:
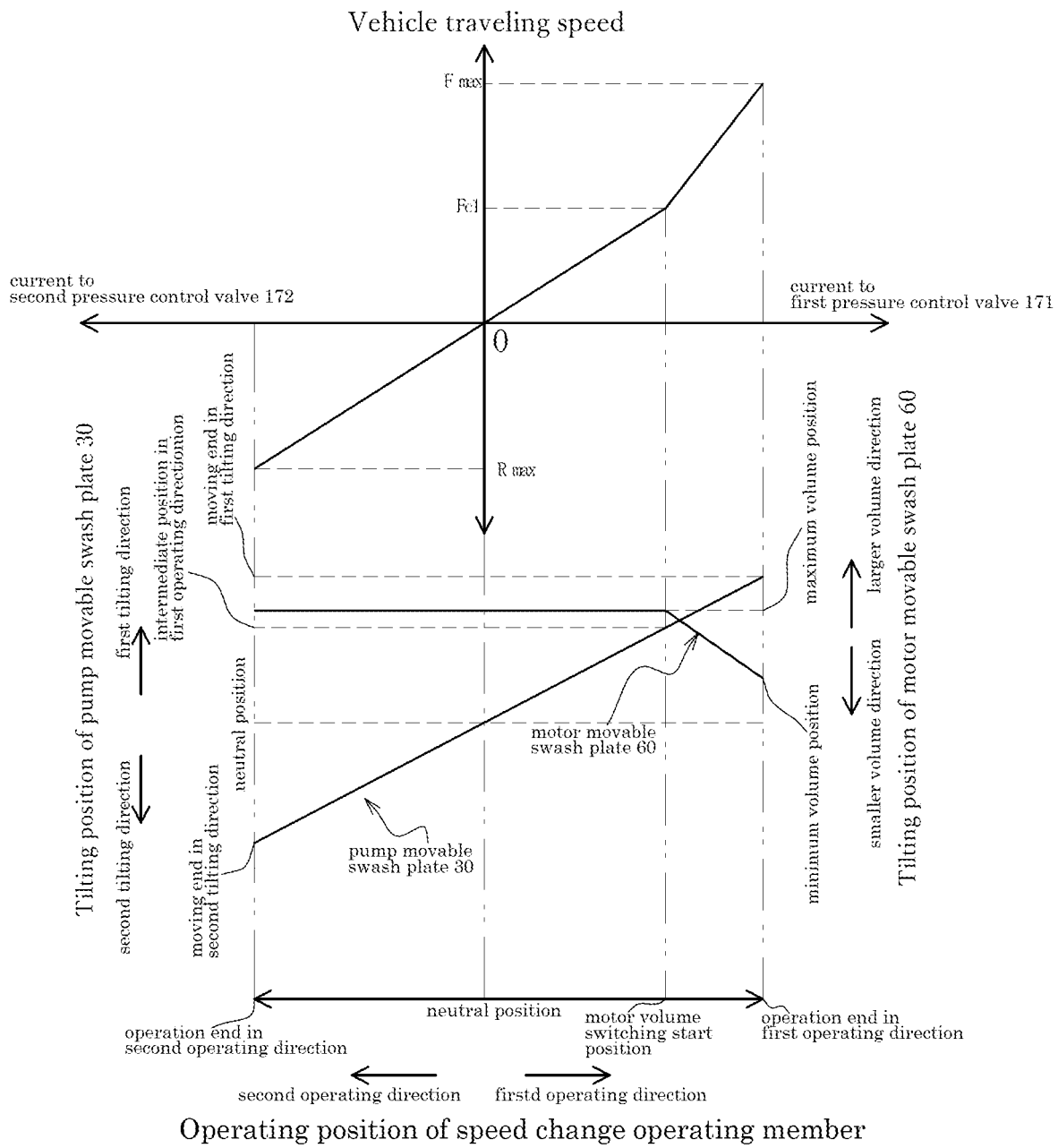

FIG. 8 is a graph illustrating a relation among the operating position of the speed change operating member, the tilting position of the pump movable swash plate, the tilting position of a motor movable swash plate and the output speed of the stepless speed change structure, in a case where the pump operation piston (that is, the pump movable swash plate) and the motor operation piston (that is, the motor movable swash plate) are operated in accordance with still another operation pattern different from that in the first embodiment.

Figure 9:
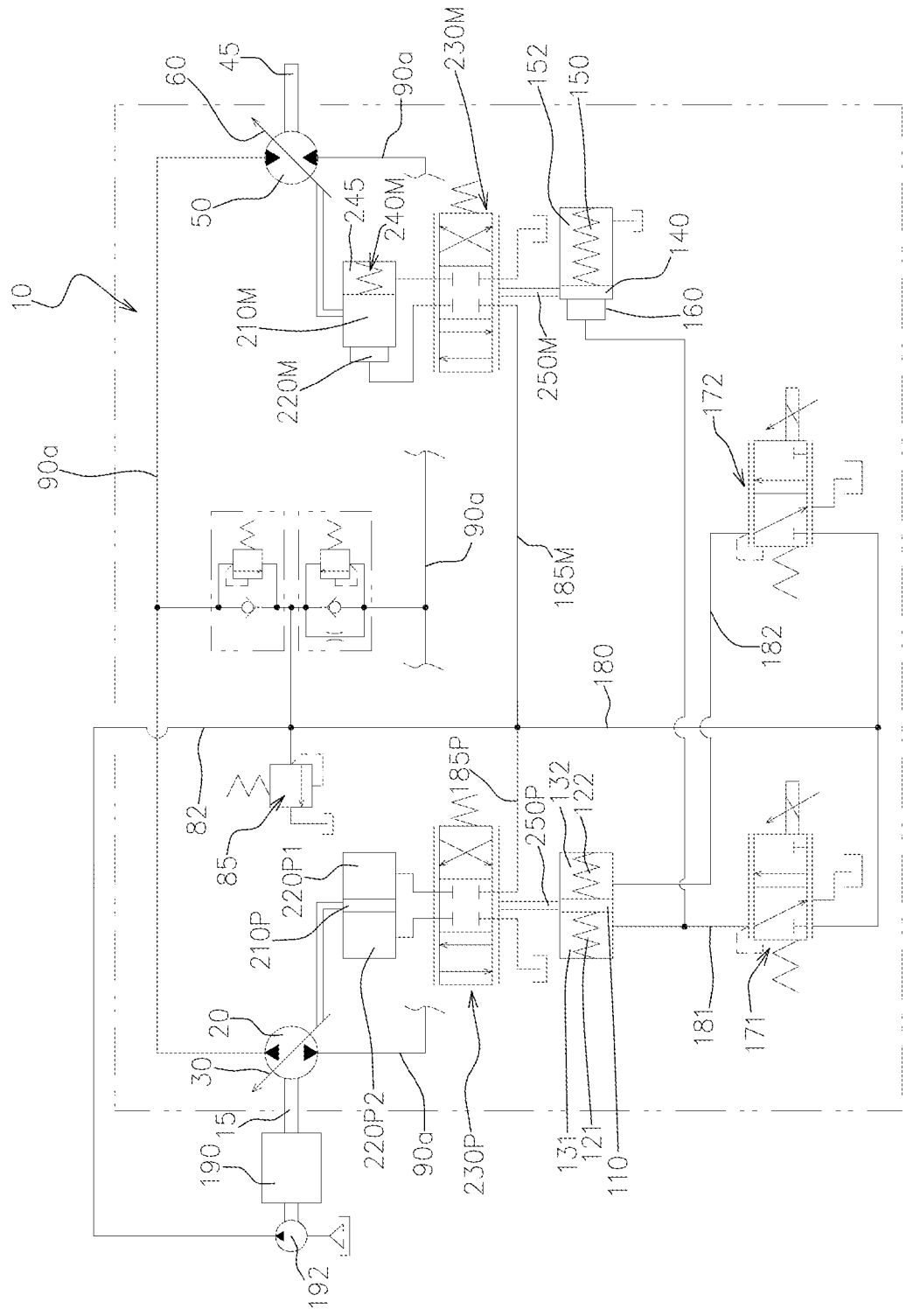

FIG. 9 is a hydraulic circuit diagram of the stepless speed change structure according to the first embodiment.

Figure 10:
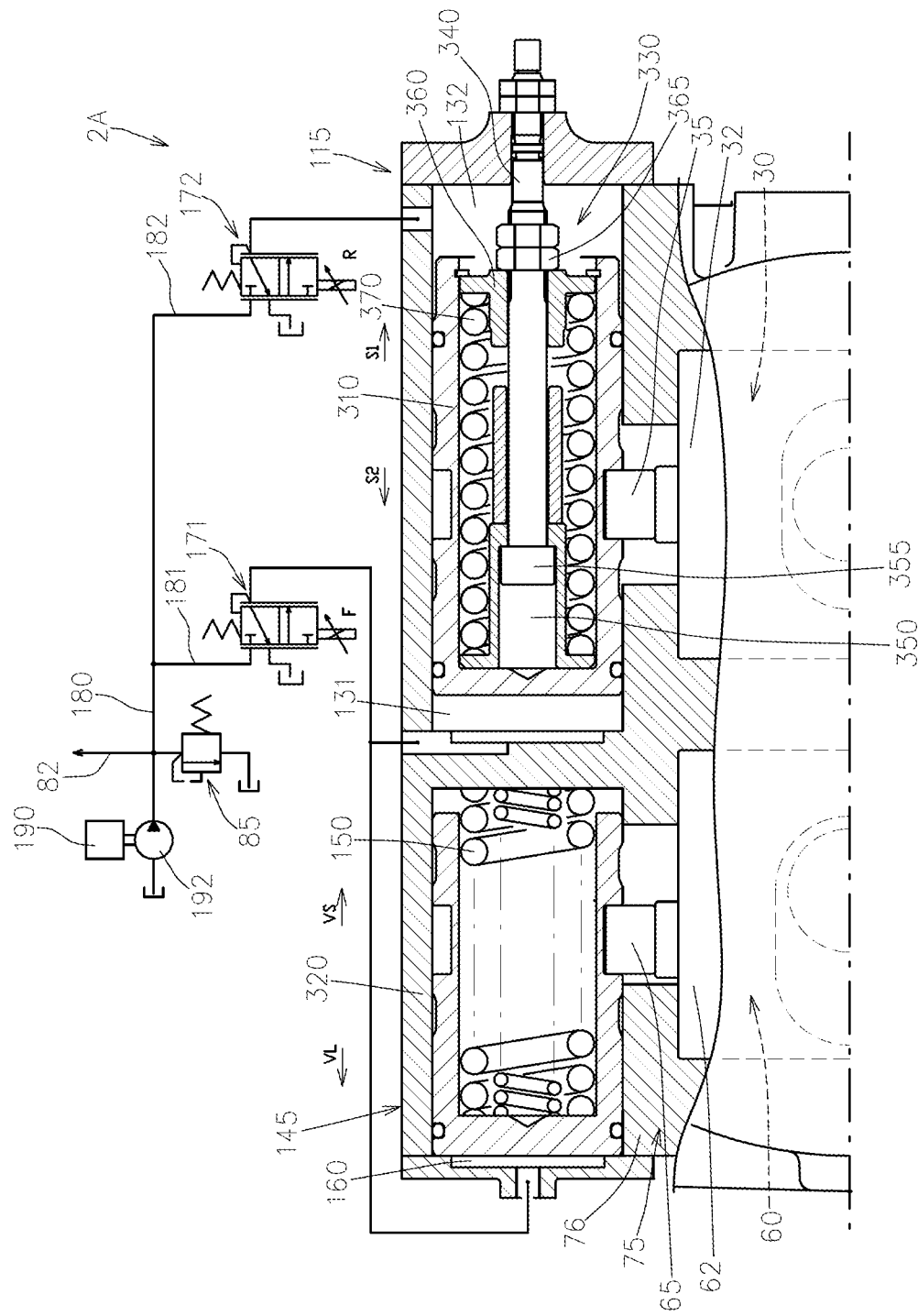

FIG. 10 is a partial cross-sectional view of a stepless speed change structure according to a second embodiment of the present invention, showing a cross-sectional view that corresponds to FIG. 3 in the first embodiment.

Figure 11:
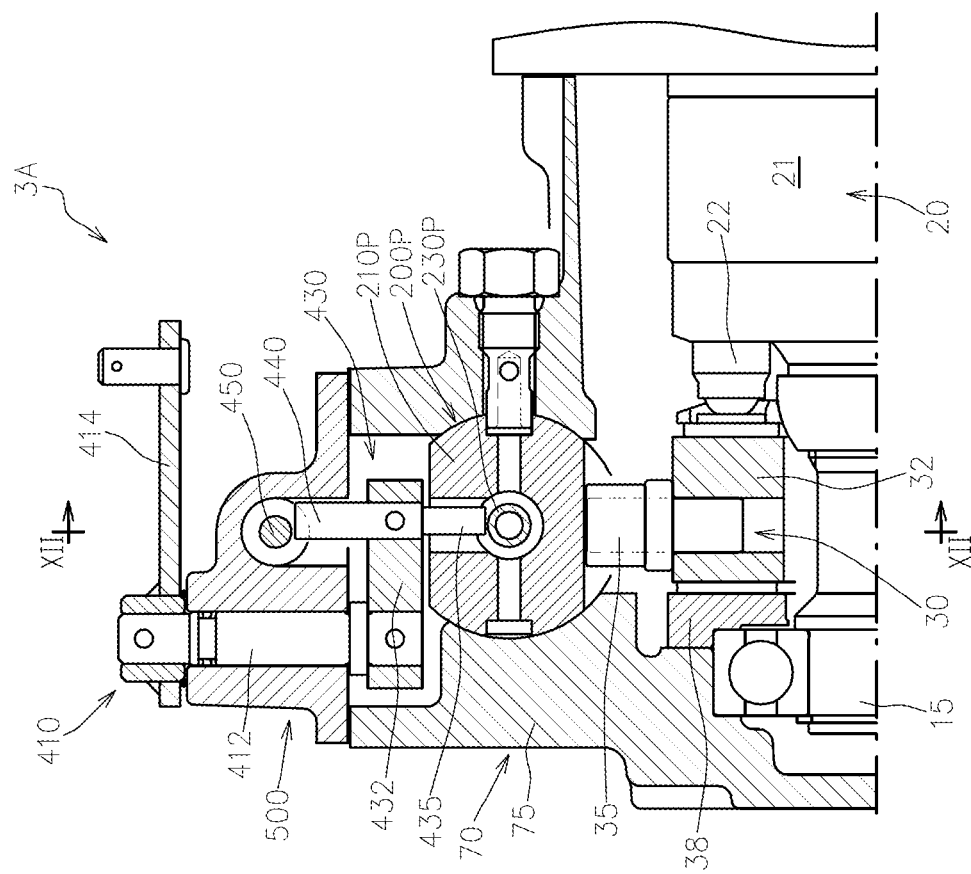

FIG. 11 is a partial cross-sectional view of a stepless speed change structure according to a third embodiment of the present invention, showing a cross-sectional view that corresponds to FIG. 2 in the first embodiment.

Figure 12:
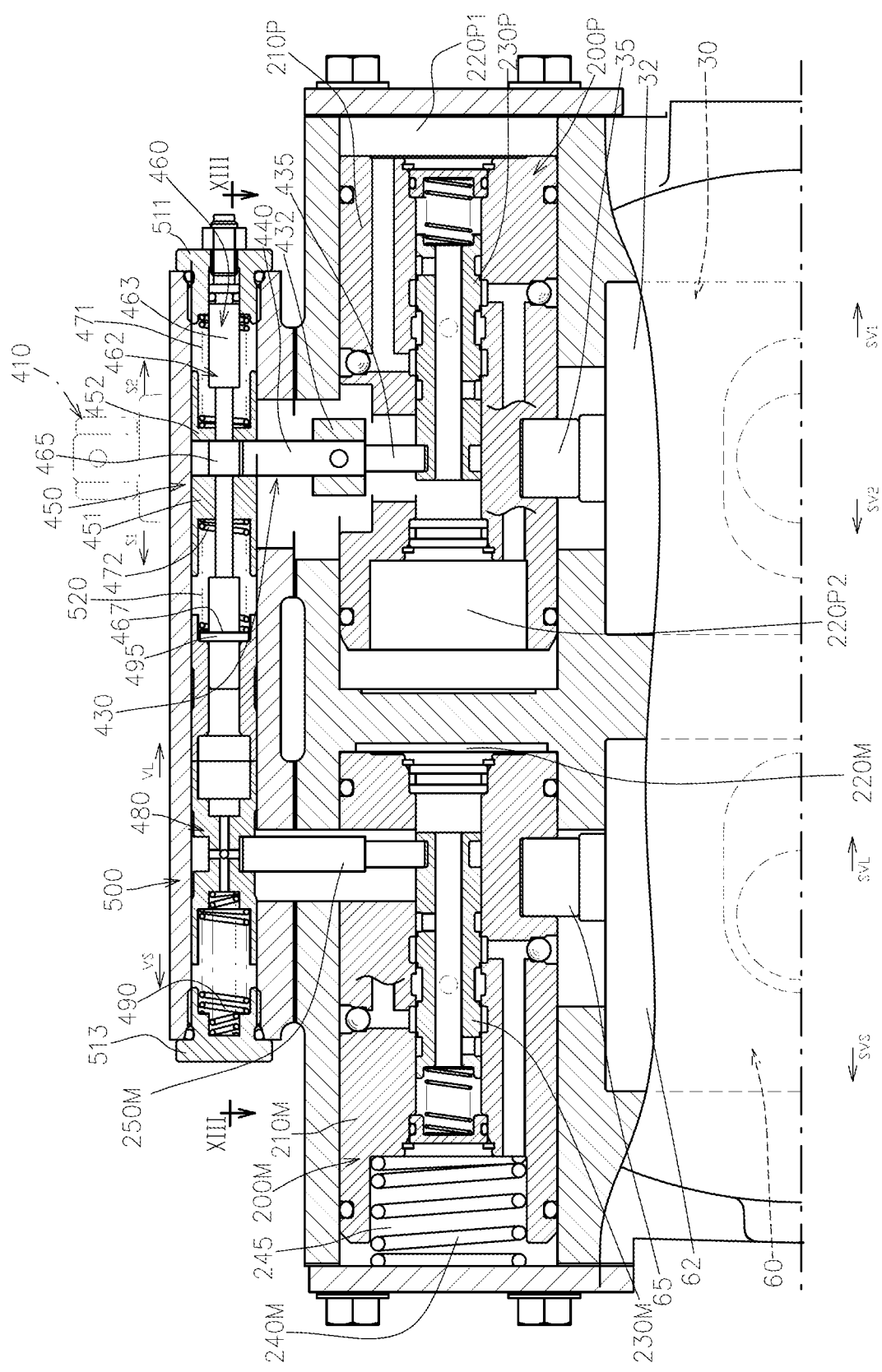

FIG. 12 is a cross-sectional view along the Line XII-XII in FIG. 11.

Figure 13:
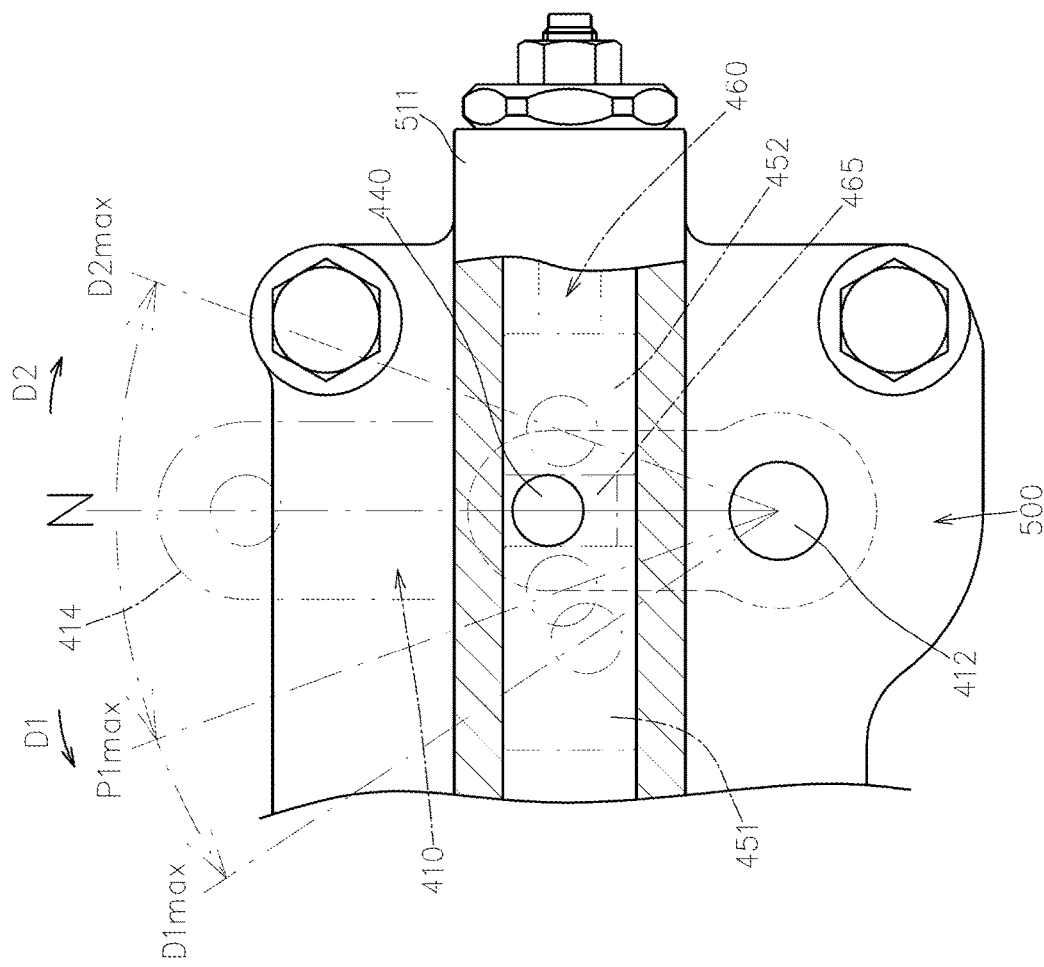

FIG. 13 is a cross-sectional view along the line XIII-XIII in FIG. 12.

Figure 14:
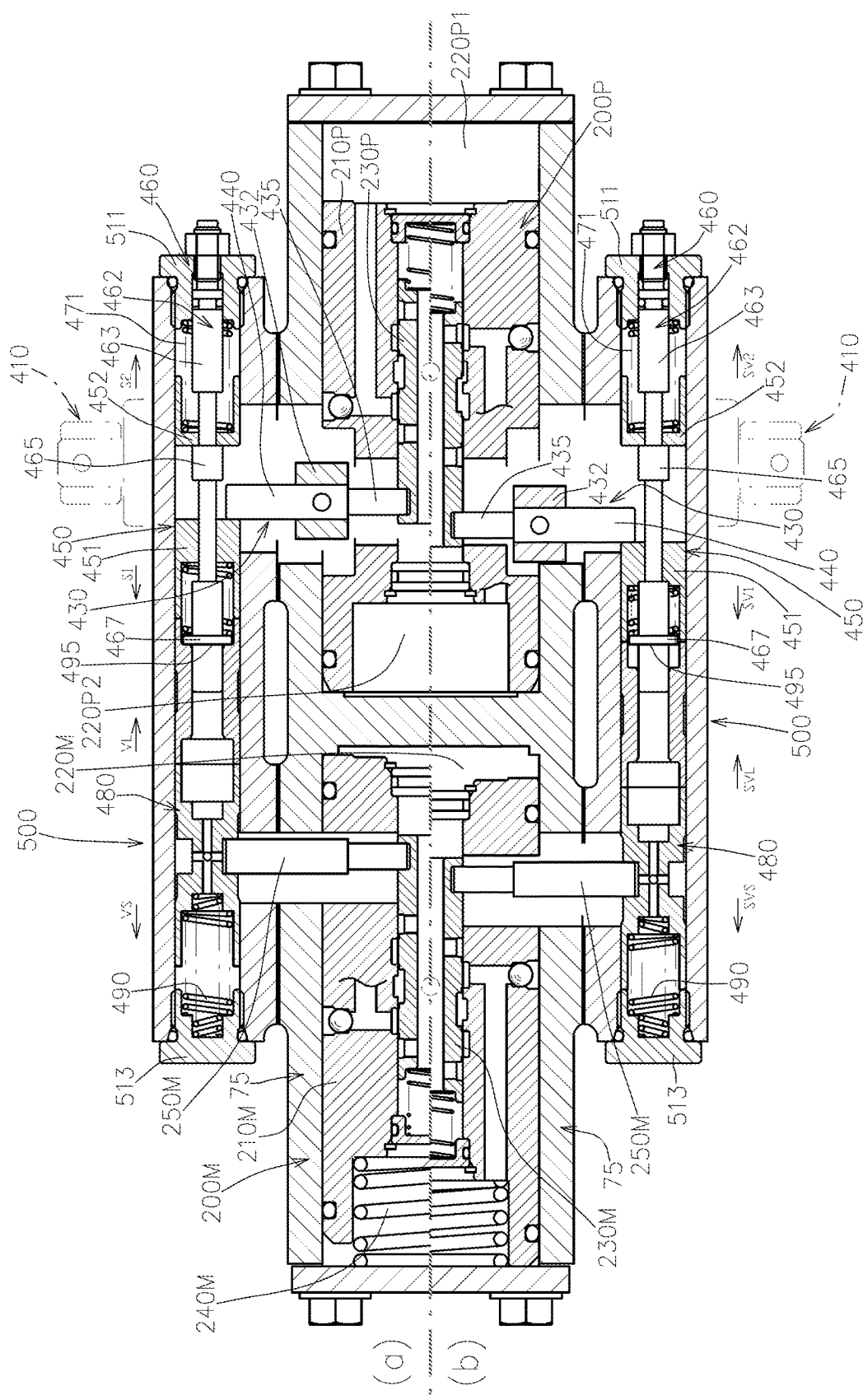

FIG. 14 is a cross-sectional view showing operating states of a pump spool, a motor spool, a pump hydraulic servo mechanism and a motor hydraulic servo mechanism in the stepless speed change structure according to the third embodiment, showing, at part (a), a state where the pump movable swash plate is tilted until a first tilting direction movement end with the motor movable swash plate held at a maximum volume position, and showing, at part (b), a state where the motor movable swash plate is tilted until a minimum volume position with the pump movable swash plate held at the first tilting direction movement end.

Figure 15:
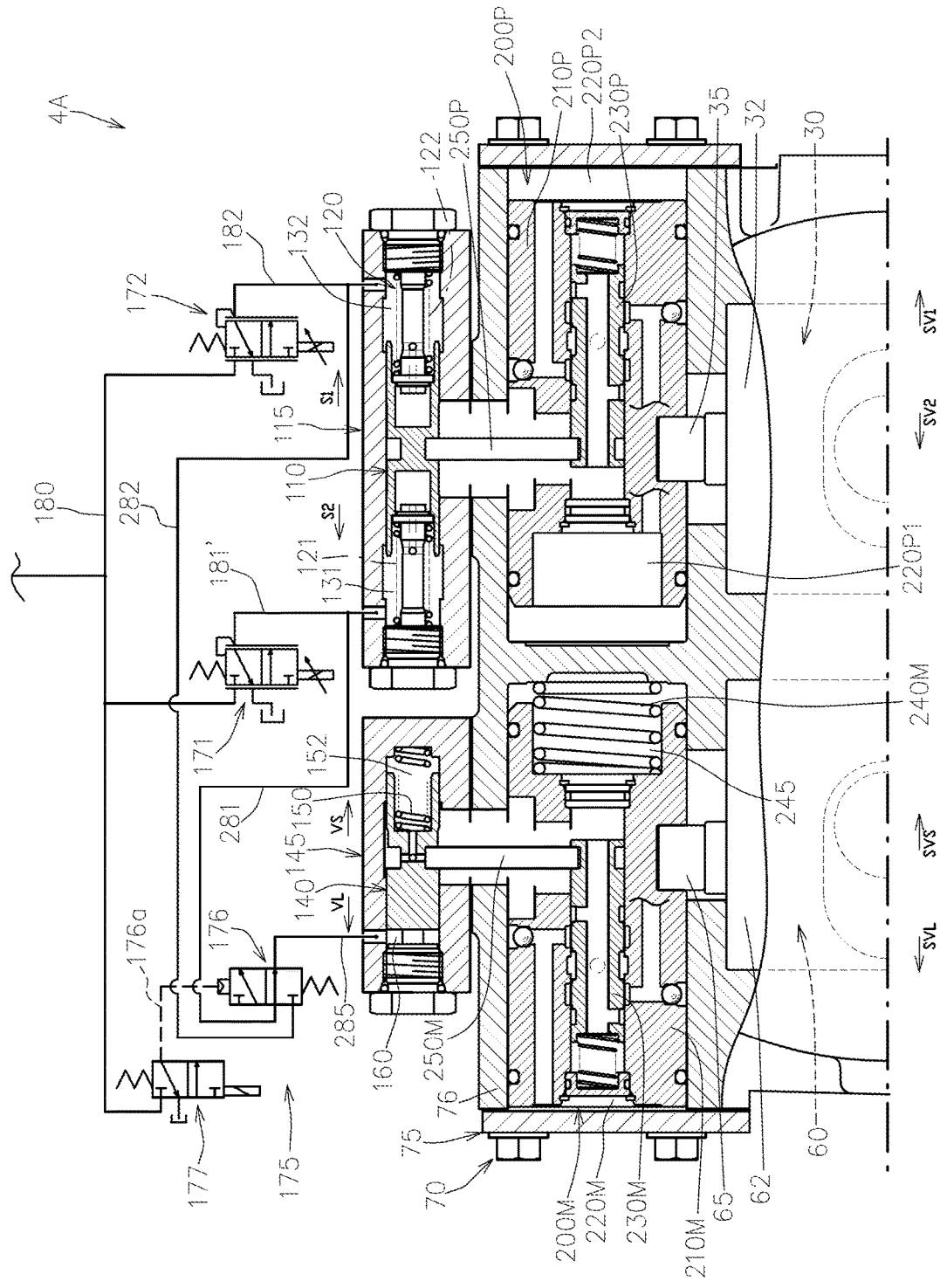

FIG. 15 is a partial cross-sectional view of a stepless speed change structure according to a fourth embodiment of the present invention.

Figure 16:
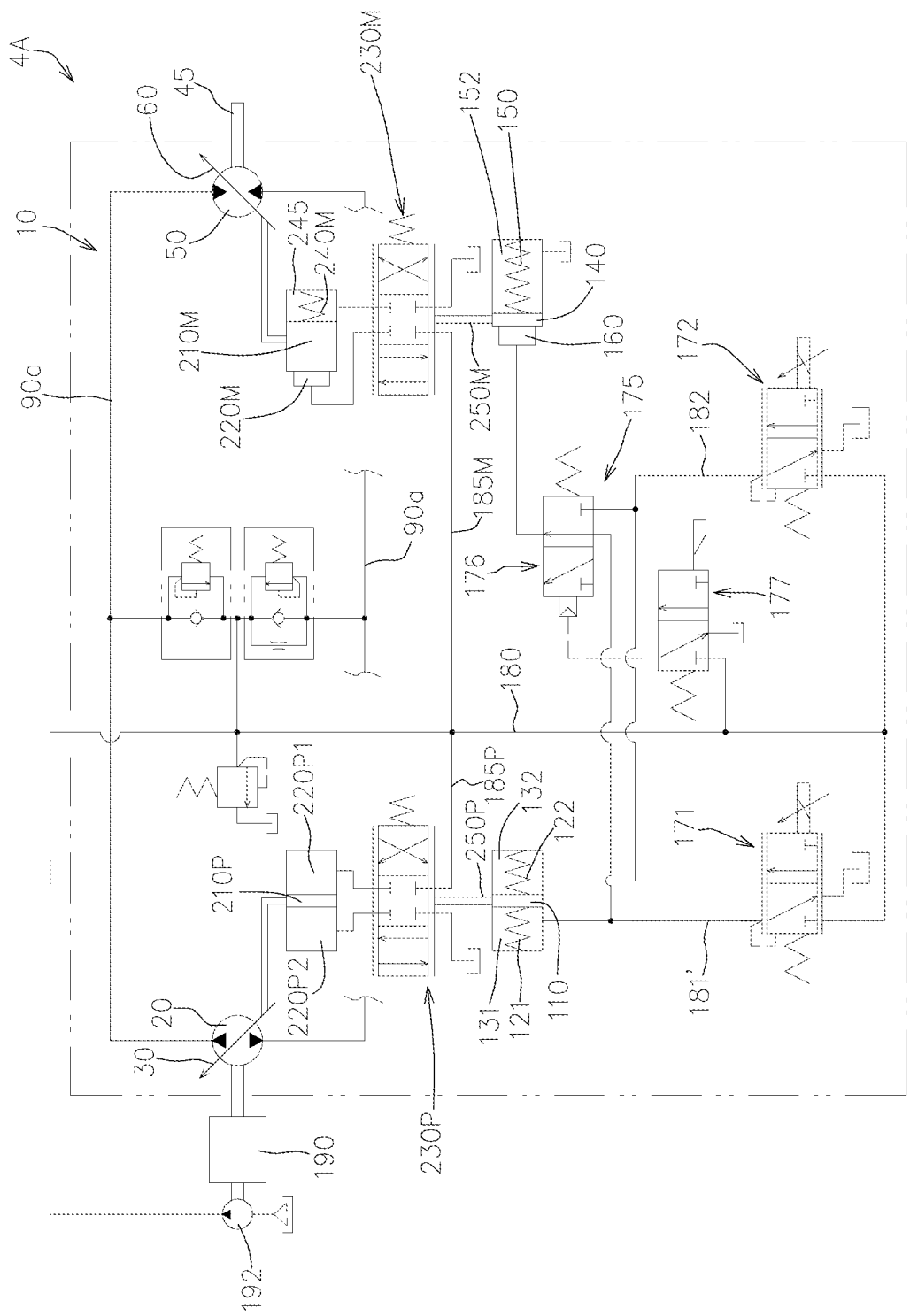

FIG. 16 is a hydraulic circuit diagram of the stepless speed change structure according to the fourth embodiment.

Figure 17:
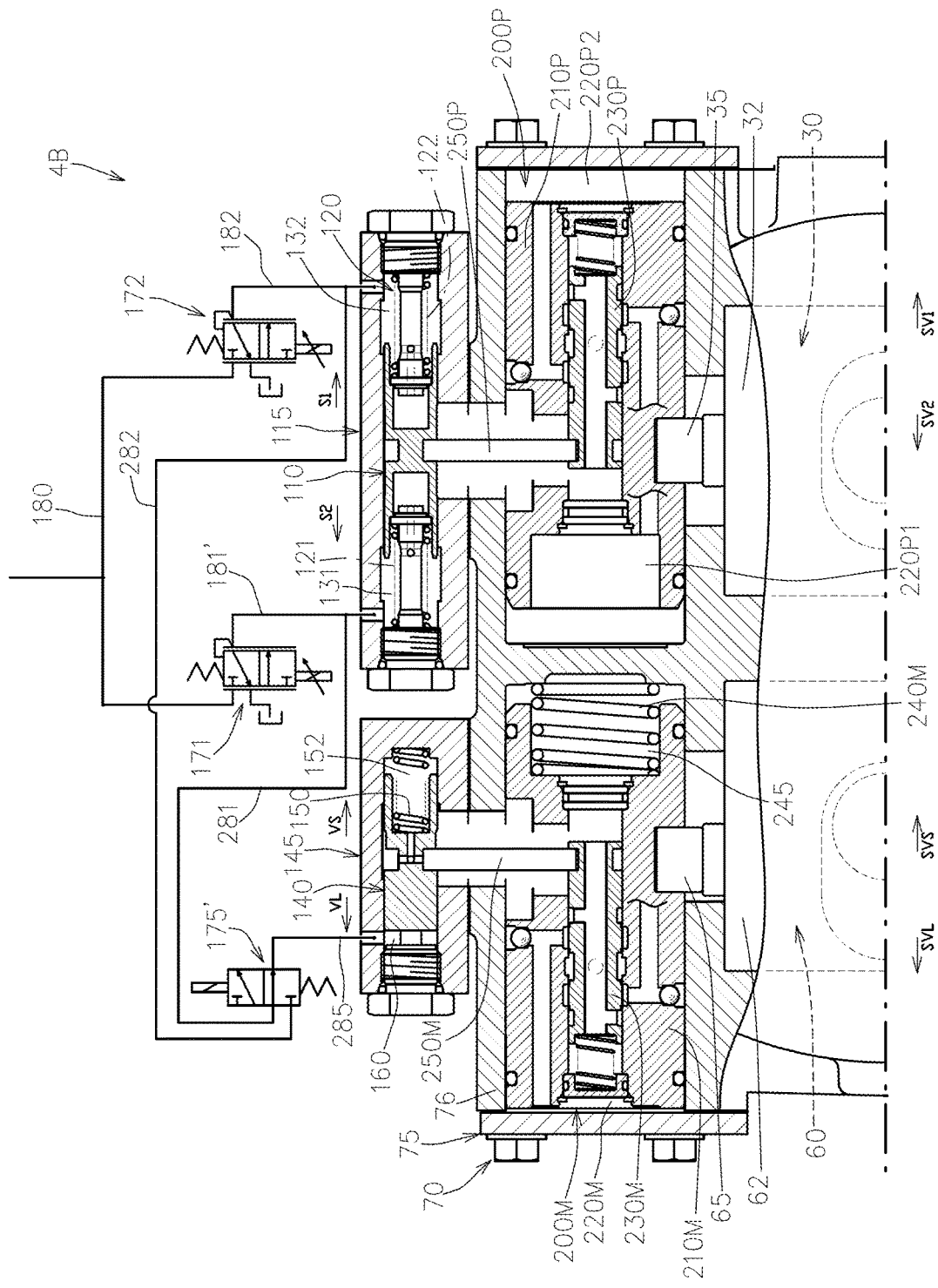

FIG. 17 is a partial cross-sectional view of a stepless speed change structure according to a first modified example of the fourth embodiment.

Figure 18:
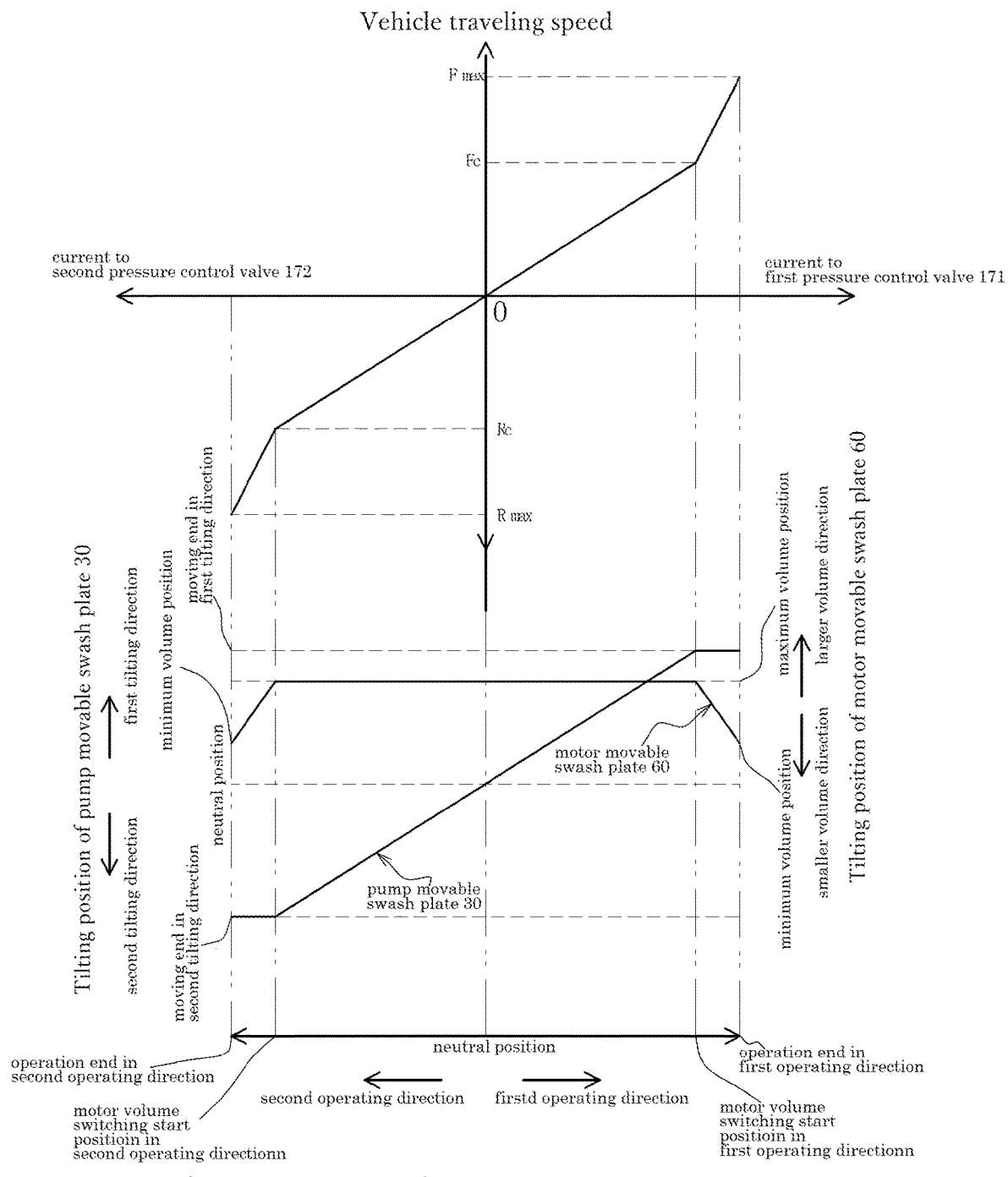

FIG. 18 is a graph illustrating a relation among the operating position of the speed change operating member, the tilting position of the pump movable swash plate, the tilting position of the motor movable swash plate and the output speed of the stepless speed change structure according to the fourth embodiment.

Figure 19:
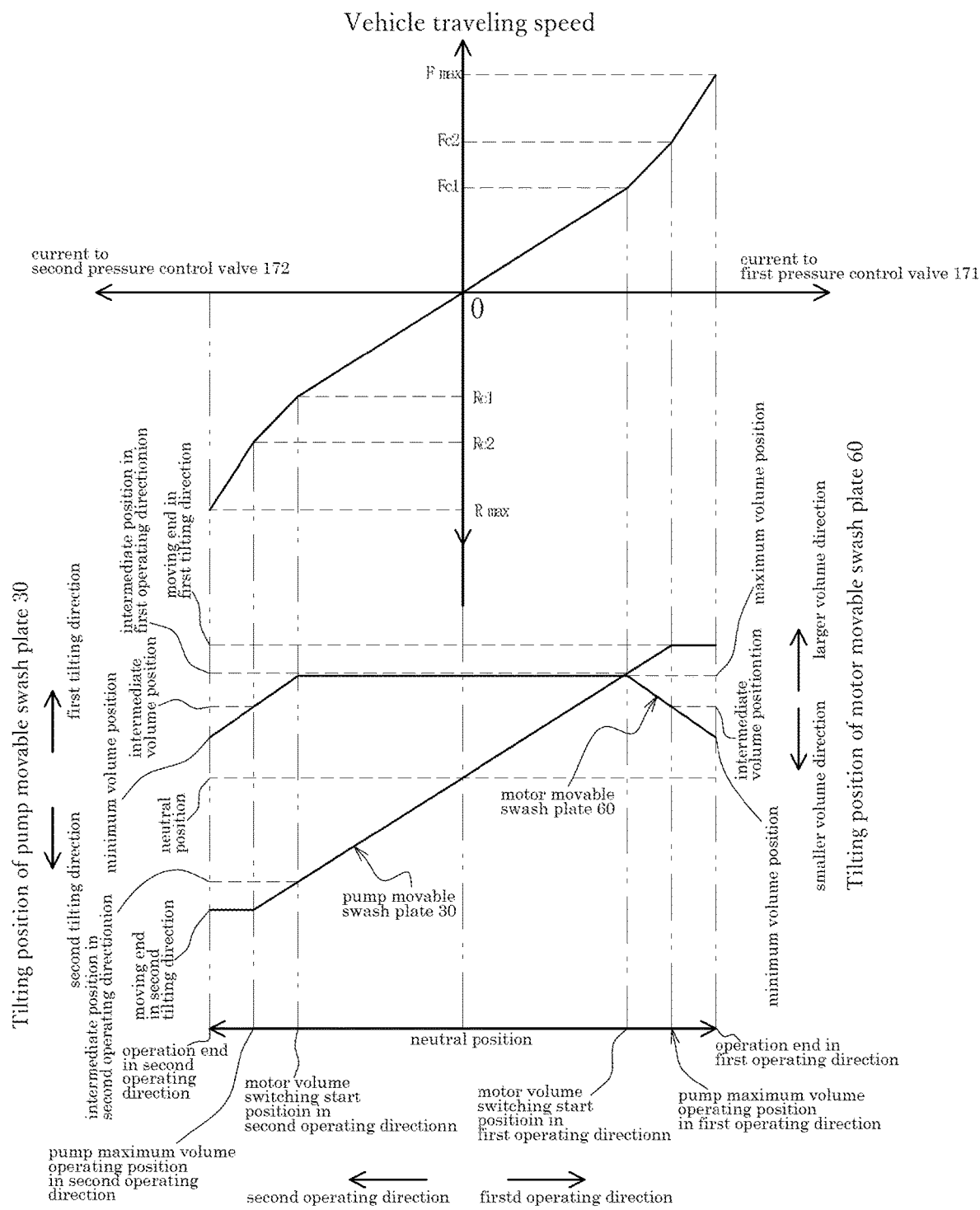

FIG. 19 is a graph illustrating a relation among the operating position of the speed change operating member, the tilting position of the pump movable swash plate, the tilting position of a motor movable swash plate and the output speed of the stepless speed change structure, in a case where the pump operation piston and the motor operation piston in the fourth embodiment are operated in accordance with another operation pattern (first modified pattern) different from that in the fourth embodiment.

Figure 20:
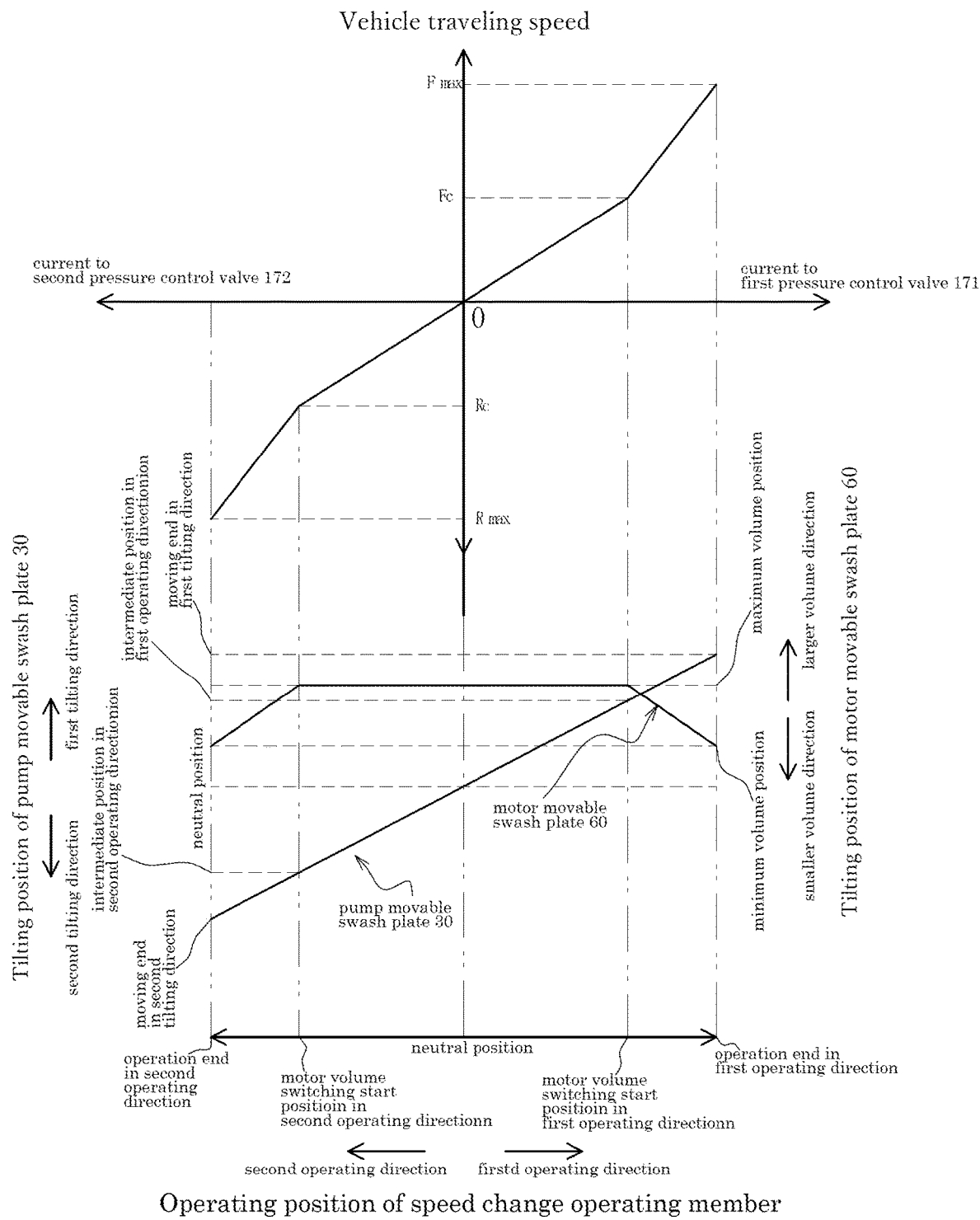

FIG. 20 is a graph illustrating a relation among the operating position of the speed change operating member, the tilting position of the pump movable swash plate, the tilting position of a motor movable swash plate and the output speed of the stepless speed change structure, in a case where the pump operation piston and the motor operation piston in the fourth embodiment are operated in accordance with still another operation pattern (second modified pattern) different from that in the fourth embodiment.

Figure 21:
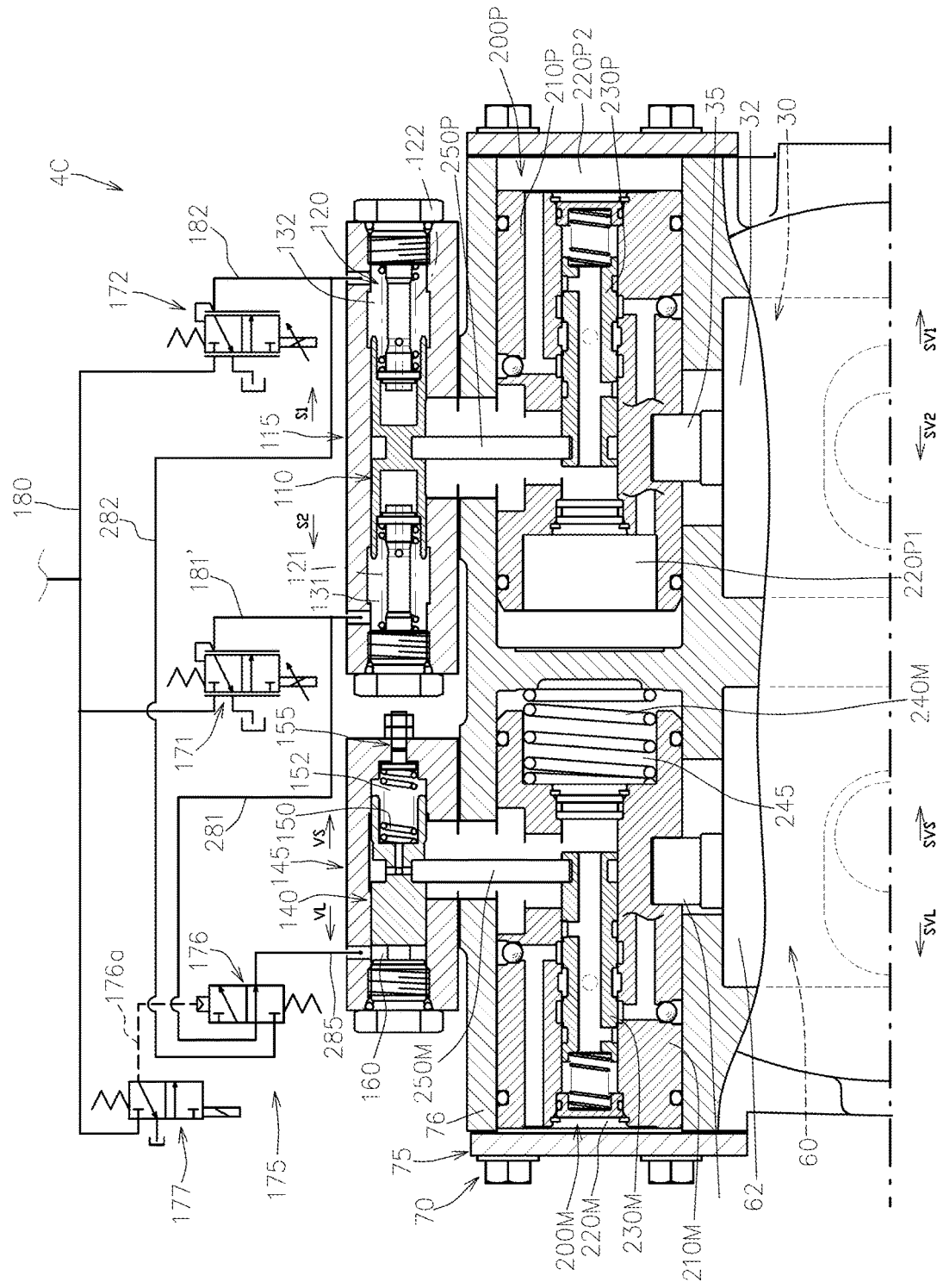

FIG. 21 is a partial cross-sectional view a stepless speed change structure according to a second modified example of the fourth embodiment.

Figure 22:
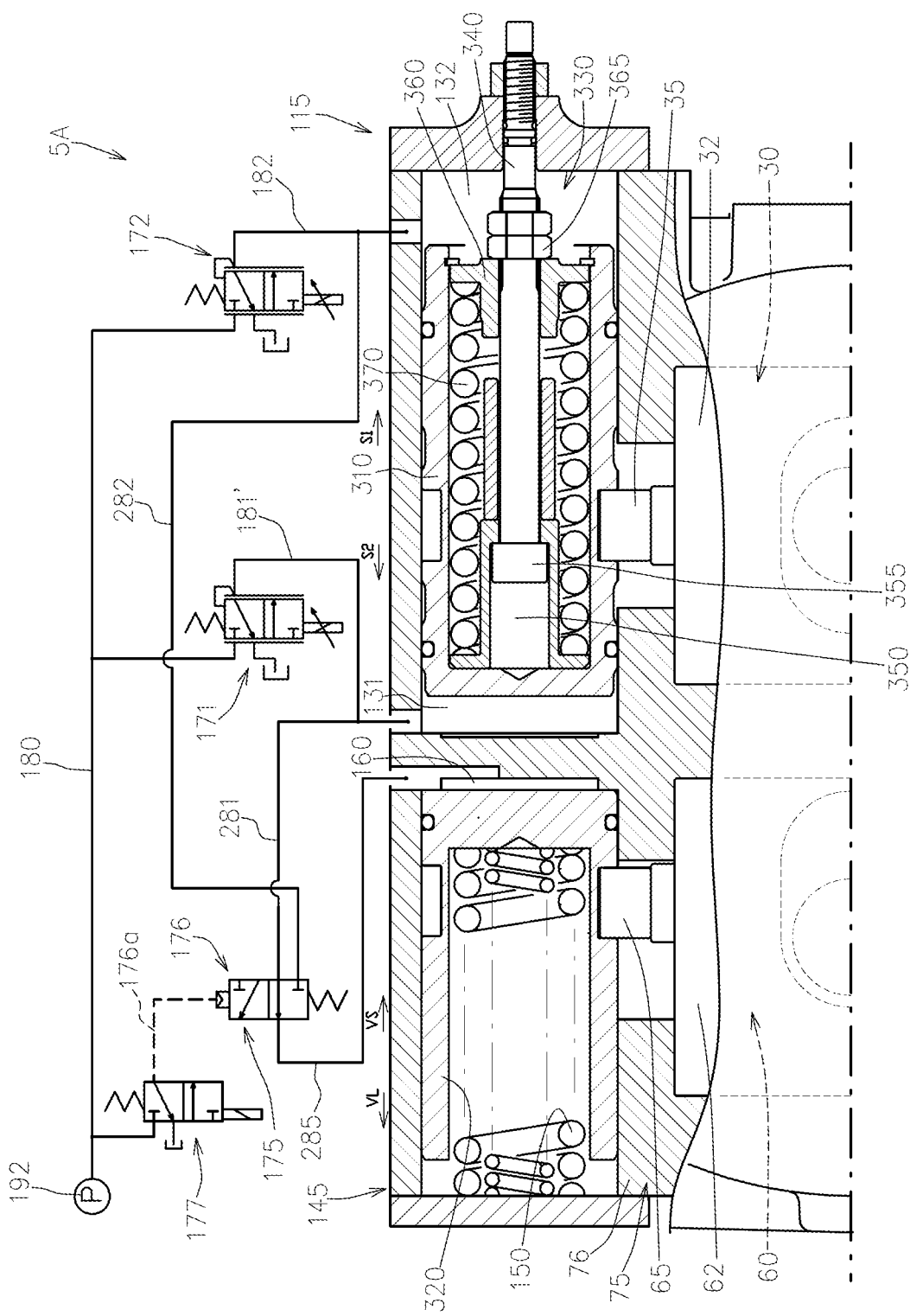

FIG. 22 is a partial cross-sectional view of a stepless speed change structure according to a fifth embodiment of the present invention.

Figure 23:
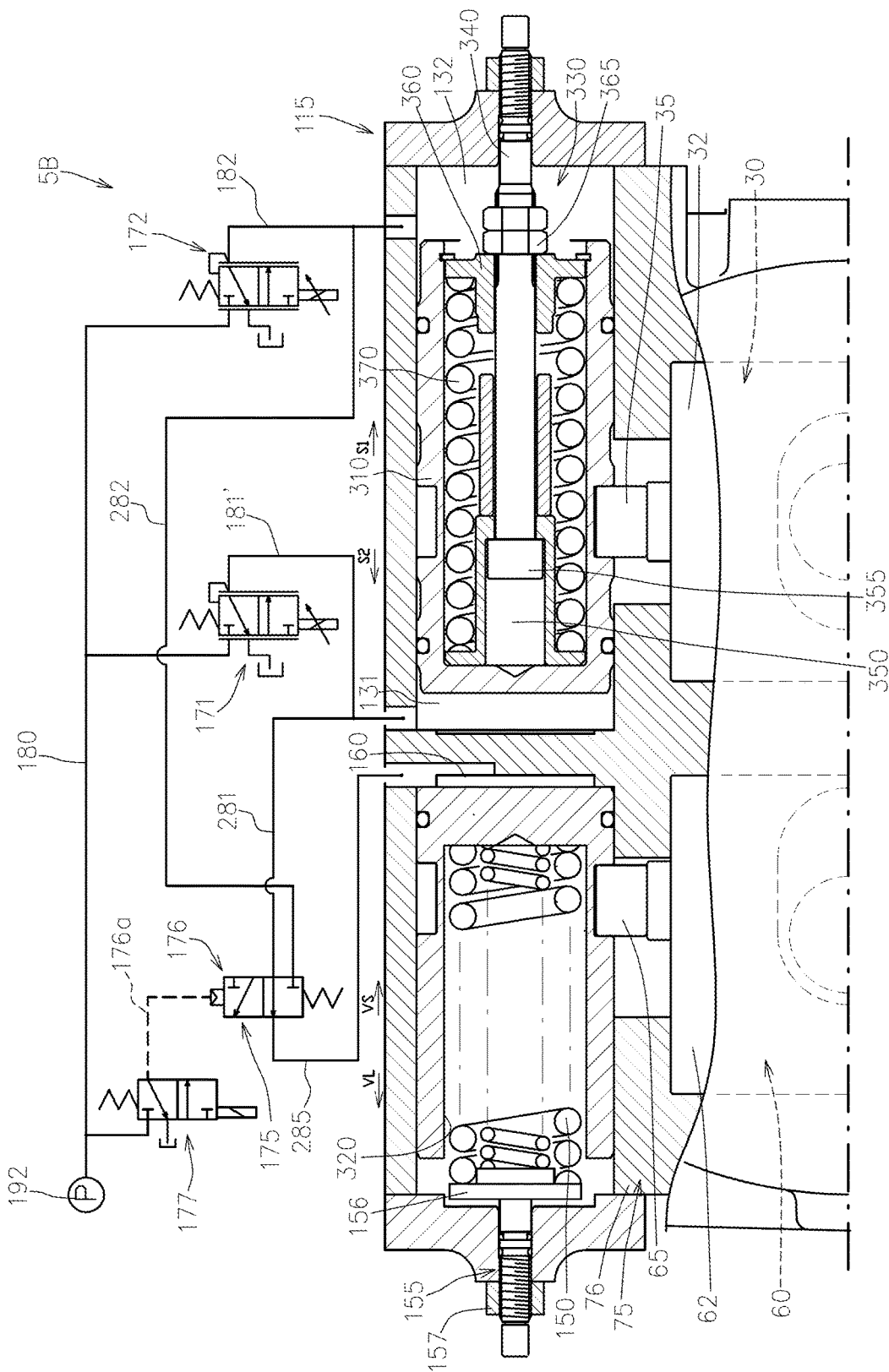

FIG. 23 is a partial cross-sectional view of a stepless speed change structure according to a modified example of the fifth embodiment.

Figure 24:
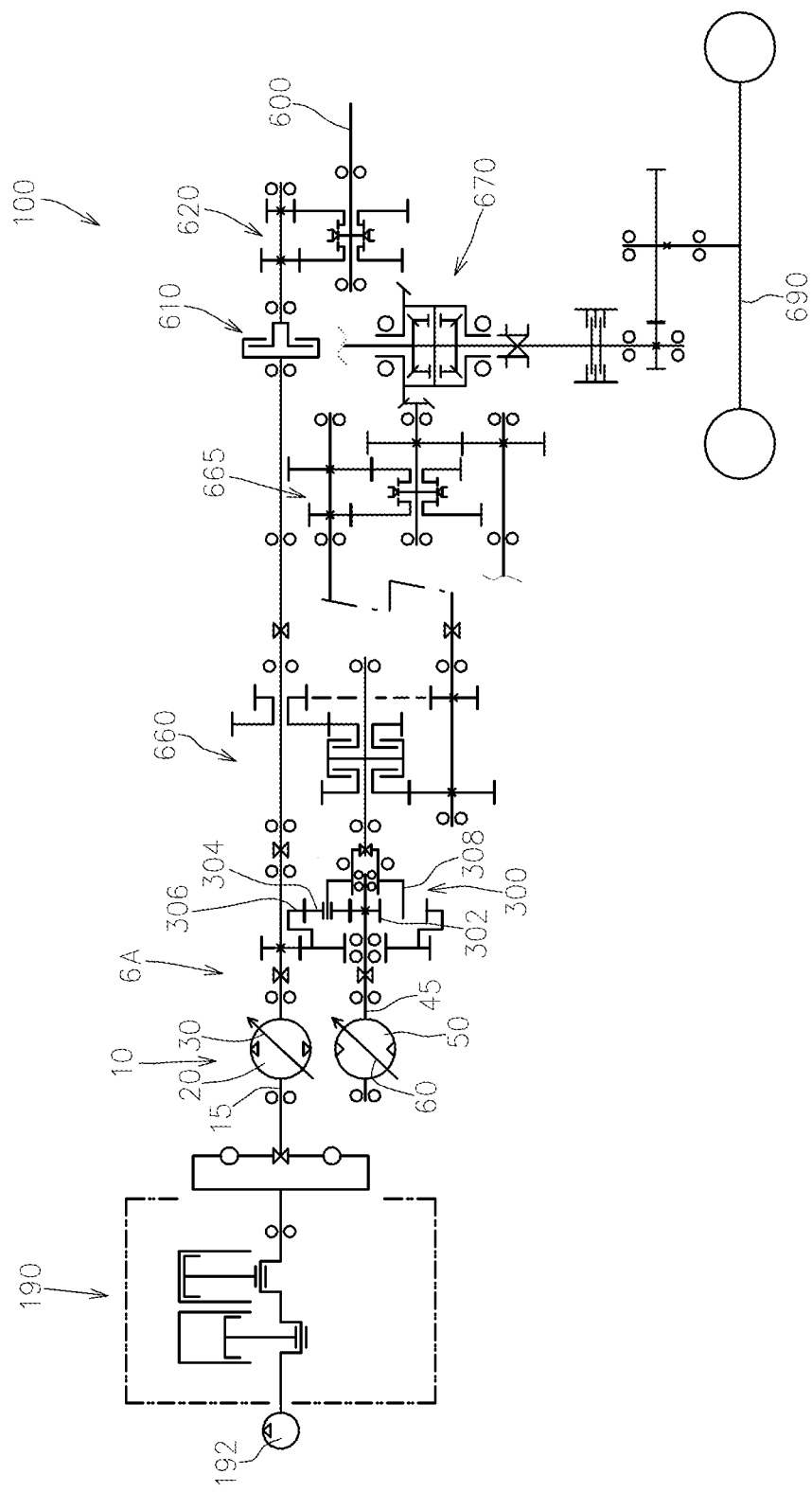

FIG. 24 is a transmission schematic diagram of a work vehicle to which a stepless speed change structure according to a sixth embodiment is applied.

Figure 25:
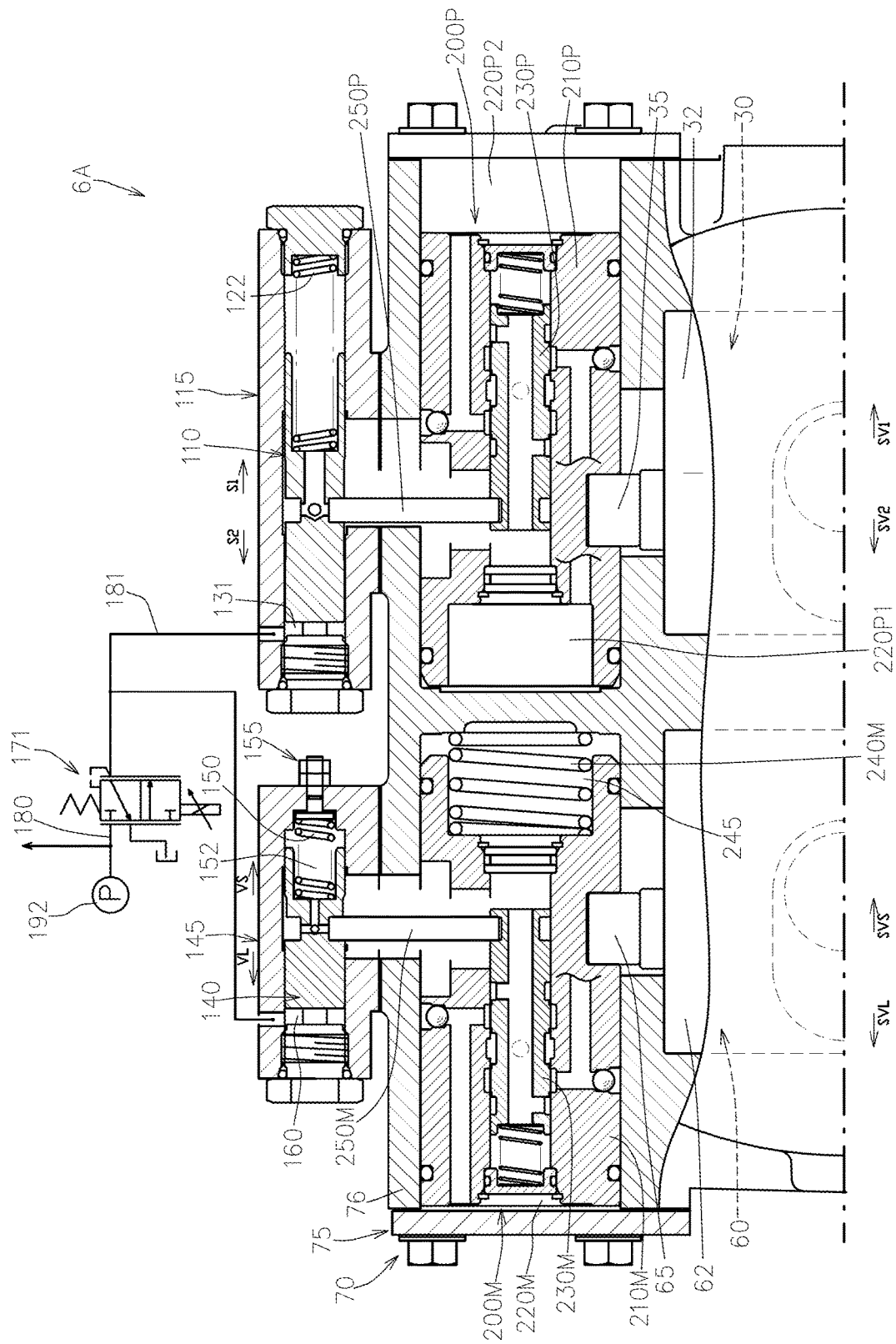

FIG. 25 is a partial cross-sectional view of the stepless speed change structure according to the sixth embodiment.

Figure 26:
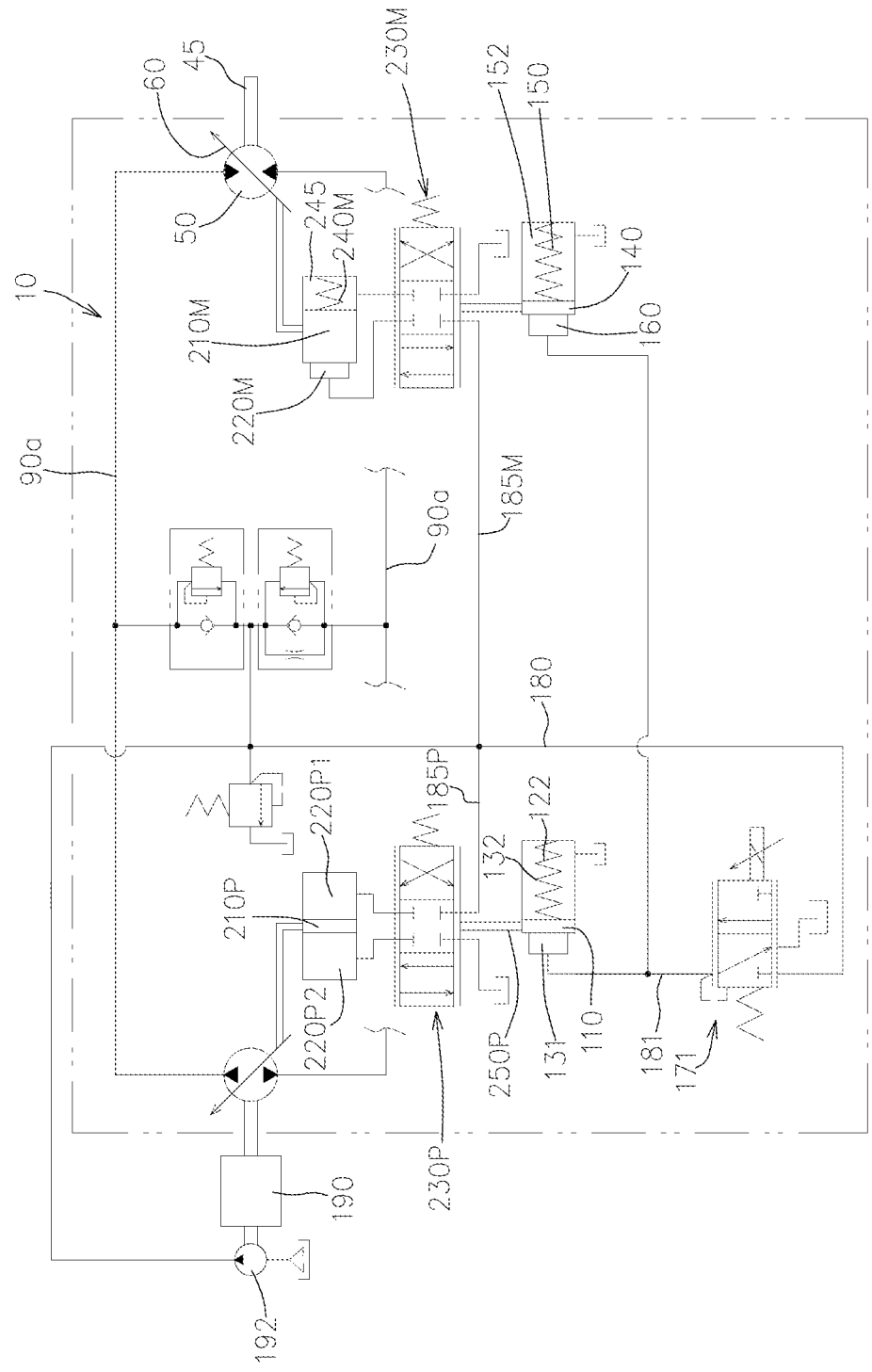

FIG. 26 is a hydraulic circuit diagram of the stepless speed change structure according to the sixth embodiment.

Figure 27:
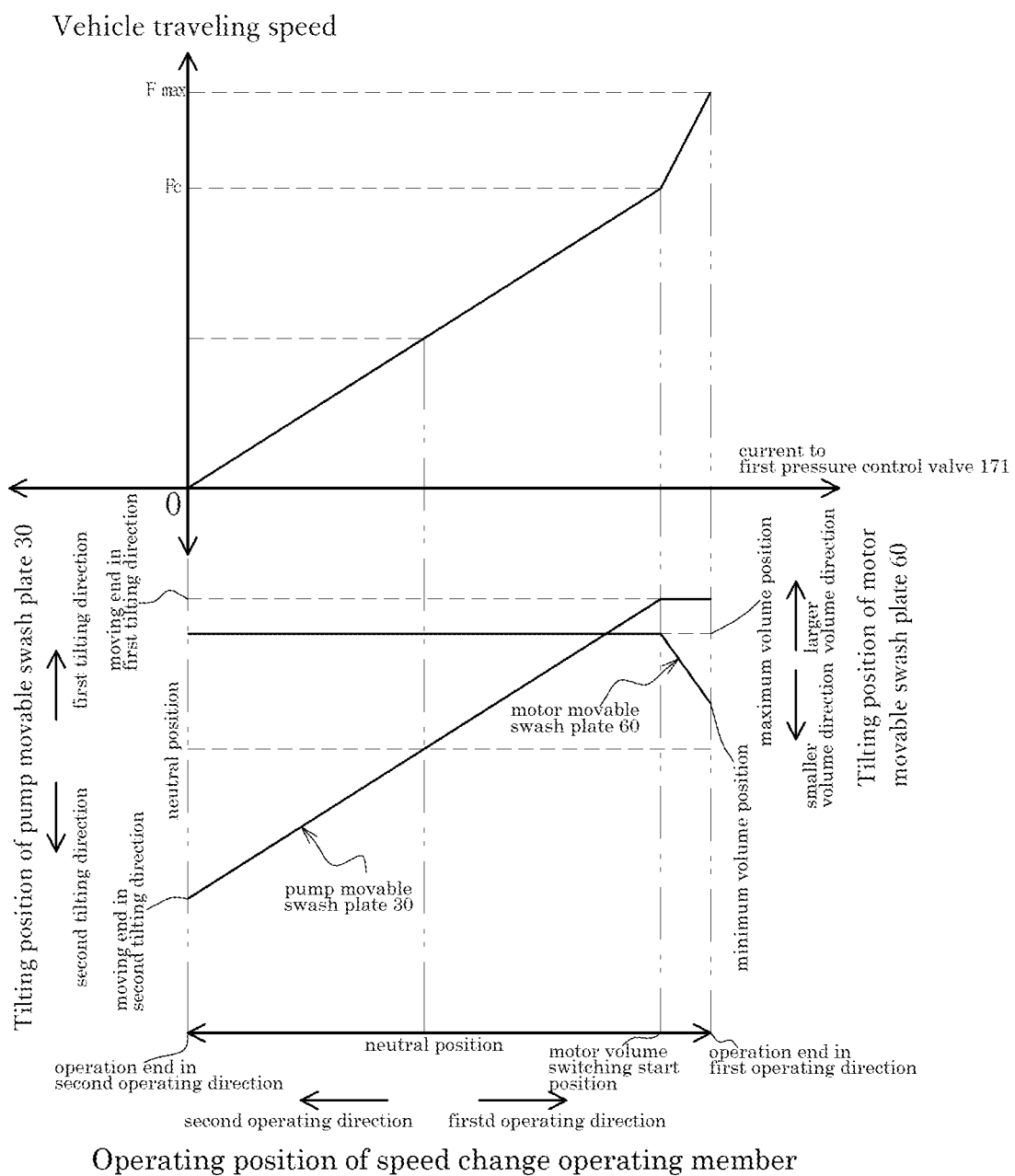

FIG. 27 is a graph illustrating a relation among the operating position of the speed change operating member, the tilting position of the pump movable swash plate, the tilting position of the motor movable swash plate and the output speed of the stepless speed change structure according to the sixth embodiment.

Figure 28:
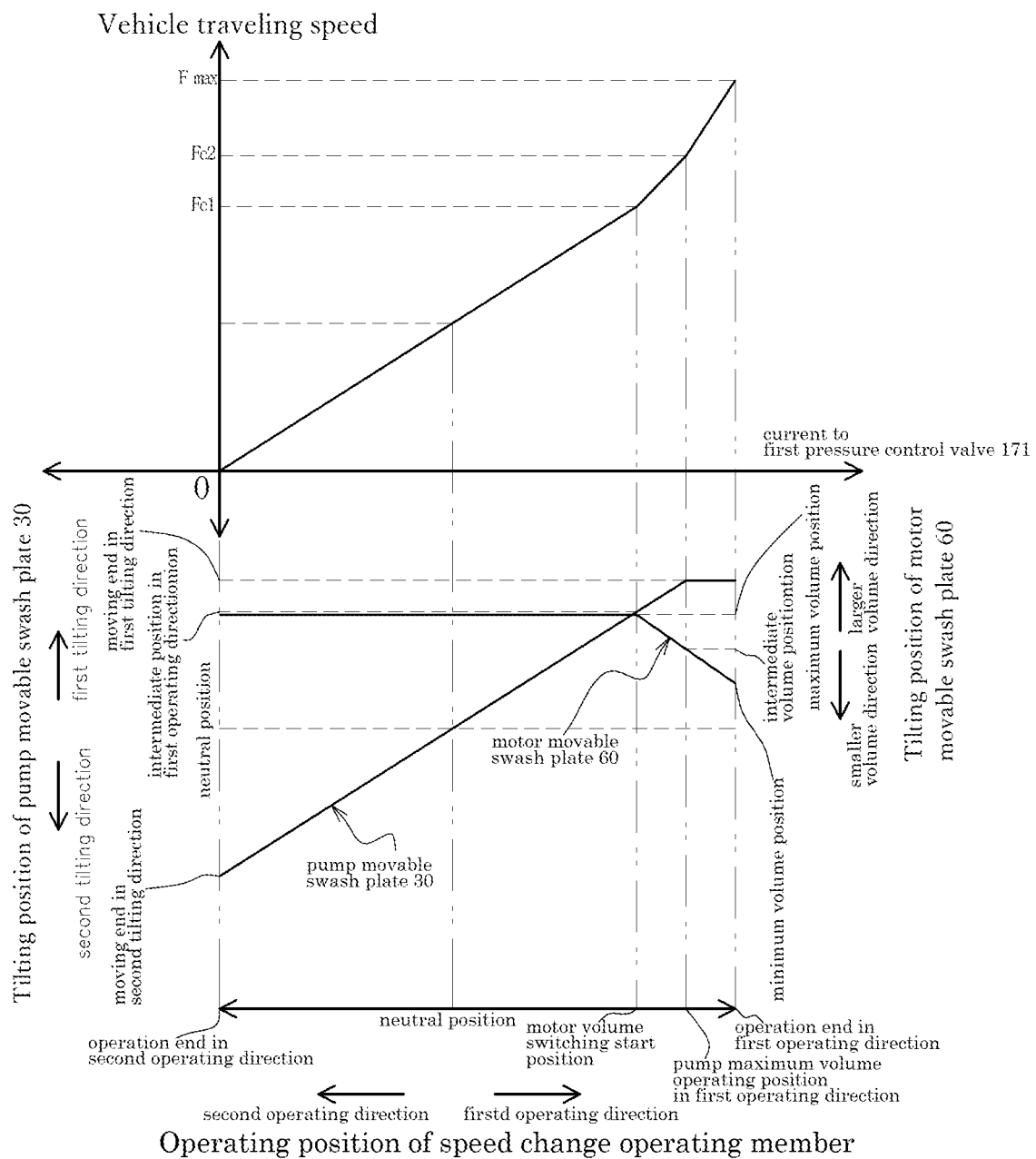

FIG. 28 is a graph illustrating a relation among the operating position of the speed change operating member, the tilting position of the pump movable swash plate, the tilting position of a motor movable swash plate and the output speed of the stepless speed change structure, in a case where the pump operation piston and the motor operation piston in the sixth embodiment are operated in accordance with another operation pattern (first modified pattern) different from that in the sixth embodiment.

Figure 29:
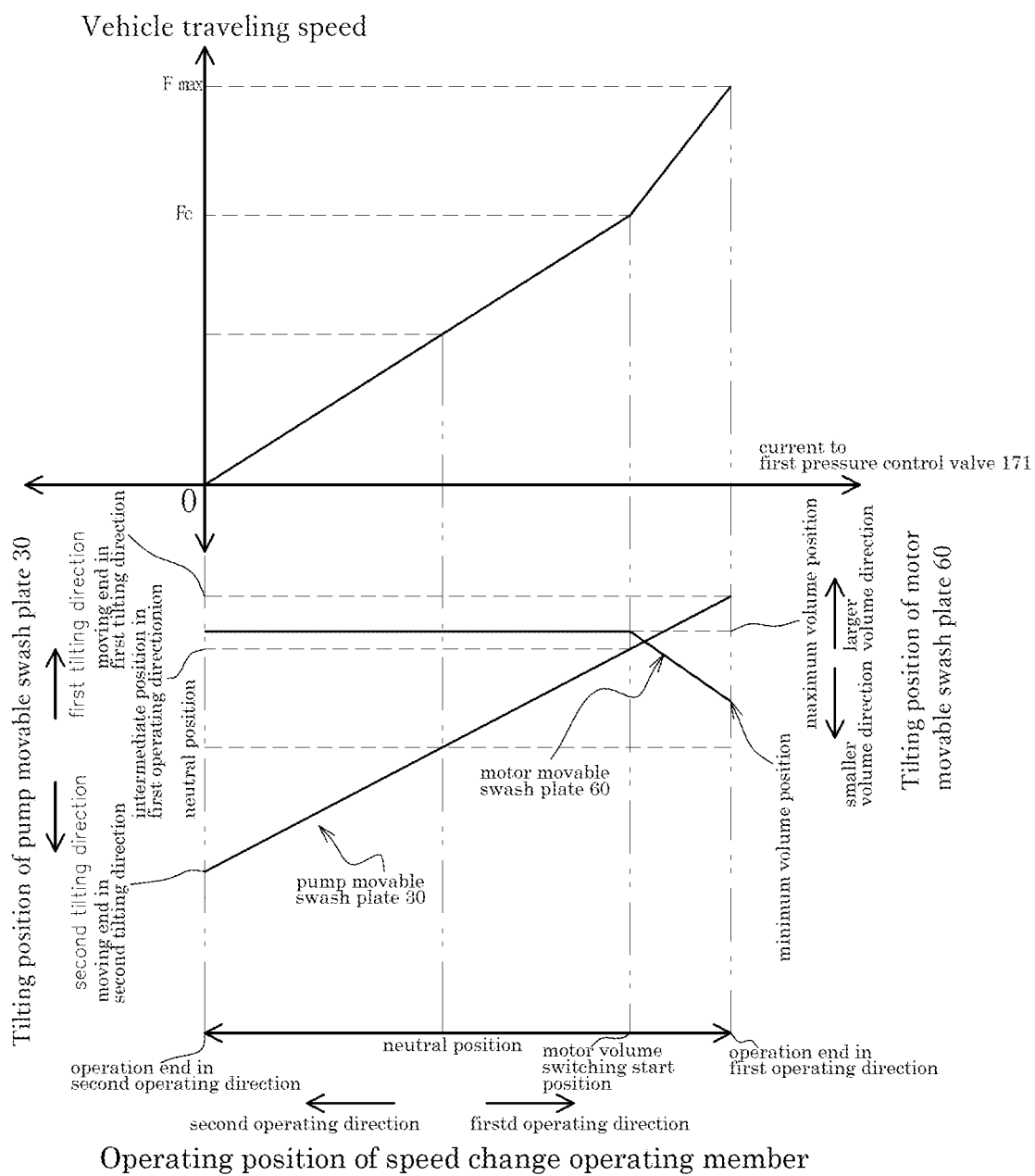

FIG. 29 is a graph illustrating a relation among the operating position of the speed change operating member, the tilting position of the pump movable swash plate, the tilting position of a motor movable swash plate and the output speed of the stepless speed change structure, in a case where the pump operation piston and the motor operation piston in the sixth embodiment are operated in accordance with still another operation pattern (second modified pattern) different from that in the sixth embodiment.

Figure 30:
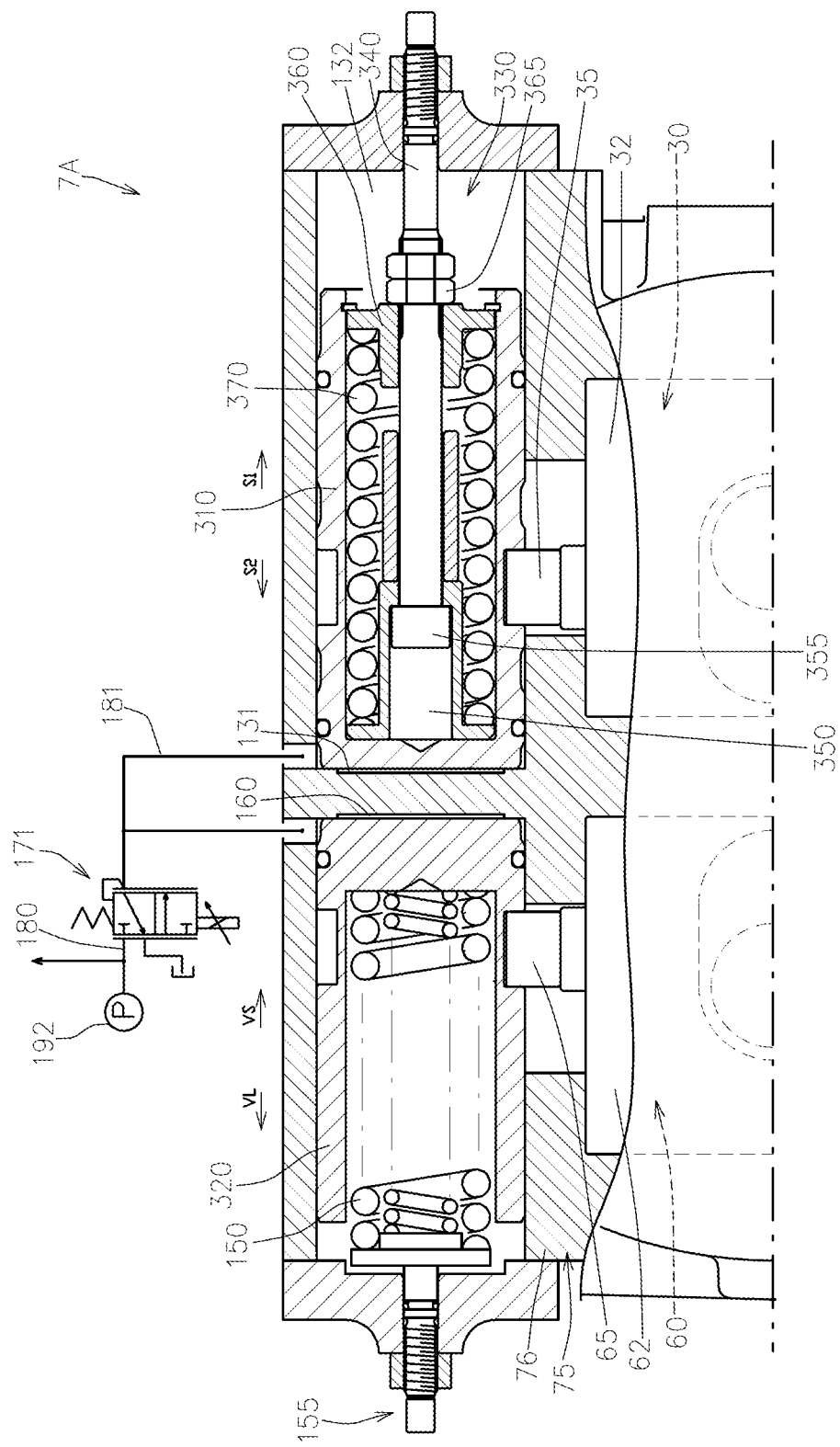

FIG. 30 is a partial cross-sectional view of a stepless speed change structure according to a seventh embodiment of the present invention.

DETAILED DESCRIPTION OF THE INVENTION

First Embodiment

Figure 1:
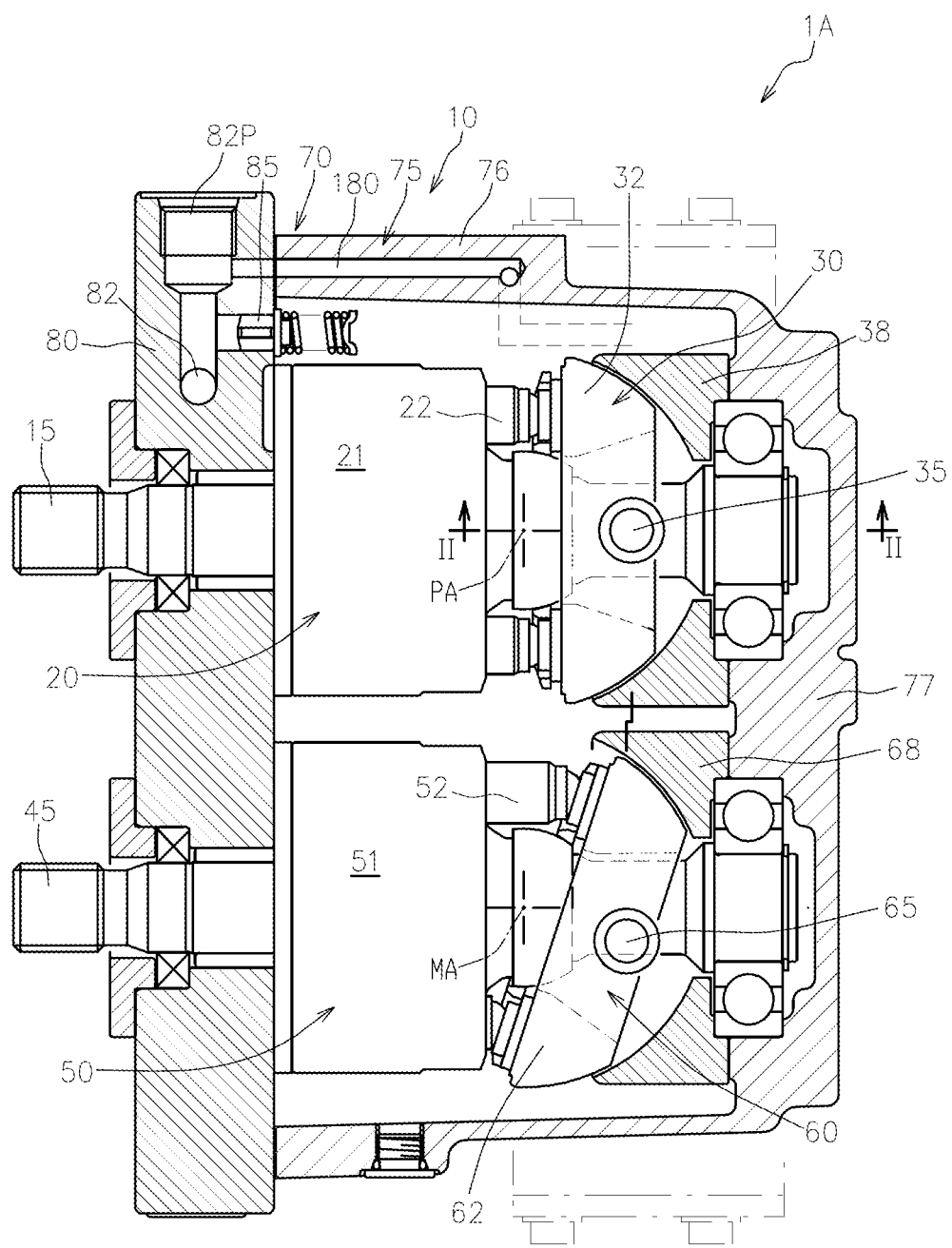
FIG. 1 is a cross-sectional view of a hydrostatic transmission (HST) in a stepless speed change structure according to a first embodiment of the present invention.

One embodiment of a stepless speed change structure according to the present invention will be described below, with reference to the accompanying drawings. FIG. 1 is a cross-sectional view of a hydrostatic transmission (HST) 10 in a stepless speed change structure 1A according to the present embodiment. Further, FIG. 2 shows a cross-sectional view along the line II-II in FIG. 1. Further, FIG. 3 shows, at part (a), a cross-sectional view along the IIIA-IIIA line in FIG. 2, and also shows, at part (b), a cross-sectional view along the line in FIG. 3.

The stepless speed change structure 1A includes the HST 10 and a speed change operating member (not shown) such as a stepless speed change lever that performs a speed change operation of the HST 10.

The HST 10 is so configured that the volume of a pump body 20 changes according to an operation of a pump volume adjusting member and the volume of the motor body 50 changes in accordance with an operation of a motor volume adjusting member.

As shown in FIG. 1, in the present embodiment, the HST 10 is of an axial piston type. That is, the HST 10 includes a pump shaft 15 that is driven to rotate around an axis line by a rotational power operatively input from a drive source (not shown), a pump body 20 that is so supported by the pump shaft 15 as to rotate around the axis line together with the pump shaft 15, a pump movable swash plate 30 that acts as the pump volume adjusting member and that changes the volume of the pump body 20 in accordance with a tilting position around a pump swing axis PA, a motor shaft 45 that outputs a rotational power whose rotational speed has been changed in a stepless manner, a motor body 50 so supported by the motor shaft 45 as to rotate together with the motor shaft 45 around an axis line, a motor movable swash plate 60 that acts as the motor volume adjusting member and that changes the volume of the motor body 50 in accordance with the tilting position around a motor swing axis MA, and a pair of HST lines (not shown) that fluidly connects the pump body 20 with the motor body 50, wherein the motor body 50 is rotated and driven by hydraulic power by the pump body 20 via the pair of HST lines.

As shown in FIG. 1, the pump body 20 includes a pump cylinder block 21 that is supported by the pump shaft 15 in a relatively non-rotatable manner with respect thereto and that has a plurality of cylinder holes placed around the axis line of the pump shaft 15, and a plurality of pump pistons 22 that is housed in the plurality of cylinder holes in a manner to freely move forward and backward and that has free end portions engaged with a swash plate body 32 of the pump movable swash plate 30.

Similarly, the motor body 50 has a motor cylinder block 51 that is supported by the motor shaft 45 in a relatively non-rotatable manner with respect thereto and that has a plurality of cylinder holes placed around the axis line of the motor shaft 45, and a plurality of motor pistons 52 that is housed in the plurality of cylinder holes in a manner to freely move forward and backward and that has free end portions engaged with a swash plate body 62 of the motor movable swash plate 60.

As shown in FIG. 1, in the present embodiment, the pump movable swash plate 30 and the motor movable swash plate 60 are cradle-type swash plates.

That is, the pump movable swash plate 30 and the motor movable swash plate 60 respectively have the swash plate bodies 32, 62 and operation end portions 35, 65.

The swash plate bodies 32, 62 have piston engaging faces, which engage with the corresponding pump piston 22 and motor piston 52, and back faces opposite the piston engaging faces, wherein the back faces are guided by guide members 38, 68 thereby to enable the swash plate bodies 32, 62 to tilt around the corresponding pump and motor swing axes PA, MA.

The operation end portions 35, 65 are provided in a manner to tilt around the corresponding pump and motor swing axes PA, MA together with the corresponding swash plate bodies 32, 62.

Alternatively, the pump movable swash plate 30 and motor movable swash plate 60 can be trunnion-type swash plates. In this case, the pump movable swash plate and the motor movable swash plate can have swash plate bodies having piston engaging faces that engage with the corresponding pump piston 22 and motor piston 52, and operation end portions (35, 65) that are positioned coaxially with the corresponding pump and motor swing axes PA, MA and that are connected to the swash plate bodies in a manner to tilt the corresponding swash plate bodies around the swing axes in accordance with rotations around the axes.

In the present embodiment, the HST 10 is capable of outputting a bidirectional rotational power, which has been speed-changed, from the motor shaft 45. That is, sandwiching a neutral position where the volume of the pump body 20 (discharge amount of the operation oil discharged from the pump body 15 in accordance with one rotation of the pump body 15) is set to zero, the pump volume adjusting member can be operated between a first operating direction movement end that rotates the motor shaft 45 at a forward direction maximum speed and a second operating direction movement end that rotates the motor shaft 45 at a reverse direction maximum speed.

As described above, in the present embodiment, the pump movable swash plate 30 is used as the pump volume adjusting member. In this case, a tilting end to one side around the pump swing axis PA (first tilting direction movement end) from the neutral position is the first operating direction movement end, and a tilting end to the other side around the pump swing axis PA (second tilting direction movement end) from the neutral position is the second operating direction movement end.

That is, when the pump volume adjusting member (the pump movable swash plate 30) is positioned in a forward rotation area on the first operating direction side (first tilting direction side) from the neutral position; as the pump volume adjusting member (the pump movable swash plate 30) is operated in the first operating direction (tilted in the first tilting direction) toward the first operating direction movement end (first tilting direction movement end), the discharge amount (forward direction discharge amount) of the operation oil discharged from the pump body 20 in the direction of rotating the motor body 50 in the forward direction increases so that the rotational speed of the motor body 50 (i.e., the motor shaft 45) in the forward rotational direction is increased, meanwhile, as the pump volume adjusting member (the pump movable swash plate 30), in the forward rotation area, is operated in the second operating direction (tilted in the second tilting direction) toward the neutral position, the forward direction discharge amount of the operation oil discharged from the pump body 20 decreases so that the rotational speed of the motor body 50 (i.e., the motor shaft 45) in the forward direction is decreased.

When the pump volume adjusting member (the pump movable swash plate 30) placed in the forward rotation area is operated in the second operating direction (tilted in the second tilting direction) thereby to be positioned in the neutral position, the discharged amount of the operation oil discharged from the pump body 20 becomes zero so that the rotational speed of the motor body 50 (i.e., the motor shaft 45) becomes zero.

Further, when the pump volume adjusting member (the pump movable swash plate 30) is positioned in a reverse rotation area on the second operating direction side (second tilting direction side) from the neutral position; as the pump volume adjusting member (the pump movable swash plate 30) is operated in the second operating direction (tilted in the second tilting direction) toward the second operating direction movement end (second tilting direction movement end), the discharged amount (reverse direction discharge amount) of the operation oil discharged from the pump body 20 in the direction of rotating the motor body 50 in the reverse direction increases so that the rotational speed of the motor body 50 (i.e., the motor shaft 45) in the reverse rotational direction is increased, meanwhile as the pump volume adjusting member (the pump movable swash plate 30), in the reverse rotation area, is operated in the first operating direction (tilted in the first tilting direction) toward the neutral position, the reverse direction discharge amount of the operation oil discharged from the pump body 20 decreases so that the rotational speed of the motor body 50 (i.e., the motor shaft 45) in the reverse direction is decreased.

The first tilting direction movement end, which is the first operating direction movement end, can be set, for example, by a first tilting direction stop member that, with the pump movable swash plate 30 caused to swing in the first tilting direction (e.g., the forward direction) on one side around the pump swing axis PA, restricts the pump movable swash plate 30 from further swinging to the one side around the pump swing axis PA. In the present embodiment, as described below, a pump servo piston 210P that operates and swings the pump movable swash plate 30 is housed, in a bidirectionally slidable manner in first and second servo directions SV1, SV2, within a pump servo space formed in a housing body 75 of an HST housing 70, and the first tilting direction stop member is formed by a portion of the pump servo space that defines a moving end of the pump servo piston 210P in the first servo direction SV1.

The second tilting direction movement end, which is the second operating direction movement end, can be set, for example, by a second tilting direction stop member that, with the pump movable swash plate 30 caused to swing in the second tilting direction (e.g., the reverse direction) on another side around the pump swing axis PA, restricts the pump movable swash plate 30 from further swinging to the other side around the pump swing axis PA. In the present embodiment, the second tilting direction stop member is formed by a portion of the pump servo space that defines a moving end of the pump servo piston 210P in the second servo direction SV2.

The motor volume adjusting member is operable between a maximum volume position to maximize the volume of the motor body 50 and a minimum volume position to minimize the volume of the motor body 50.

As described above, in the present embodiment, the motor movable swash plate 60 is used as the motor volume adjusting member. The motor movable swash plate 60 is swingable around the motor swing axis MA between the maximum volume position to maximize the volume of the motor body 50 and the minimum volume position to minimize the volume of the motor body 50.

The minimum volume position can be set, for example, by a minimum volume side stop member that, with the motor movable swash plate 60 caused to swing to one side (e.g., in a smaller volume direction) around the motor swing axis MA, restricts the motor movable swash plate 60 from further swinging to the one side around the motor swing axis MA.

In the present embodiment, as described below, the motor servo piston 210M that operates and swings the motor movable swash plate 60 is housed, in the bidirectionally slidable manner in a larger volume servo direction SVL and a smaller volume servo direction SVS, within a motor servo space formed in the housing body 75, and the minimum volume side stop member is formed by a portion of the motor servo space that defines a moving end of the motor servo piston 210M in the smaller volume servo direction SVS.

Similarly, the maximum volume position can be set, for example, by a maximum volume side stop member that, with the motor movable swash plate 60 caused to swing to another side (e.g., in a larger volume direction) around the motor swing axis MA, restricts the motor movable swash plate 60 from further swinging to the other side around the motor swing axis MA. In the present embodiment, the maximum volume side stop member is formed by a portion of the motor servo space that defines a moving end of the motor servo piston 210M in the larger volume servo direction SVL.

When the motor volume adjusting member (the motor movable swash plate 60) is positioned in the maximum volume position so that the motor body 50 is brought into a maximum volume state, the operation oil amount required to cause the motor body 50 to make one rotation around the axis increases. Meanwhile, when the motor volume adjusting member (the motor movable swash plate 60) is positioned in the minimum volume position so that the motor body 50 is brought into a minimum volume state, the operation oil amount required to cause the motor body 50 to make one rotation around the axis decreases.

Therefore, assuming that the discharge amount of the operation oil discharged from the pump body 20 is constant, as the motor volume adjusting member (the motor movable swash plate 60) is operated from the maximum volume position to the minimum volume position, the rotational speed of the motor body 50 (i.e., the motor shaft 45) increases.

In the present embodiment, as shown in FIG. 1, the HST 10 further has the HST housing 70 that houses therein the pump body 20, the pump movable swash plate 30, the motor body 50, and the motor movable swash plate 60, and that supports the pump shaft 15 and the motor shaft 45 in a rotatable manner around the respective axis lines.

The HST housing 70 has the housing body 75 provided with an opening through which the pump body 20 and the motor body 50 can be inserted, and a port block 80 so connected to the housing body 75 as to close the opening.

The housing body 75 has a circumferential wall 76 that surrounds the pump body 20 and the motor body 50, and an end wall 77 that closes one side of the circumferential wall 76 in the axial direction, and the other side of the peripheral wall 76 opposite the end wall 77 is the opening. The guide members 38, 68 are respectively placed between the swash plate bodies 32, 62 and the end wall 77.

The port block 80 is formed with oil paths that forms the pair of HST lines. Further, the port block 80 is formed with a charge oil path 82 (see FIG. 1) that forms a charge line for replenishing operation oil to the pair of HST lines. The charge oil path 82 has one end portion opening to an outer surface to form a charge port 82P. The reference numeral 85 in FIG. 1 is a charge relief valve that sets an oil pressure of the charge line.

Naturally, the present invention including the present and the following embodiments can include a radial-piston type HST 10' in place of the axial-piston type HST 10.

FIG. 4 shows a cross-sectional view of an example of the radial piston type HST 10' applicable to the stepless speed change structure according to the present invention. The HST 10' includes a pintle 80' formed with oil paths, a pump shaft 15, a pump body 20', the motor shaft 45, and a motor body 50'.

The pump body 20' has a pump cylinder 21' with a plurality of cylinder holes, which open radially outwardly, placed around the axis line, and a plurality of pump pistons 22' that is housed in the plurality of cylinder holes in a reciprocating manner to freely move forward and backward. The pump cylinder 21' is supported by the pintle 80' in a rotatable manner in a state where the pump cylinder 21' is so connected to the pump shaft 15 as to rotate together with the pump shaft 15 around the axis line.

The motor body 50' has a motor cylinder 51' with a plurality of cylinder holes, which open radially outward, placed around an axis line, and a plurality of motor pistons 52' that is housed in the plurality of cylinder holes in a reciprocating manner to freely move forward and backward. The motor cylinder 51' is supported by the pintle 80' in a rotatable manner in a state where the motor cylinder 51' is so connected to the motor shaft 45 as to rotate together with the motor shaft 45 around the axis line.

The pintle 80' is formed with a pair of HST lines 90a that fluidly connects the pump body 20' (the pump cylinder 21') with the motor body 50' (the motor cylinder 51').

The HST 10' further includes a pump movable cam ring 30' that acts as a pump volume adjusting member, and a motor movable cam ring 60' that acts as a motor volume adjusting member.

The pump movable cam ring 30' has a pump movable cam ring body 32' that has an inner circumferential face, which engages with outer end portions of the plurality of pump pistons 22' in the pump body 20', and that is swingable around a pump swing shaft 39', and an operation end portion 35' that swings the pump movable cam ring body 32' around the pump swing shaft 39'.

According to an operation on the operation end portion 35', the pump movable cam ring 30' is swingable in a first operating direction on one side and a second operating direction on the other side around the pump swing shaft 39', with sandwiching the neutral position where the central position of the pump movable cam ring body 32' matches the central position of the pump cylinder 21'.

The motor movable cam ring 60' has a motor movable cam ring body 62' that has an inner circumferential face, which engages with outer end portions of the plurality of motor pistons 52' in the motor body 51', and that is swingable around a motor swing shaft 69', and an operation end portion 65' that swings the motor movable cam ring body 62' around the motor swing shaft 69'.

According to an operation on the operation end portion 65', the motor movable cam ring 60' is operable, around the motor swing shaft 69', between a minimum volume position that brings the motor body 50' in a minimum volume state, and a maximum volume position that brings the motor body in a maximum volume state. In the illustrated embodiment, the pump swing shaft 39' and the motor swing shaft 69' are formed by a single common shaft.

As shown in FIG. 3, the stepless speed change structure 1A further includes a pump operation piston 110, a neutral spring mechanism 120, first and second slide oil chambers 131, 132, a motor operation piston 140, a larger volume operation spring 150, and a smaller volume operating oil chamber 160.

The pump operation piston 110 is movable bidirectionally in a first slide direction S1 on one side in the axial direction and a second slide direction S2 on the other side in the axial direction, and is operatively connected to the operation end portion of the pump volume adjusting member such that the pump volume adjusting member is operated in the first operating direction in accordance with the movement of the pump operation piston 110 in the first slide direction S1, and at the time point when the pump operation piston 110 is positioned at the first slide direction movement end, the pump volume adjusting member is positioned at the first operating direction movement end, meanwhile the pump volume adjusting member is operated in the second operating direction in accordance with the movement of the pump operation piston 110 in the second slide direction S2, and at the time point where the pump operation piston 110 is positioned at the second slide direction movement end, the pump volume adjusting member is positioned at the second operating direction movement end.

As described above, in the present embodiment, the HST 10 is of the axial piston type, and has the pump movable swash plate 30 as the pump volume adjusting member. In this case, a moving end of the pump movable swash plate 30 in the first tilting direction around the pump swing axis PA corresponds to the first operating direction movement end of the pump volume adjusting member, meanwhile a moving end of the pump movable swash plate 30 in the second tilting direction around the pump swing axis PA corresponds to the second operating direction movement end of the pump volume adjusting member.

As shown in FIG. 3, in the present embodiment, the pump operation piston 110 is indirectly connected to the operation end portion of the pump volume adjusting member (in the present embodiment, the operation end portion 35 of the pump movable swash plate 30) via a pump hydraulic servo mechanism 200P. The configuration of the pump hydraulic servo mechanism 200P is to be described below.

The neutral spring mechanism 120 is so configured as to hold the pump operation piston 110 in the neutral position when no external force is added to the pump operation piston 110 meanwhile as to generate a biasing force toward the neutral position when the pump operation piston 110 is moved in the first and second slide directions S1, S2 from the neutral position that corresponds to the neutral position of the pump movable swash plate 30.

As shown in FIG. 3, in the present embodiment, the neutral spring mechanism 120 has first and second slide springs 121, 122 that bias the pump operation pistons 110 in the first and second slide directions 51, S2, respectively. The first and second slide springs 121, 122 have biasing forces set in such a manner as to hold the pump operation piston 110 at the neutral position when no external force is added to the pump operation piston 110.

As shown in FIG. 3, in the present embodiment, proximal end sides (opposite sides to distal end sides engaging with the pump operation piston 110) of the first and second slide springs 121, 122 are engaged with position adjusting plugs, and the respective biasing forces can be adjusted by the position adjusting plugs.

The first and second slide oil chambers 131, 132 are so configured that pressure oil, which has been supplied thereinto, presses and moves the pump operation piston 110 in the first and second slide directions 51, S2, respectively, against the biasing force of the neutral spring mechanism 120.

In the present embodiment, the first slide oil chamber 131 is so configured that pressure oil, which has been supplied thereinto, presses and moves the pump operation piston 110 in the first slide direction S1 against the biasing force of the second slide spring 122.

Meanwhile, the second slide oil chamber 132 is so configured that pressure oil, which has been supplied thereinto, presses and moves the pump operation piston 110 in the second slide direction S2 against the biasing force of the first slide spring 121.

As shown in FIG. 3, a pump operation piston case 115, which houses therein the pump operation piston 110, is connected to the HST housing 70.

In detail, the pump operation piston case 115 has a housing space that houses therein the pump operation piston 110, and the pump operation piston 110, while defining the first and second slide oil chambers 131, 132, is housed in the housing space in a state of being movable in the first and second slide directions S1, S2.

As described above, in the present embodiment, the neutral spring mechanism 120 has the first and second slide springs 121, 122, and the first and second slide springs 121, 122 are respectively placed in the first and second slide oil chambers 131, 132.

The motor operation piston 140 is movable bidirectionally in a smaller volume direction VS on one side and a larger volume direction VL on the other side in the axial direction. The motor operation piston 140 is operatively connected to the operation end portion of the motor volume adjusting member such that the motor volume adjusting member is operated in the larger volume direction in accordance with the movement of the motor operation piston 140 in the larger volume direction VL, and is positioned at the maximum volume position in accordance with the positioning of the motor operation piston 140 at the maximum volume position which is a movement end in the larger volume direction VL, meanwhile the motor volume adjusting member is operated in the smaller volume direction in accordance with the movement of the motor operation piston 140 in the smaller volume direction VS, and is positioned at the minimum volume position in accordance with the positioning of the motor operation piston 140 at the minimum volume position which is the movement end in the smaller volume direction VS.

As described above, the HST 10 is of the axial piston type, and has the motor movable swash plate 60 as the motor volume adjusting member. In this case, a moving end of the motor movable swash plate 60 in the larger volume direction around the motor swing axis MA corresponds to the maximum volume position of the motor volume adjusting member, and a moving end of the motor movable swash plate 60 in the smaller volume direction around the motor swing axis MA corresponds to the minimum volume position of the motor volume adjusting member.

As shown in FIG. 3, in the present embodiment, the motor operation piston 140 is indirectly connected to the operation end portion of the motor volume adjusting member (in the present embodiment, the operation end portion 65 of the motor movable swash plate 60) via a motor hydraulic servo mechanism 200M. The configuration of the motor hydraulic servo mechanism 200M is to be described below.

The larger volume operation spring 150 biases the motor operation piston 140 in the larger volume direction VL toward the maximum volume position which is the initial reference position. Herein, the maximum volume position of the motor operation piston 140 is a position that causes the motor movable swash plate 60 to be positioned at the maximum volume position.

The smaller volume operating oil chamber 160 is so configured that pressure oil, which has been supplied thereinto, presses and moves the motor operation piston 140 in the smaller volume direction VS against the biasing force of the larger volume operation spring 150.

As shown in FIG. 3, a motor operation piston case 145, which houses therein the motor operation piston 140, is connected to the HST housing 70.

In detail, the motor operation piston case 145 has a housing space that houses therein the motor operation piston 140, and the motor operation piston 140, while defining the smaller volume operating oil chamber 160 and a spring chamber 152 on the opposite side of the smaller volume operating oil chamber 160, is housed in the housing space in an axially bidirectionally movable manner. The larger volume operation spring 150 is placed in the spring chamber 152.

The stepless speed change structure 1A further includes a first pressure control valve 171 that commonly switches the supplying and discharging of the pressure oil to and from the first slide oil chamber 131 and the smaller volume operating oil chamber 160 according to the operation of the speed change operating member, and a second pressure control valve 172 that switches the supplying and discharging of the pressure oil to and from the second slide oil chamber 132 according to the operation of the speed change operating member.

The first pressure control valve 171 is so configured as to take a supplying position that supplies the pressure oil from a pressure oil source to both the first slide oil chamber 131 and the smaller volume operating oil chamber 160, and a discharging position that discharges the pressure oil from both the first slide oil chamber 131 and the smaller volume operating oil chamber 160. In the present embodiment, the first pressure control valve 171 is of a depressurizing valve type, and is so configured that as a control current to an electromagnetic solenoid illustrated in FIG. 3 is increased, the oil pressures of the first slide oil chamber 131 and the smaller volume operating oil chamber 160, to which the pressure oil is supplied, increase.

The second pressure control valve 172 is so configured as to take a supplying position that supplies the pressure oil from the pressure oil source to the second slide oil chamber 132, and a discharging position that discharges the pressure oil from the second slide oil chamber 132. In the present embodiment, the second pressure control valve 172 is also of the depressurizing valve type, and is so configured that as the control current to the electromagnetic solenoid illustrated in FIG. 3 is increased, the oil pressure of the second slide oil chamber 132, to which the pressure oil is supplied, increases.

The stepless speed change structure 1A further includes a control device (not shown) that, according to the operating state of the speed change operating member, controls the first and second pressure control valves 171, 172.

The control device, for example, based on a signal from an operation position sensor that detects the operating position of the speed change operating member, controls the operation of the first and second pressure control valves 171, 172.

The biasing forces of the neutral spring mechanism 120 and the larger volume operation spring 150 are set as follows. That is, the biasing forces of the neutral spring mechanism 120 and the larger volume operation spring 150 are so set that, after the pressure oil within the first slide oil chamber 131 causes the pump operation piston 110 to move in the first slide direction S1 so that the neutral spring mechanism 120 is brought into a predetermined retained-elastic state, the pressure oil within the smaller volume operating oil chamber 160 where supply and discharge of the pressure oil is performed in conjunction with the first slide oil chamber 131 causes the motor operation piston 140 to start moving in the smaller volume direction VS while compressing the larger volume operation spring 150.

As described above, in the present embodiment, the neutral spring mechanism 120 has the first and second slide springs 121, 122, and when the pump operation piston 110 is pressed and moved from the neutral position to the first slide direction S1, the second slide spring 122 is elastically deformed (compressively deformed).

Therefore, in the present embodiment, the biasing forces of the second slide spring 122 and larger volume operation spring 150 are so set that, after the pressure oil within the first slide oil chamber 131 causes the pump operation piston 110 to move in the first slide direction S1 so that the second slide spring 122 is brought into a predetermined compressed state, the pressure oil within the smaller volume operating oil chamber 160 causes the motor operation piston 140 to start moving in the smaller volume direction VS while compressing the larger volume operation spring 150.

In the present embodiment, the timing at which the motor operation piston 140 starts to move in the smaller volume direction VS is set as a timing at which the pump operation piston 110 is positioned at the first slide direction movement end, and accordingly, the pump movable swash plate 30 is positioned at the first tilting direction movement end.

FIG. 5 shows a graph illustrating a relation among the operating position of the speed change operating member, the output speed of the stepless speed change structure 1A (vehicle traveling speed in a case where the stepless speed change structure 1A is used for a travel system transmission path of a work vehicle), the tilting position of the pump movable swash plate 30, and the tilting position of the motor movable swash plate 60.

As shown in FIG. 5, when the speed change operating member is positioned at the neutral position, the control device stops the control current to the first and second pressure control valves 171, 172 so as to position the first and second pressure control valves 171, 172 at the discharging position.

This allows the pump operation piston 110 to be held at the neutral position by the neutral spring mechanism 120 (in the present embodiment, the first and second slide springs 121, 122), and the pump movable swash plate 30 is positioned at the neutral position. Therefore, the speed of the rotational output of the stepless speed change structure 1A becomes zero speed.

When the speed change operating member is operated from the neutral position to the second operating direction (e.g., backward direction), the control device, while keeping the first pressure control valve 171 at the discharging position, applies the control current to the second pressure control valve 172 in accordance with the operating position of the speed change operating member so as to position the second pressure control valve 172 at the supplying position in accordance with the operating position of the speed change operating member.

With this, the pressure oil is supplied from the pressure oil source to the second slide oil chamber 132, and the pump operation piston 110 is pressed and moved in the second slide direction S2 while elastically deforming the neutral spring mechanism 120 (in the present embodiment, while compressing the first slide spring 121).

That is, as the speed change operating member is operated from the neutral position to the second operating direction (e.g., backward direction), the pump movable swash plate 30 is tilted from the neutral position to the second tilting direction, and the speed of the rotational output of the stepless speed change structure 1A is increased in the second direction (e.g. backward direction) from the zero speed to a second direction maximum speed Rmax.

Meanwhile, when the speed change operating member is operated from the neutral position to the first operating direction (e.g., forward direction), the control device, while keeping the second pressure control valve 172 positioned at the discharging position, applies the control current to the first pressure control valve 171 in accordance with the operating position of the speed change operating member to position the first pressure control valve 171 at the supplying position in accordance with the operating position of the speed change operating member.

With this, the pressure oil is supplied from the pressure oil source to the first slide oil chamber 131 and the smaller volume operating oil chamber 160, and the pump operation piston 110 receives a pressing force in the first slide direction, meanwhile the motor operation piston 140 receives a pressing force in the smaller volume direction VS.

As described above, the biasing forces of the neutral spring mechanism 120 (in the present embodiment, the second slide spring 132) and the larger volume operation spring 150 are so set that, after the pressure oil within the first slide oil chamber 131 causes the pump operation piston 110 to move in the first slide direction so that the neutral spring mechanism 120 (in the present embodiment, the second slide spring 132) is brought into the predetermined retained-elastic state, the pressure oil within the smaller volume operating oil chamber 160 causes the motor operation piston 140 to start moving in the smaller volume direction VS while compressing the larger volume operation spring 150.

Therefore, when the pressure oil is supplied from the pressure oil source to the first slide oil chamber 131 and the smaller volume operating oil chamber 160, only the pump operation piston 110 is first moved in the first slide direction S1 while elastically deforming the neutral spring mechanism 120 (in the present embodiment, compressing the second slide spring 122).

Here, in the present embodiment, the predetermined retained-elastic state of the neutral spring mechanism 120 (in the present embodiment, the second slide spring 132) is defined as a state that is realized when the pump operation piston 110 is moved in the first slide direction S1 up to the first slide direction movement end, which causes the pump volume adjusting member to position at the first operating direction movement end (the operating position causing the pump body 20 to have the maximum volume).

That is, when the speed change operating member is operated from the neutral position to the motor volume switching start position (the operating position that causes the pump volume adjusting member to position at the first operating direction movement end. In the present embodiment, the operating position that causes the pump movable swash plate 30 to position at the first tilting direction movement end); the pump volume adjusting member (the pump movable swash plate 30) is tilted from the neutral position to the first operating direction (first tilting direction) (in the present embodiment, up to the first tilting direction movement end) as the speed change operating member is operated toward the motor volume switching start position while causing the motor volume adjusting member (the motor movable swash plate 60) to hold at the maximum volume position. With this, the speed of the rotational output of the stepless speed change structure 1A is increased from the zero speed to a predetermined speed (first direction intermediate speed Fc) in the first direction (e.g., forward direction).

When the speed change operating member is operated from the motor volume switching start position further in the first operating direction, the oil pressures in the first slide oil chamber 131 and the smaller volume operating oil chamber 160 are further increased. Here, since the pump operation piston 110 has been moved to the first slide direction movement end, the neutral spring mechanism 120 (the second slide spring 122) remains in the predetermined retained-elastic state.

Accordingly, when the speed change operating member is operated in the first operating direction beyond the motor volume switching start position (in the present embodiment, the pump first direction maximum volume position); as the speed change operating member approaches a first operating direction operation end, the pressure oil of the smaller volume operating oil chamber 160 presses and moves the motor operation piston 140 in the smaller volume direction VS against the biasing force of the larger volume operation spring 150. Then, at the time point when the speed change operating member reaches the first operating direction operation end, the motor operation piston 140 is positioned at the minimum volume position at the time point so that the motor movable swash plate 60 is positioned at the minimum volume position. With this, the speed of the rotational output of the stepless speed change structure 1A becomes a first direction maximum speed Fmax.

Thus, in the stepless speed change structure 1A according to the present embodiment, without requiring the complicated mechanical link mechanism that is necessary in conventional stepless speed change structures; when the speed change operating member is operated between the second operating direction operation end and the motor volume switching start position, the pump movable swash plate 30, with the motor movable swash plate 60 held in the maximum volume position, is tilted to the tilting position that corresponds to the operating position of the speed change operating member, thereby making it possible to acquire the output having the desired speed, meanwhile when the speed change operating member is operated between the motor volume switching start position and the first operating direction operation end, the motor movable swash plate 60, with the pump movable swash plate 30 held at the first tilting direction movement end, is tilted to the tilting position that corresponds to the operating position of the speed change operating member, thereby making it possible to acquire the output having the desired high speed.

In the present embodiment, the timing at which the motor operation piston 140 starts moving in the smaller volume direction is set at the time point when the pump operation piston 110 is positioned at the first slide direction movement end, but the present invention is not limited to the above configuration.

For example, the biasing force of the neutral spring mechanism 120 (in the present embodiment, the second slide spring 122) and the biasing force of the larger volume operation spring 150 can also be so set that, at the time point when the pump operation piston 110 reaches an arbitrary position before the first slide direction movement end, the motor operation piston 140 starts moving in the smaller volume direction.

The above setting of the biasing force of the spring can be performed, for example, by replacing the corresponding larger volume operation spring 150 or by changing the thickness of a shim interposed between the proximal end portion of the larger volume operation spring 150 and the spring chamber 152.

Alternatively, a modified example shown in FIG. 6 can also set the biasing force of the corresponding larger volume operation spring 150 at a desired value. FIG. 6 is a partial cross-sectional view of a stepless speed change structure 1B according to a modified example of the present embodiment, and corresponds to part VI in FIG. 3. As shown in FIG. 6, the stepless speed change structure 1B has a biasing force adjusting mechanism 155 that adjusts the biasing force of the corresponding larger volume operation spring 150.

The biasing force adjusting mechanism 155 has a spring receptor 156 that is engageable with a proximal end side of the corresponding larger volume operation spring 150, the spring receptor 156 being configured to have a fixed position in an axial direction that is artificially adjustable from outside. The biasing force adjusting mechanism 155 is so configured as to be capable of setting, at the desired value, the biasing force of the corresponding larger volume operation spring 150 by means of the spring receptor 156. The reference numeral 157 in FIG. 6 is a lock nut for holding the above spring receptor 156 in the fixed position in the axial direction.

The present embodiment is so configured that the motor operation piston 140 starts moving in the smaller volume direction after the pump operation piston 110 reaches the first slide direction movement end. However, it is possible to operate the pump operation piston 110 (i.e., the pump movable swash plate 30) and the motor operation piston 140 (i.e., the motor movable swash plate 60) at different timings.

FIG. 7 shows a graph illustrating a relation among the operating position of the speed change operating member, the output speed of the stepless speed change structure 1A (vehicle traveling speed in a case where the stepless speed change structure 1A is used for the travel system transmission path of a work vehicle), the tilting position of the pump movable swash plate 30, and the tilting position of the motor movable swash plate 60, in a case where the pump operation piston 110 and the motor operation piston 140 are operated in accordance with a different operation pattern (first modified pattern).

The first modified pattern is so configured that, at the time point when the pump operation piston 110 reaches an arbitrary position before the first slide direction movement end, the motor operation piston 140 starts moving in the smaller volume direction.

In the first modified pattern, as shown in FIG. 7: the biasing forces of the neutral spring mechanism 120 and the larger volume operation spring 150 are so set that, when the speed change operating member is positioned between the second operating direction operation end and the motor volume switching start position; with the motor operation piston 140 held at the maximum volume position thereby to keep the motor movable swash plate 60 positioned at the maximum volume position, as the speed change operating member is operated in the first operating direction, the pump operation piston 110 is pressed and moved in the first slide direction S1 thereby to tilt the pump movable swash plate 30 in the first tilting direction, at the time point when the speed change operating member reaches the motor volume switching start position; with the motor operation piston 140 held at the maximum volume position, the pump operation piston 110 is positioned at the intermediate position before the first slide direction movement end thereby to position the pump movable swash plate 30 at a first tilting direction intermediate position before the first tilting direction movement end, when the speed change operating member is positioned between the motor volume switching start position and a first operating direction pump maximum volume position; as the speed change operating member is operated in the first operating direction, the pump operation piston 110 is pressed and moved from the intermediate position to the first slide direction movement end thereby to move the pump movable swash plate 30 from the first tilting direction intermediate position to the first tilting direction movement end, and the motor operation piston 140 is pressed and moved in the smaller volume direction from the maximum volume position to the intermediate volume position thereby to move the motor movable swash plate 60 from the maximum volume position in the smaller volume direction.

In the first modified pattern, the output of the stepless speed change structure 1A is speed-changed from the second direction maximum speed Rmax via the vehicle traveling speed zero to a first direction first intermediate speed Fc1, as the pump movable swash plate 30, with the motor movable swash plate 60 held in the maximum volume position, is moved in the first tilting direction from the second tilting direction movement end to the first tilting direction intermediate position.

Then, the output of the stepless speed change structure 1A is speed-changed from the first direction first intermediate speed Fc1 to a first direction second intermediate speed Fc2, as the pump movable swash plate 30 is moved from the first tilting direction intermediate position to the first tilting direction movement end and the motor movable swash plate 60 is moved from the maximum volume position to the intermediate volume position.

Then, the output of the stepless speed change structure 1A is speed-changed from the first direction second intermediate speed Fc2 to the first direction maximum speed Fmax, as the motor movable swash plate 60, with the pump movable swash plate 30 held at the first tilting direction movement end, is moved from the intermediate volume position to the minimum volume position.

In the first modified pattern as well, the tilting operations of the pump movable swash plate 30 and motor movable swash plate 60 are performed continuously without interruption, making it possible to effectively prevent or decrease any jerkiness of the output speed (traveling speed) during the switching transition period.

FIG. 8 shows a graph illustrating a relation among the operating position of the speed change operating member, the output speed of the stepless speed change structure 1A (vehicle traveling speed in a case where the stepless speed change structure 1A is used for the travel system transmission path of a work vehicle), and the tilting position of the pump movable swash plate 30, and the tilting position of the motor movable swash plate 60, in a case where the pump operation piston 110 and the motor operation piston 140 are operated in accordance with still another operation pattern (second modified pattern).

The second modified pattern is so configured that, at the time point when the pump operation piston 110 reaches an arbitrary position before the first slide direction movement end, the motor operation piston 140 starts moving in the smaller volume direction.

When the speed change operating member is positioned between the second operating direction operation end and the motor volume switching start position, the second modified example shown in FIG. 8 performs a speed change operation similar to that of the first modified example shown in FIG. 7.

That is, the biasing forces of the neutral spring mechanism 120 and the larger volume operation spring 150 are so set that, when the speed change operating member is operated between the second operating direction operation end and the motor volume switching start position; with the motor operation piston 140 held in the maximum volume position thereby to keep the motor movable swash plate 60 positioned in the maximum volume position, the pump operation piston 110 is pressed and moved in the first slide direction S1 thereby to tilt the pump movable swash plate 30 in the first tilting direction as the speed change operating member is operated in the first operating direction, and the pump operation piston 110 is positioned in the intermediate position before the first slide direction movement end thereby to have the pump movable swash plate 30 positioned at the first tilting direction intermediate position before the first tilting direction movement end at the time point when the speed change operating member reaches the motor volume switching start position.

Meanwhile, when the speed change operating member is positioned between the motor volume switching start position and the first operating direction operation end, the second modified example shown in FIG. 8 performs a speed change operation different from that of the first modified example shown in FIG. 7.

That is, in the second modified example, when the speed change operating member is positioned between the motor volume switching start position and the first operating direction operation end, as the speed change operating member is operated in the first operating direction, the pump movable swash plate 30 is tilted toward the first tilting direction movement end meanwhile the motor movable swash plate 60 is tilted from the maximum volume position toward the minimum volume position.

Then, at the time point when the speed change operating member is positioned at the first operating direction operation end, the pump movable swash plate 30 is positioned at the first tilting direction movement end and the motor movable swash plate 60 is positioned at the minimum volume position.

In the second modified example, the output of the stepless speed change structure 1A is speed-changed from the second direction maximum speed Rmax via the vehicle speed zero to the first direction first intermediate speed Fc1, as the pump movable swash plate 30, with the motor movable swash plate 60 held in the maximum volume position, is moved in the first tilting direction from the second tilting direction movement end to the first tilting direction intermediate position. Then, the output of the stepless speed change structure 1A is accelerated from the first direction first intermediate speed Fc1 to the first direction maximum speed Fmax as the pump movable swash plate 30 is moved from the first tilting direction intermediate position to the first tilting direction movement end and the motor movable swash plate 60 is moved from the maximum volume position to the minimum volume position.

In the second modified example as well, the tilting operations of the pump movable swash plate 30 and motor movable swash plate 60 are performed continuously without interruption, making it possible to effectively prevent or decrease any jerkiness of the output speed (traveling speed) during the switching transient period.

Here, the pump hydraulic servo mechanism 200P and the motor hydraulic servo mechanism 200M will be described below.

As shown in FIG. 3, the pump hydraulic servo mechanism 200P includes the pump servo piston 210P, first and second servo oil chambers 220P1, 220P2, and a pump servo switching valve 230P.

The pump servo piston 210P is movable bidirectionally in the first servo direction SV1 on one side in the axial direction and the second servo direction SV2 on the other side in the axial direction, and is engaged with the operation end portion 35 of the pump movable swash plate 30 such that the pump movable swash plate 30 is tilted in the first and second tilting directions respectively around the pump swing axis PA in accordance with the movements in the first and second servo directions SV1, SV2.

The first and second servo oil chambers 220P1, 220P2 are so configured that the pressure oil, which has been supplied into the first and second servo oil chambers 220P1, 220P2, presses and moves the pump servo piston 210P in the first and second servo directions SV1, SV2, respectively.

In the present embodiment, as shown in FIGS. 2 and 3, the housing body 75 is formed with a pump servo space, and the pump servo piston 210P, while defining the first and second servo oil chambers 220P1, 220P2, is housed in the pump servo space in a manner to be movable bidirectionally in the first and second servo directions SV1, SV2.

Relative to the pump servo piston 210P, the pump servo switching valve 230P takes a holding position, a first servo position, and a second servo position. The pump servo switching valve 230P is so configured as to guide the pressure oil from the pressure oil source to the first servo oil chamber 220P1 and discharge the pressure from of the second servo oil chamber 220P2 when positioned at the first servo position, as to discharge the pressure oil from the first servo oil chamber 220P1 and to guide the pressure oil from the pressure oil source to the second servo oil chamber 220P2 when positioned at the second servo position, and as to close the first and second servo oil chambers 220P1, 220P2 when positioned at the holding position.

The pump servo switching valve 230P is operatively connected to the pump operation piston 110 in a manner to take the first and second slide directions S1, S2, respectively, according to the movements of the pump operation piston 110 in the first and second slide directions S1, S2.

In the present embodiment, the pump servo piston 210P is formed with a central hole along the axial direction, and the pump servo switching valve 230P, in a state of being connected to the pump operation piston 110 via a pump connecting rod 250P inserted into an access opening formed in the pump servo piston 210P, is housed in the central hole in a manner to be axially bidirectionally movable. Here, without rattling, the pump servo switching valve 230P is linked to the pump operation piston 110 via the pump connecting rod 250P.

As shown in FIG. 3, the motor hydraulic servo mechanism 200M includes a motor servo piston 210M, a larger volume servo spring 240M, a smaller volume servo oil chamber 220M, and a motor servo switching valve 230M.

The motor servo piston 210M is movable bidirectionally in the smaller volume servo direction SVS on one side in the axial direction and in the larger volume servo direction SVL on the other side in the axial direction.

The motor servo piston 210M is engaged with the operation end portion 65 of the motor movable swash plate 60 such that, the motor servo piston 210M tilts the motor movable swash plate 60 in the smaller volume direction around the motor swing axis MA as being moved in the smaller volume servo direction SVS, and positions the motor movable swash plate 60 at the minimum volume position when positioned at the predetermined minimum volume servo position, meanwhile the motor servo piston 210M tilts the motor movable swash plate 60 in the larger volume direction around the motor swing axis MA as being moved in the larger volume servo direction SVL, and positions the motor movable swash plate 60 at the maximum volume position when positioned in the predetermined maximum volume servo position.

The larger volume servo spring 240M biases the motor servo piston 210M in the larger volume servo direction SVL toward the maximum volume servo position.

The smaller volume servo oil chamber 220M is so configured that the pressure oil, which has been supplied into the smaller volume servo oil chamber 220M, presses and moves the motor servo piston 210M in the smaller volume servo direction SVS against the biasing force of the larger volume servo spring 240M.

In the present embodiment, as shown in FIGS. 2 and 3, the housing body 75 is formed with the pump servo space, and the motor servo piston 210M, while defining the smaller volume servo oil chamber 220M and a spring chamber 245 placed axially opposite to the smaller volume servo oil chamber 220M, is housed in the motor servo space in a manner to be movable bidirectionally in the smaller volume servo direction SVS and the larger volume servo direction SVL. The larger volume servo spring 240M is housed in the spring chamber 245.

Relative to the motor servo piston 210M, the motor servo switching valve 230M takes a holding position, a smaller volume position, and a larger volume position. The motor servo switching valve 230M is so configured as to guide the pressure oil from the pressure oil source to the smaller volume servo oil chamber 220M and discharge the pressure oil from the spring chamber 245 when positioned at the smaller volume position, as to discharge the pressure oil from the smaller volume servo oil chamber 220M and to guide the pressure oil from the pressure oil source to the spring chamber 245 when positioned at the larger volume position, and as to close the smaller volume servo oil chamber 220M and the spring chamber 245 when positioned at the holding position.

The motor servo switching valve 230M is operatively connected to the motor operation piston 140 in such a manner as to take the larger volume position and the smaller volume position, respectively, according to the movement of the motor operation piston 140 in the larger volume direction VL and smaller volume direction VS.

In the present embodiment, the motor servo piston 210M is formed with a central hole along the axial direction, and the motor servo switching valve 230M, in a state of being connected to the motor operation piston 140 via a motor connecting rod 250M inserted into an access opening formed in the motor servo piston 210M, is housed in the central hole in a manner to be axially bidirectionally movable. Here, without rattling, the motor servo switching valve 230M is linked to the motor operation piston 140 via the motor connecting rod 250M.

In the present embodiment, the pressure oil for pressing and moving the pump operation piston 110 and the motor operation piston 140 is taken out of the charge line.

FIG. 9 shows a hydraulic circuit diagram of the stepless speed change structure 1A. As shown in FIG. 1, FIG. 3 and FIG. 9, the stepless speed change structure 1A has a pressure oil supply line 180 having a proximal end side fluidly connected to the charge line (the charge oil path 82), a first supply-discharge line 181 having a distal end side fluidly connected to the first slide oil chamber 131 and the smaller volume operating oil chamber 160, and a second supply-discharge line 182 having a distal end side fluidly connected to the second slide oil chamber 132.

The first pressure control valve 171 is so configured as to cause the first supply-discharge line 181 to be fluidly connected to the pressure oil supply line 180 when positioned at the supplying position, and as to cause the first supply-discharge line 181 to drain when positioned at the discharging position.

Further, the second pressure control valve 172 is so configured as to cause the second supply-discharge lines 182 to be fluidly connected to the pressure oil supply line 180 when positioned at the supplying position, and as to cause the second supply-discharge line 182 to drain when positioned in the discharging position.

Further, in the present embodiment, the pressure oil supplied to the pump hydraulic servo mechanism 200P and the motor hydraulic servo mechanism 200M is also taken out of the charge line (the charge oil path 82).

That is, the stepless speed change structure 1A has a pump servo line 185P that fluidly connects the pressure oil supply line 180 to an inlet port of the pump servo switching valve 230P, and a motor servo line 185M that fluidly connects the pressure oil supply line 180 to an inlet port of the motor servo switching valve 230M.

Second Embodiment

The following is a description of the stepless speed change structure according to another embodiment of the present invention, with reference to the accompanying drawings. FIG. 10 is a partial cross-sectional view of a stepless speed change structure 2A according to the present embodiment, showing a cross-sectional view that corresponds to part (a) in FIG. 3 in the first embodiment. In the figures, the same member as in the first embodiment is to be marked with the same reference numeral, and any description thereof is to be appropriately omitted.

The stepless speed change structure 2A according to the present embodiment is different from the stepless speed change structure 1A according to the first embodiment mainly in that the pump hydraulic servo mechanism 200P and the motor hydraulic servo mechanism 200M are deleted, and that the pump operation piston 110 and the motor operation piston 140 are changed to a pump operation piston 310 and a motor operation piston 320.

That is, as shown in FIG. 10, in the present embodiment, the pump operation piston 310 is mechanically connected to the operation end portion 35 of the pump movable swash plate 30 in such a manner as to tilt the pump movable swash plate 30 in the first and second tilting directions around the pump swing axis PA, respectively, in accordance with the movements of the pump operation piston 310 in the first and second slide directions S1, S2.

Further, the motor operation piston 320 is mechanically connected to the operation end portion 65 of the motor movable swash plate 60 in such a manner as to tilt the motor movable swash plate 60 in the smaller volume direction and larger volume direction around the motor swing axis MA, respectively, in accordance with the movements of the motor operation piston 320 in the smaller volume direction VS and the larger volume direction VL.

Compared to the stepless speed change structure 1A, the stepless speed change structure 2A according to the present embodiment has a neutral spring mechanism 330 in place of the neutral spring mechanism 120 (the first and second slide springs 121, 122).

The pump operation piston 310 is different from the pump operation piston 110 in that the pump operation piston 310 has a hollow portion along the first and second slide directions 51, S2.

The neutral spring mechanism 330 includes a support rod 340 that extends along the first and second slide directions S1, S2 and that is supported by the pump operation piston case 115 so that a distal side of the support rod 340 enters the hollow portion, a distal side spring receptor 350 and a proximal side spring receptor 360 that are supported on a distal side and a proximal side of the support rod 340, respectively, so as to be placed in the hollow portion and to be axially movable relative to the support rod 340, a distal side stopper 355 so provided on the support rod 340 as to define a distal side movement end of the tip side spring receptor 350 relative to the support rod 340, a proximal side stopper 365 so provided on the support rod 340 as to define a proximal side movement end of the proximal side spring receptor 360 relative to the support rod 340, and a single biasing spring 370 having a distal side engaged with the distal side spring receptor 350 and a proximal side engaged with the proximal side spring receptor 360.

In the present embodiment, when the oil pressure of the oil chamber, among the first and second slide oil chambers 131, 132, that is placed on the distal side of the support rod 340 (in the present embodiment, the first slide oil chamber 131) is increased, the pump operation piston 310 together with the distal side spring receptor 350 is pressed and moved in the direction (corresponding to the first slide direction S1 in the present embodiment) that expands the oil chamber placed on the distal side of the support rod 340 (the first slide oil chamber 131) and contracts the opposite side oil chamber (the second slide oil chamber 132).

At that time, the proximal side spring receptor 360 is stopped from moving to the proximal side of the support rod 340 by the proximal side stopper 365; therefore, as the pump operation piston 310 is pressed and moved to the direction (in the present embodiment, the first slide direction S1) that expands the oil chamber placed on the distal side of the support rod 340 and contracts the opposite side oil chamber, the retained elasticity amount (compression amount) of the single biasing spring 370 is increased.

Here, the biasing forces of the single biasing spring 370 and the larger volume operation spring 150 are so set that, after the movement of the pump operation piston 310 in the first slide direction S1 brings the single biasing spring 370 into a predetermined retained-elastic state, and then the pressure oil of the smaller volume operating oil chamber 160 causes the motor operation piston 320 to start moving in the smaller volume direction VS while elastically deforming the larger volume operation spring 150.

As shown in FIG. 10, in the present embodiment, the pump operation piston case 115 and the motor operation piston case 145 are integrally formed.

Further, the reference numeral 190 in FIG. 10 is a drive source, and the reference numeral 192 is a hydraulic pump that is driven by the drive source 190 and discharges the pressure oil to the charge line.

Third Embodiment

The following is a description of the stepless speed change structure according to another embodiment of the present invention, with reference to the accompanying drawings. FIG. 11 is a partial cross-sectional view of a stepless speed change structure 3A according to the present embodiment, showing a cross-sectional view that corresponds to FIG. 2 in the first embodiment. FIG. 12 shows a cross-sectional view along the Line XII-XII in FIG. 11. Further, FIG. 13 shows a cross-sectional view along the line XIII-XIII in FIG. 12. In the figures, the same member as in the first and second embodiments is to be marked with the same reference numerals, and any description thereof is to be appropriately omitted.

The stepless speed change structure 3A includes the HST 10, a speed change operating member 410, the pump hydraulic servo mechanism 200P, a pump operation connecting mechanism 430, and a motor operation connecting mechanism.

As shown in FIGS. 11 and 13, the speed change operating member 410 is operable bidirectionally around the axis between a first operating direction operation end D1max on one side around the axis and a second operating direction maximum operating position D2max on the other side around the axis, sandwiching a neutral position N.

In the present embodiment, the speed change operating member 410 includes an operating shaft 412 that is rotatable around an axis, and an operating arm 414 connected to the operating shaft 412 in such a manner that an external operation to the operating arm 414 can rotate the operating shaft 412 around the axis.

The pump operation connecting mechanism 430 has a pump spool 450 that is movable in the first slide direction S1 on one side and in the second slide direction S2 on the other side in the axial direction.

The motor operation connecting mechanism has a motor spool 480 that is placed coaxially in series on one side of the pump spool 450 in the axial direction and that is movable bidirectionally in the smaller volume direction VS on one side and the larger volume direction VL on the other side in the axial direction, a larger volume operation spring 490 that biases the motor spool 480 in the larger volume direction VL, and a motor spool maximum volume position setting member 495 that directly or indirectly sets the motor spool maximum volume position, which is defined by a movement end of the motor spool 480 in the larger volume direction VL. The motor operation connecting mechanism is so configured as to tilt the motor movable swash plate 60 in the smaller volume direction on one side and in the larger volume direction on the other side around the motor swing axis MA, respectively, in accordance with the movements of the motor spool 480 in the smaller volume direction VS and larger volume direction VL.

As shown in FIGS. 11 and 12, in the present embodiment, a spool case 500 having a spool housing space that houses therein the pump spool 450 and the motor spool 480 integrally is connected to the HST housing 70. The operating shaft 412, having an inner end portion extending into a space provided in a portion where the spool case 500 is connected with the HST housing 70 and having an outer end portion extending outward, is supported by the spool case 500.

In the present embodiment, the pump operation connecting mechanism 430 has the pump hydraulic servo mechanism 200P. The pump hydraulic servo mechanism 200P is so configured as to tilt the pump movable swash plate 30 in the first and second tilting directions in accordance with the operations of the speed change operating member 410 in the first and second operating directions D1, D2.

That is, in the present embodiment, the pump hydraulic servo mechanism 200P is operatively connected to the speed change operating member 410 so as to have the pump movable swash plate 30 positioned at the neutral position N in accordance with the operation of the speed change operating member 410 to the neutral position N, and so as to have the pump movable swash plate 30 tilted in the first and second tilting directions in accordance with the operations of the speed change operating member 410 to the first and second operating directions D1, D2.

In the present embodiment, as shown in FIGS. 11 to 13, the pump operation connecting mechanism 430 further includes an interlocking arm 432 connected to an inner end portion of the operating shaft 412, and a pump servo engaging pin 435 provided on a free end side of the interlocking arm 432 and engaged with the pump servo switching valve 230P via the access opening formed in the pump servo piston 210P.

The interlocking arm 432 and the pump servo engaging pin 435 are placed in the space provided in the portion where the spool case 500 is connected with the HST housing 70.

The pump servo engaging pin 435 is engaged with the pump servo switching valve 230P in such a manner as to have the pump servo switching valve 230P positioned at a first servo position when the speed change operating member 410 is operated in the first operating direction D1, and as to have the pump servo switching valve 230P positioned at a second servo position when the speed change operating member 410 is operated in the second operating direction D2.

The pump spool 450 is operatively connected to the speed change operating member 410 in such a manner as to take a pump spool neutral position in accordance with the operation of the speed change operating member 410 to the neutral position N, and as to move from the pump spool neutral position to the first slide direction movement end on one side in the axial direction and the second slide direction movement end on the other side in the axial direction, respectively, in accordance with the operations of the speed change operating member 410 from the neutral position N to the first and second operating direction operation ends D1max, D2max.

In detail, the pump operation connecting mechanism 430 further includes a pump spool engaging pin 440 that has a proximal end portion connected to the interlocking arm 432 and a distal end portion engaged with the pump spool 450.

The pump spool engaging pin 440 is engaged with the pump spool 450 in such a manner as to have the pump spool 450 positioned at the pump spool neutral position in accordance with the operation of the speed change operating member 410 to the neutral position N, as to move the pump spool 450 from the pump spool neutral position to the first slide direction movement end in accordance with the operation of the speed change operating member 410 from the neutral position N to the first operating direction operation end D1max, and as to move the pump spool 450 from the pump spool neutral position to the second slide direction movement end in accordance with the operation of the speed change operating member 410 from the neutral position N to the second operating direction maximum operating position D2max.

In the present embodiment, as shown in FIG. 12, the pump spool 450 has a first spool 451 that is pressed and moved in the first slide direction S1 via the pump engaging pin 440 when the speed change operating member 410 is operated from the neutral position N to first operating direction D1, and a second spool 452 that is separate from the first spool 451 and that is pressed and moved in the second slide direction S2 when the speed change operating member 410 is operated from the neutral position N to the second operating direction D2.

Further, the stepless speed change structure 3A according to the present embodiment has a neutral spring mechanism 460 that directly or indirectly holds the pump spool 450 at the pump spool neutral position when no external force is applied to the pump spool 450, and that generates a biasing force for directly or indirectly pressing the pump spool 450 toward the pump spool neutral position when the pump spool 450 is moved from the pump spool neutral position to the first and second slide directions 51, S2.

In the present embodiment, the neutral spring mechanism 460 has a support rod 462 that has a shaft portion 463 so supported by the spool case 500 as to extend along the slide direction in the slide range of the pump spool 450, a first slide spring 471 that biases the second spool 452 in the first slide direction S1, and a second slide spring 472 that biases the first spool 451 in the second slide direction S2.

The spool case 500 is formed with a through hole extending in the slide direction of the pump spool 450, and first and second lid members 511, 513 close the through hole's pump spool 450 side and the through hole's motor spool 480 side, respectively, thereby to form the spool housing space.

The support rod 462 has, in addition to the shaft portion 463, a middle engaging portion 465 that is provided in the middle between the distal side and proximal side of the shaft portion 463 and that is larger in diameter than the shaft portion 463, and a distal engaging portion 467 that is provided on the distal side of the support rod 462 and that is larger in diameter than the shaft portion 463.

Sandwiching the middle engaging portion 465, the first and second spools 451, 452 are externally supported on the shaft portion 463 on both sides in the axial direction.

Between the middle engaging portion 465 and the distal engaging portion 467, the first spool 451 is externally supported on the shaft portion 463 in a manner to be movable in an axial direction. Meanwhile, between the middle engaging portion 465 and the first lid member 511, the second spool 452 is externally supported on the shaft portion 463 in a manner to be movable in an axial direction.

Then, the second slide spring 472 is interposed between the distal engaging portion 467 and the first spool 451, thereby to bias the first spool 451 in the second slide direction S2 toward the middle engaging portion 465. Further, the first slide spring 471 is interposed between the first lid member 511 and the middle engaging portion 465, thereby to bias the second spool 452 in the first slide direction S1 toward the middle engaging portion 465.

With the above configuration, the pump spool 450 moves as follows in accordance with the operation of the speed change operating member 410.

When the speed change operating member 410 is operated from the neutral position N to the first operating direction D1; with the second spool 452 being pressed on the middle engaging portion 465 by means of the first slide spring 471, the first spool 451 is pressed and moved, via the pump operation connecting mechanism 430, in the first slide direction S1 against the biasing force of the second slide spring 472, in accordance with the operating amount of the speed change operating member 410.

With the speed change operating member 410 positioned in an area on the first operating direction side from the neutral position N, cancelling an operating force to the speed change operating member 410 or operating the speed change operating member 410 in the second operating direction D2 returns the first spool 451 to the second slide direction S2 by means of the biasing force of the second slide spring 472 by the amount that corresponds to the operation amount of the speed change operating member 410 in the second operating direction D2.

Meanwhile, when the speed change operating member 410 is operated from the neutral position N to the second operating direction D2; with the first spool 451 being pressed on the middle engaging portion 465 by means of the second slide spring 472, the second spool 452 is pressed and moved, via the pump operation connecting mechanism 430, in the second slide direction S2 against the biasing force of the first slide spring 471, in accordance with the operating amount of the speed change operating member 410.

With the speed change operating member 410 positioned in an area on the second operating direction D2 side from the neutral position N, cancelling the operating force to the speed change operating member 410 or operating the speed change operating member 410 in the first operating direction D1 returns, by means of the biasing force of the first slide spring 471, the second spool 452 in the first slide direction S1 by the amount that corresponds to the operation amount of the speed change operating member 410 in the first operating direction D1.

In the present embodiment, the neutral spring mechanism 460 is so configured as to directly bias the pump spool 450 to the pump spool neutral position. However, in place of this configuration, the neutral spring mechanism 460 can be modified to bias the speed change operating member 410 to the neutral position N thereby to indirectly bias the pump spool 450 to the pump spool neutral position.

In this case, the pump spool 450 is formed by a single member, and the pump engaging pin 440 is connected to the single pump spool 450 such that the single pump spool 450 moves in the first and second slide directions S1, S2 in accordance with the operations of the speed change operating member 410 in the first and second operating directions D1, D2, respectively.

The motor spool 480 is coaxially placed in series on one side of the pump spool 450 in the axial direction, and is movable bidirectionally in the smaller volume direction VS on one side and the larger volume direction VL on the other side in the axial direction.

As described above, in the present embodiment; in the spool housing space of the spool case 500, the motor spool 480 is coaxially positioned on one side of the pump spool 450 in the axial direction.

The larger volume operation spring 490 biases the motor spool 480 in the larger volume direction VL. In the present embodiment, the larger volume operation spring 490 is placed between the motor spool 480 and the second lid member 513.

The motor spool maximum volume position setting member 495 directly or indirectly sets the spool maximum volume position, which is defined by the moving end of the motor spool 480 in the larger volume direction. In the present embodiment, the support rod 462 of the neutral spring mechanism 460 is commonly used as the motor spool maximum volume position setting member 495.

That is, the motor spool 480, which is biased in the larger volume direction VL by means of the larger volume operation spring 490, engages with the tip engaging portion 467 of the support rod 462, thereby to define the motor spool maximum volume position.

In the present embodiment, the motor operation connecting mechanism further has the motor hydraulic servo mechanism 200M. The motor hydraulic servo mechanism 200M is so configured as to tilt the motor movable swash plate 60 in the smaller volume direction on one side and the larger volume direction on the other side around the motor swing axis MA in accordance with the movements of the motor spool 480 in the smaller volume direction VS and the larger volume direction VL, respectively.

In details, in the present embodiment, the motor servo switching valve 230M is so connected to the motor spool 480 as to take the smaller volume position and the larger volume position, respectively, in accordance with the movements of the motor spool 480 in the larger volume direction VL and the smaller volume direction VS.

As shown in FIG. 12, between the pump spool 450 in a state of being positioned at the pump spool neutral position and the motor spool 480 in a state of being positioned at the motor spool maximum volume position, there is provided a flexible portion 520 that allows the pump spool 450 to move by a predetermined distance in the first slide direction S1 with the motor spool 480 held at the motor spool maximum volume position.

In the present embodiment, the axial length of the flexible portion 520 is so set that, when the pump spool 450, via the pump hydraulic servo mechanism 200P, is positioned to a slide position that have the pump movable swash plate 30 positioned at the first tilting direction movement end, the pump spool 450 is positioned at an end of the flexible portion 520 (i.e., so that the pump spool 450 contacts the motor spool 480).

Specifically, the pump operation connecting mechanism 430 is so configured that, at the time point when the speed change operating member 410 is operated from the neutral position N to the first operating direction D1 thereby to reach the motor volume switching start position (in the present embodiment, the pump first direction maximum volume position P1max) before reaching the first operating direction operation end D1max, the pump spool 450 moves to the slide position where the pump spool 450, via the pump hydraulic servo mechanism 200P, has the pump movable swash plate 30 positioned at the first tilting direction movement end.

And, the axial length of flexible portion 520 is so set that, at this time point, the pump spool 450 contacts the motor spool 480.

Accordingly, during the pump spool 450 is moved to the extent that the pump spool 450 is not in contact with the motor spool 480, with the motor spool 480 held at the motor spool maximum volume position by the larger volume operation spring 490, only the pump spool 450 moves. Then, when the pump spool 450 moves in the first slide direction S1 beyond the flexible portion 520, the pump spool 450 presses the motor spool 480 in the smaller volume direction VS.

FIG. 14 shows cross-sectional views of the pump spool 450, the motor spool 480, the pump hydraulic servo mechanism 200P, and the motor hydraulic servo mechanism 200M. The part (a) of FIG. 14 shows a state where the pump spool 450 is moved in the first slide direction S1 from the pump spool neutral position to the slid position where the pump spool 450 contacts the motor spool 480. In mirror image relation to the part (a) of FIG. 14, the part (b) of FIG. 14 shows a state where, passing the flexible portion 520, the pump spool 450 together with the motor spool 480 has been moved in the first slide direction S1 (for the motor spool 480, in the smaller volume direction VS).

That is, the speed change operating member 410 is operable between the first operating direction operation end D1max and the second operating direction operation end D2max; and when the speed change operating member 410 is positioned at the neutral position N between the first operating direction operation end D1max and the second operating direction operation end D2max, the pump hydraulic servo mechanism 200P neutrally operates via the pump operation connecting mechanism 430, thereby to have the pump movable swash plate 30 positioned at the neutral position (see FIG. 12).

First, the case in which the speed change operating member 410 is operated from the neutral position N to the second operating direction D2 will be described. When the speed change operating member 410 is operated from the neutral position N to the second operating direction D2, the pump servo switching valve 230P, via the pump operation connecting mechanism 430, moves in the direction that corresponds to the operating direction of the speed change operating member 410.

With this, relative to the pump servo piston 210P, the pump servo switching valve 230P, from being in a relative neutral state, moves in the direction that corresponds to the second operating direction D2, thereby creating a state of pressure oil supply to the second servo oil chamber 220P2, pressing and moving the pump servo piston 210P in the second servo direction SV2, and tilting the pump movable swash plate 30 in the second tilting direction.

At the time point when the pump movable swash plate 30 is moved to the tilting position that corresponds to the operating position of the speed change operating member 410, the pump servo switching valve 230P and the pump servo piston 210P return to the relative neutral state so that the first and second servo oil chambers 220P1, 220P2 are closed. Accordingly, the pump servo piston 210P holds the pump movable swash plate 30 at a tilting position where the pump movable swash plate 30 is positioned at that point.

The above operation tilts the pump movable swash plate 30 in the second tilting direction in accordance with the operation of the speed change operating member 410; and when the speed change operating member 410 is positioned at the second operating direction operation end D2max, the pump movable swash plate 30 is positioned at the second tilting direction movement end.

When the speed change operating member 410 is operated in the second operating direction D2, the pump spool 450 does not contact the motor spool 480, and the motor spool 480 remains held at the motor spool maximum volume position by the larger volume operation spring 490. Thus, the motor movable swash plate 60 is held at the maximum volume position.

Then, the case in which the speed change operating member 410 is operated from the neutral position N to the first operating direction D1 will be described.

First, description will be made of the case where the speed change operating member 410 is operated to the pump first direction maximum volume position P1max. When the speed change operating member 410 is operated in the first operating direction D1, the pump servo switching valve 230P, via the pump operation connecting mechanism 430, moves in the direction that corresponds to the operating direction of the speed change operating member 410.

This causes the pump servo switching valve 230P, from being in the relative neutral state relative to the pump servo piston 210P, to move in the direction that corresponds to the first operating direction D1, thereby creating a state of pressure oil supply to the first servo oil chamber 220P1. Accordingly, the pump servo piston 210P is pressed and moved in the first servo direction SV1 so that the pump movable swash plate 30 is tilted in the first tilting direction.

Then, at the time point when the pump servo piston 210P has moved the pump movable swash plate 30 to the tilting position that corresponds to the operating position of the speed change operating member 410, the pump servo switching valve 230P and the pump servo piston 210P return to the relative neutral state so that the first and second servo oil chambers 220P1, 220P2 are closed. Accordingly, the pump servo piston 210P holds the pump movable swash plate 30 at a tilting position where the pump movable swash plate 30 is positioned at that point.

The above operation tilts the pump movable swash plate 30 in the first tilting direction in accordance with the operation of the speed change operating member 410 in the first operating direction D1, and at the time point when the speed change operating member 410 is positioned at the pump first direction maximum volume position P1max, the pump movable swash plate 30 is positioned at the first tilting direction movement end.

Meanwhile, at the time point when the speed change operating member 410 is positioned at the pump first direction maximum volume position P1max, the pump spool 450 is positioned at the end of the flexible portion 520. Therefore, at this time point, the motor spool 480 does not receive any pressing force from the pump spool 450, and remains held at the motor spool maximum volume position by the larger volume operation spring 490. Thus, the motor movable swash plate 60 is held at the maximum volume position.

Then, when the speed change operating member 410, beyond the pump first direction maximum volume position P1max, is operated between the pump first direction maximum volume position P1max and the first operating direction operation end D1max, the pump movable swash plate 30 is kept at the first tilting direction movement end, regardless of the operating position of the speed change operating member 410.

In details, when the speed change operating member 410 is positioned at the pump first direction maximum volume position P1max, the pump servo piston 210P is positioned at the first slide direction movement end that have the pump movable swash plate 30 positioned at the first tilting direction movement end.

When the speed change operating member 410 is operated further in the first operating direction D1 from the state where the speed change operating member 410 is positioned at the pump first direction maximum volume position P1max; relative to the pump servo piston 210P in a state of being positioned at the first slide movement end, the pump servo switching valve 230P, from being at the relative neutral state, moves in the direction that corresponds to the first operating direction D1, thereby creating the state of pressure oil supply to the first servo oil chamber 220P1.

Here, since the pump servo piston 210P is positioned at the first slide direction movement end, the pump servo piston 210P is not moved any further in the first servo direction SV1; as a result, when the speed change operating member 410 is operated between the pump first direction maximum volume position P1max and the first operating direction operation end D1max, the pump movable swash plate 30 is held at the first tilting direction movement end (the part (b) in FIG. 14).

Meanwhile, when the speed change operating member 410 is operated between the pump first direction maximum volume position P1max and the first operating direction operation end D1max, the pump spool 450 is positioned in the area beyond the flexible portion 520 by the pump operation connecting mechanism 430, and the pump spool 450 together with the motor spool 480 is positioned at the position that corresponds to the operating position of the speed change operating member 410.

That is, when the speed change operating member 410 is operated between the pump first direction maximum volume position P1max and the first operating direction operation end D1max, the pump spool 450, in accordance with the operating position of the speed change operating member 410, moves together with the motor spool 480 that is biased in the larger volume direction VL by the larger volume operation spring 490.

Such movement of the motor servo switching valve 230M causes a relative displacement of the motor servo switching valve 230M with respect to the motor servo piston 210M, moving the motor servo piston 210M in the corresponding direction so that the motor movable swash plate 60 is mover to the tilting position that corresponds to the operating position of the speed change operating member 410.

At the time point when the motor servo piston 210M is positioned at the tilting position that corresponds to the operating position of the speed change operating member 410, the relative displacement of the motor servo switching valve 230M with respect to the motor servo piston 210M is eliminated, and the motor servo piston 210M holds the motor movable swash plate 60 at the tilting position at which it is positioned at that time point.

With the above operation, as the speed change operating member 410 is operated from the pump first direction maximum volume position P1max to the first operating direction operation end D1max, the motor movable swash plate 60 is moved from the maximum volume position to the minimum volume position.

Fourth Embodiment

The following is a description of the stepless speed change structure according to still another embodiment of the present invention, with reference to the accompanying drawings. FIG. 15 is a partial cross-sectional view of a stepless speed change structure 4A according to the present embodiment, showing a cross-sectional view that corresponds to FIG. 3 in the first embodiment. FIG. 16 shows a hydraulic circuit diagram of the stepless speed change structure 4A. In the figures, the same members as in the former embodiments are denoted with the same reference numerals, and any description thereof is to be appropriately omitted.

In the stepless speed change structures 1A to 3A according to the first to third embodiments, the motor movable swash plate 60 is moved when the pump movable swash plate 30 is moved to the first tilting direction movement end or to near the first tilting direction movement end, meanwhile the motor movable swash plate 60 is fixed at the initial position (larger volume position) even when the pump movable swash plate 30 is moved to the second tilting direction movement end or to near the second tilting direction movement end.

Meanwhile, the stepless speed change structure 4A according to the present embodiment is so configured that, in addition to when the pump movable swash plate 30 is moved to the first tilting direction movement end or to near the first tilting direction movement end, the motor movable swash plate 60 is moved when the pump movable swash plate 30 is moved to the second tilting direction movement end or to near the second tilting direction movement end.

Specifically, as shown in FIGS. 15 and 16, the stepless speed change structure 4A includes the HST 10, the speed change operating member (not shown in FIGS. 15 and 16), the pump operation piston 110, the neutral spring mechanism 120, the first and second slide oil chambers 131, 132, the motor operation piston 140, the larger volume operation spring 150, the smaller volume operating oil chamber 160, the first pressure control valve 171, the second pressure control valve 172, a flow path switching valve 175, and the control device (also not shown in FIGS. 15 and 16).

The first pressure control valve 171 is so configured as to take a supplying position that supplies, to the first slide oil chamber 131, the pressure oil from the pressure oil source, and a discharging position that discharges the pressure oil from the first slide oil chamber 131.

The second pressure control valve 172 is so configured as to take a supplying position that supplies, to the second slide oil chamber 132, the pressure oil from the pressure oil source, and a discharging position that discharges the pressure oil from the second slide oil chamber 132.

The stepless speed change structure 4A according to the present embodiment includes the pressure oil supply line 180, a first supply-discharge line 181' fluidly connected to the first slide oil chamber 131, and the second supply-discharge line 182.

The first pressure control valve 171 is so configured, when positioned at the supplying position, as to fluidly connect the first supply-discharge line 181' to the pressure oil supply line 180, and when positioned at the discharging position, as to cause the first supply-discharge line 181' to drain.

The second pressure control valve 172 is so configured, when positioned at the supplying position, as to fluidly connect the second supply-discharge line 182 to the pressure oil supply line 180, and when positioned at the discharging position, as to cause the second supply-discharge line 182 to drain.

The flow path switching valve 175 is so configured as to take a first position that introduces the pressure oil of the first slide oil chamber 131 into the smaller volume operating oil chamber 160, and a second position that introduces the pressure oil of the second slide oil chamber 132 into the smaller volume operating oil chamber 160.

The stepless speed change structure 4A according to the present embodiment includes a first slide line 281 directly or indirectly fluidly connected to the first slide oil chamber 131, a second slide line 282 directly or indirectly fluidly connected to the second slide oil chamber 132, and a smaller volume line 285 fluidly connected to the smaller volume operating oil chamber 160.

The flow path switching valve 175 is so configured, when positioned at the first position, as to fluidly connect the smaller volume line 285 to the first slide line 281, and when positioned at the second position, as to fluidly connect the smaller volume line 285 to the second slide line 282.

In the present embodiment, the first pressure control valve 171, the second pressure control valve 172 and the flow path switching valve 175 are operatively controlled by the control device as follows.

When recognizing, based on a signal from the operation position sensor, that the speed change operating member is positioned in the operation area that causes the output rotational direction of the stepless speed change structure 4A to be in the forward rotational direction (i.e., forward operation area), the control device has the flow path switching valve 175 positioned at the first position. This creates a state where the smaller volume operating oil chamber 160 is pressure-controlled in conjunction with the first slide oil chamber 131.

Meanwhile, when recognizing, based on the signal from the operation position sensor, that the speed change operating member is positioned in the operation area that causes the output rotational direction of the stepless speed change structure 4A to be in the reverse rotational direction (i.e., reverse operation area), the control device has the flow path switching valve 175 positioned at the second position. This creates a state where the smaller volume operating oil chamber 160 is pressure-controlled in conjunction with the second slide oil chamber 132.

In the present embodiment, as shown in FIG. 15, the flow path switching valve 175 includes a pilot-type switching valve 176 that can selectively take the first position and the second position, and a solenoid switching valve 177 that is position-controlled by the control device.

The pilot-type switching valve 176 is biased by a spring or the like toward one of the first and second positions (the first position in FIG. 15), and is so configured as to take one of the first and second positions in the initial state where no pilot pressure is received, and as to take the other of the first and second positions (the second position in FIG. 15) when the pilot pressure is received.

The solenoid switching valve 177 can selectively take an operating position that supplies the pilot pressure to the pilot-type switching valve 176, and an initial position that shuts off the pilot pressure supply to the pilot-type switching valve 176.

In the present embodiment, the solenoid switch valve 177 is so configured, when positioned at the operating position, as to supply the pressure oil from the pressure oil supply line 180 to a pilot line 176a of the pilot-type switching valve 176, and when positioned at the initial position, as to shut off the supply of the pressure oil to the pilot line 176a.

With the above configuration; when the speed change operating member is positioned in the forward operating area, the control device does not send a control signal to the solenoid switching valve 177, and the solenoid switching valve 177 remains at the initial position. Accordingly, the pilot-type switching valve 176 is placed at the first position so that the smaller volume operating oil chamber 160 is in a state of being pressure-controlled in conjunction with the first slide oil chamber 131.

Meanwhile, when the speed change operating member is positioned in the reverse operation area, the control device sends the control signal to the solenoid switching valve 177, and the solenoid switching valve 177 is positioned at the operating position. Accordingly, the pilot-type switching valve 176 receives the pilot pressure and is positioned at the second position so that the smaller volume operating oil chamber 160 is in a state of being pressure controlled in conjunction with the second slide oil chamber 132.

In place of the flow path switching valve 175, a flow path switching valve 175' formed with a single solenoid switching valve can also be used. FIG. 17 shows a partial cross-sectional view of a stepless speed change structure 4B, which has the flow path switching valve 175' formed with the single solenoid switching valve, according to a first modified example of the present embodiment.

In the stepless speed change structure 4B, the flow path switching valve 175' is so configured as to selectively take, in accordance with the operating position of the speed change operating member, a first position that fluidly connects the smaller volume line 285 to the first slide line 281, and a second position that fluidly connects the smaller volume line 285 to the second slide line 282.

In this case, when the speed change operating member is positioned in the forward operating area, the control device has the flow path switching valve 175' positioned at the first position, thereby to create a state where the smaller volume operating oil chamber 160 is pressure-controlled in conjunction with the first slide oil chamber 131.

When the speed change operating member is positioned in the reverse operating area, the control device has the flow path switching valve 175' positioned at the second position, thereby to create a state where the smaller volume operating oil chamber 160 is pressure-controlled in conjunction with the second slide oil chamber 132.

In the present embodiment, the pump movable swash plate 30 and the motor movable swash plate 60 are moved as the following manner.

FIG. 18 shows a graph illustrating a relation, in the stepless speed change structure 4A, among the operating position of the speed change operating member, the tilting position of the pump movable swash plate 30, the tilting position of the motor movable swash plate 60, and the output speed of the stepless speed change structure 4A.

As shown in FIG. 18, the stepless speed change structure 4A according to the present embodiment is so configured so that, when the speed change operating member is operated in a middle area between a second operating direction motor volume switching start position before the second operating direction operation end and a first operating direction motor volume switching start position before the first operating direction operation end, the first and second operating direction motor volume switching start positions sandwiching the neutral position, the pump operation piston 110, with the motor operation piston 140 hold at the maximum volume position thereby to hold the motor movable swash plate 60 at the maximum volume position, is positioned at the position that corresponds to the operating position of the speed change operating member so that the pump movable swash plate 30 is positioned at the corresponding tilting position.

In detail, as the speed change operating member is operated in the first operating direction within the middle area, the pump operation piston 110 is pressed and moved in the first slide direction S1 thereby to move the pump movable swash plate 30 in the first tilting direction.

In the present embodiment, the biasing forces of the neutral spring mechanism 120 and the larger volume operation spring 150 are so set that, at the time point when the speed change operating member is operated in the first operating direction to reach a first operating direction motor volume switching start position, the pump operation piston 110, with the motor operation piston 140 kept positioned at the maximum volume position, is positioned at the first slide direction movement end so that the pump movable swash plate 30 is moved to the first tilting direction movement end.

At this time point, the output of the stepless speed change structure 4A has the speed (first direction intermediate speed Fc) that is acquired when the pump movable swash plate 30 is positioned at the first tilting direction movement end with motor movable swash plate 60 positioned at the maximum volume position (see FIG. 18).

When the speed change operating member is operated in the area between the first operating direction motor volume switching start position and the first operating direction operation end; the motor operation piston 140, with the pump operation piston 110 held at the first slide direction movement end thereby to keep the pump movable swash plate 30 positioned at the first operating direction movement end, is pressed and moved in the smaller volume direction VS in accordance with the operation of the speed change operating member in the first operating direction so that the motor movable swash plate 60 moved accordingly in the smaller volume direction.

In the present embodiment, the biasing force of the larger volume operation spring 150 is so set that, at the time point when the speed change operating member is positioned at the first operating direction operation end, the motor operation piston 140 is positioned at the minimum volume position thereby to move the motor movable swash plate 60 to the minimum volume position.

At this time point, the output of the stepless speed change structure 4A has the speed (first direction maximum speed Fmax) that is acquired when the pump movable swash plate 30 is positioned at the first tilting direction movement end and the motor movable swash plate 60 is positioned at the minimum volume position (see FIG. 18).

When the speed change operating member is operated in the second operating direction D2 within the middle area, the pump operation piston 110 is pressed and moved in the second slide direction S2 thereby to move the pump movable swash plate 30 in the second tilting direction.

At the time point when the speed change operating member reaches a second operating direction motor volume switching start position, the pump operation piston 110 is positioned at the second slide direction movement end thereby to move the pump movable swash plate 30 to the second tilting direction movement end.

At this time point, the output of the stepless speed change structure 4A has the speed (second direction intermediate speed Rc) that is acquired when the pump movable swash plate 30 is positioned at the second tilting direction movement end with the motor movable swash plate 60 positioned at the maximum volume position (see FIG. 18).

When the speed change operating member is operated in the area between the second operating direction motor volume switching start position and the second operating direction operation end; the motor operation piston 140, with the pump operation piston 110 held at the second slide direction movement end thereby to keep the pump movable swash plate 30 positioned at the second operating direction movement end, is pressed and moved in the smaller volume direction VS in accordance with the operation of the speed change operating member in the second operating direction D2 so that the motor movable swash plate 60 is moved accordingly in the smaller volume direction.

Then, at the time point when the speed change operating member is positioned at the second operating direction operation end, the motor operation piston 140 is positioned at the minimum volume position thereby to move the motor movable swash plate 60 to the minimum volume position.

At this time point, the output of the stepless speed change structure 4A has the speed (second direction maximum speed Rmax) that is acquired when the pump movable swash plate 30 is positioned at the second tilting direction movement end and the motor movable swash plate 60 is positioned at the minimum volume position (see FIG. 18).

The pump operation piston 110 (i.e., the pump movable swash plate 30) and the motor operation piston 140 (i.e., the motor movable swash plate 60) can be moved (tilted) at different timings.

FIG. 19 shows a graph illustrating a relation among the operating position of the speed change operating member, the tilting position of the pump movable swash plate 30, the tilting position of the motor movable swash plate 60, and the output speed of the stepless speed change structure 4A, in a case where the pump operation piston 110 and the motor operation piston 140 are operated in accordance with a different operation pattern (first modified pattern).

As shown in FIG. 19, the first modified pattern is common to the operation pattern in the present embodiment in that, when the speed change operating member is operated in the middle area, the pump operation piston 110, with motor operation piston 140 positioned at the maximum volume position thereby to keep the motor movable swash plate 60 held at the maximum volume position, has the pump movable swash plate 30 positioned at the tilting position that corresponds to the operating position of the speed change operating member. On the other hand, the first modified pattern is different from the operation pattern in the present embodiment in the tilting position of the pump movable swash plate 30 that is acquired when the speed change operating member is positioned at the first operating direction motor volume switching start position and the second operating direction motor volume switching start position.

In detail, in the first modified pattern, the biasing forces of the neutral spring mechanism 120 and the larger volume operation spring 150 are so set that, at the time point when the speed change operating member is operated in the first operating direction to reach the first operating direction motor volume switching start position, the pump operation piston 110, with the motor operation piston 140 kept positioned at the maximum volume position, is positioned at a first slide direction intermediate position before the first slide direction movement end thereby to have the pump movable swash plate 30 positioned at the first tilting direction intermediate position.

That is, in the first modified pattern, at the time point when the speed change operating member is operated at the first operating direction motor volume switching start position, the output of the stepless speed change structure 4A has the speed (first direction first intermediate speed Fc1) that is acquired when the pump movable swash plate 30 is positioned at the first tilting direction intermediate position and the motor movable swash plate 60 is positioned at the maximum volume position.

When the speed change operating member is operated in the area between the first operating direction motor volume switching start position and the first operating direction pump maximum volume position before the first operating direction operation end; as the speed change operating member is operated in the first operating direction, the pump operation piston 110 is pressed and moved in the first slide direction S1 thereby to move the pump movable swash plate 30 toward the first tilting direction movement end, and the motor operation piston 140 is pressed and moved in the smaller volume direction thereby to move the motor movable swash plate 60 in the smaller volume direction.

At the time point when the speed change operating member is positioned at the first operating direction pump maximum volume position, the pump operation piston 110 is positioned at the first slide direction movement end thereby to have the pump movable swash plate 30 positioned at the first tilting direction movement end.

The biasing force of the larger volume operation spring 150 is so set that, at this time point, the motor operation piston 140 is positioned at the intermediate volume position between the maximum volume position and the minimum volume position thereby to have the motor movable swash plate 60 positioned at the intermediate volume position between the maximum volume position and the minimum volume position.

At this time point, the output of the stepless speed change structure 4A has the speed (first direction second intermediate speed Fc2) that is acquired when the pump movable swash plate 30 is positioned at the first tilting direction movement end and the motor movable swash plate 60 is positioned at the intermediate volume position (see FIG. 19).

When the speed change operating member is operated in the area between the first operating direction pump maximum volume position and the first operating direction operation end; the motor operation piston 140, with the pump operation piston 110 held at the first slide direction movement end thereby to keep the pump movable swash plate 30 positioned at the first operating direction movement end, is pressed and moved in the smaller volume direction in accordance with the operation of the speed change operating member in the first operating direction thereby to accordingly move the motor movable swash plate 60 in the smaller volume direction.

At the time point when the speed change operating member is positioned at the first operating direction operation end, the motor operation piston 140 is positioned at the minimum volume position thereby to move the motor movable swash plate 60 to the minimum volume position.

At this time point, the output of the stepless speed change structure 4A has the speed (first direction maximum speed Fmax) that is acquired when the pump movable swash plate 30 is positioned at the first tilting direction movement end and the motor movable swash plate 60 is positioned at the minimum volume position (see FIG. 19).

Meanwhile, when the speed change operating member is operated in the second operating direction within the middle area, the pump operation piston 110 is pressed and moved in the second slide direction S1 thereby to move the pump movable swash plate 30 in the second tilting direction.

At the time point when the speed change operating member reaches the second operating direction motor volume switching start position, the pump operation piston 110 is positioned at the second slide direction intermediate position before the second slide direction movement end thereby to have the pump movable swash plate 30 positioned at the second tilting direction intermediate position.

At this time point, the output of the stepless speed change structure 4A has the speed (second direction first intermediate speed Rc1) that is acquired when the pump movable swash plate 30 is set in the second tilting direction intermediate position and the motor movable swash plate 60 is set in the maximum volume position (see FIG. 19).

When the speed change operating member is operated in the area between the second operating direction motor volume switching start position and a second operating direction pump maximum volume operating position before the second operating direction operation end, as the speed change operating member is operated in the second operating direction, the pump operation piston 110 is pressed and moved in the second slide direction S2 thereby to move the pump movable swash plate 30 toward the second tilting direction movement end and the motor operation piston 140 is pressed and moved in the smaller volume direction thereby to move the motor movable swash plate 60 in the smaller volume direction.

At the time point when the speed change operating member is positioned at the second operating direction pump maximum volume operating position, the pump operation piston 110 is positioned at the second slide direction movement end thereby to have the pump movable swash plate 30 positioned at the second tilting direction movement end.

In this case, the motor operation piston 140 is positioned at the intermediate volume position between the maximum volume position and the minimum volume position, thereby to have the motor movable swash plate 60 positioned at the intermediate volume position between the maximum volume position and the minimum volume position.

At this time point, the output of the stepless speed change structure 4A has the speed (second direction second intermediate speed Rc2) that is acquired when the pump movable swash plate 30 is positioned at the second tilting direction movement end and the motor movable swash plate 60 is positioned at the intermediate volume position (see FIG. 19).

When the speed change operating member is operated in the area between the second operating direction pump maximum volume operating position and the second operating direction operation end; the motor operation piston 140, with the pump operation piston 110 held at the second slide direction movement end thereby to keep the pump movable swash plate 30 positioned at the second operating direction movement end, is pressed and moved in the smaller volume direction in accordance with the operation of the speed change operating member in the second operating direction D2 thereby to accordingly move the motor movable swash plate 60 in the smaller volume direction.

At the time point when the speed change operating member is positioned at the second operating direction operation end, the motor operation piston 140 is positioned at the minimum volume position thereby to move the motor movable swash plate 60 to the minimum volume position.

At this time point, the output of the stepless speed change structure 4A has the speed (second direction maximum speed Rmax) that is acquired when the pump movable swash plate 30 is positioned at the second tilting direction movement end and the motor movable swash plate 60 is positioned at the minimum volume position.

FIG. 20 shows a graph illustrating a relation among the operating position of the speed change operating member, the tilting position of the pump movable swash plate 30, the tilting position of the motor movable swash plate 60, and the output speed of the stepless speed change structure 4A, in a case where the pump operation piston 110 and the motor operation piston 140 are operated in another different operation pattern (second modified pattern).

As shown in FIG. 20, the second modified pattern is common to the first modified pattern in that, when the speed change operating member is operated in the middle area, the pump operation piston 110, with the motor operation piston 140 holding the motor movable swash plate 60 at the maximum volume position, moves the pump movable swash plate 30 in accordance with the operating position of the speed change operating member, and also in that, at the time point when the speed change operating member reaches the first and second operating direction motor volume switching start positions, the pump movable swash plate 30 is respectively positioned at the first and second tilting direction intermediate positions. On the other hand, the second modified pattern is different from the first modified pattern at the timing when the pump movable swash plate 30 is positioned at the first and second tilting direction movement ends.

In detail, in the second modified pattern, the biasing forces of the neutral spring mechanism 120 and the larger volume operation spring 150 are so set that, when the speed change operating member is operated in the area between the first operating direction motor volume switching start position and the first operating direction operation end, as the speed change operating member is operated in the first operating direction, the pump operation piston 110 is pressed and moved in the first slide direction S1 thereby to move the pump movable swash plate 30 toward the first tilting direction movement end, and the motor operation piston 140 is pressed and moved in the smaller volume direction thereby to move the motor movable swash plate 60 toward the minimum volume position, and at the time point when the speed change operating member is positioned at the first operating direction operation end, the pump operation piston 110 is positioned at the first slide direction movement end thereby to have the pump movable swash plate 30 positioned at the first tilting direction movement end, and the motor operation piston 140 is positioned at the minimum volume position thereby to have the motor movable swash plate 60 positioned at the minimum volume position.

The output of the stepless speed change structure 4A controlled in accordance with the in the second modified pattern has the speed (first direction intermediate speed Fc) that is acquired in accordance with the operation of the speed change operating member at the first operating direction motor volume switching start position so that the pump movable swash plate 30 is positioned at the first tilting direction intermediate position and the motor movable swash plate 60 is positioned at the maximum volume position, the speed that is increased in accordance with the operation of the speed change operating member from the first operating direction motor volume switching start position in the first operating direction so that the movable swash plate 30 is moved in the first tilting direction and the motor movable swash plate 60 is moved in the smaller volume direction, and the speed (first direction maximum speed Fmax) that is acquired in accordance with the operation of the speed change operating member at the first operating direction operation end so that the pump movable swash plate 30 is positioned at the first tilting direction end and the motor movable swash plate 60 is positioned at the minimum volume position (see FIG. 20).

Meanwhile, when the speed change operating member is operated in the area between the second operating direction motor volume switching start position and the second operating direction operation end; as the speed change operating member is operated in the second operating direction, the pump operation piston 110 is pressed and moved in the second slide direction S2 thereby to move the pump movable swash plate 30 toward the second tilting direction movement end, and the motor operation piston 140 is pressed and moved in the smaller volume direction thereby to move the motor movable swash plate 60 toward the minimum volume position.

At the time point when the speed change operating member is operated at the second operating direction pump maximum volume operating position, the pump operation piston 110 is positioned at the second slide direction movement end thereby to have the pump movable swash plate 30 positioned at the second tilting direction movement end, and the motor operation piston 140 is positioned at the minimum volume position thereby to have the motor movable swash plate 60 positioned at the minimum volume position.

At this time point, the output of the stepless speed change structure 4A has the speed (second direction maximum speed Rmax) that is acquired when the pump movable swash plate 30 is positioned at the second tilting direction movement end and the motor movable swash plate 60 is positioned at the minimum volume position (see FIG. 20).

The stepless speed change structure 4A according to the present embodiment can also include the biasing force adjusting mechanism 155. FIG. 21 shows a partial cross-sectional view of a stepless speed change structure 4C, which includes the biasing force adjusting mechanism 155, according to a second modified example of the present embodiment.

Providing the biasing force adjusting mechanism 155 makes it easy to adjust the timing at which the pump movable swash plate 30 starts moving (tilting) and the timing at which the motor movable swash plate 60 starts moving (tilting).

Fifth Embodiment

The following is a description of the stepless speed change structure according to still another embodiment of the present invention, with reference to the accompanying drawings. FIG. 22 shows a partial cross-sectional view of a stepless speed change structure 5A according to the present embodiment, which corresponds to FIG. 15 in the fourth embodiment. In the figures, the same members as in the former embodiments are to be denoted with the same reference numerals, and any description thereof is to be appropriately omitted.

The stepless speed change structure 5A according to the present embodiment is different from the stepless speed change structure 4A according to the fourth embodiment mainly in that, the pump hydraulic servo mechanism 200P and the motor hydraulic servo mechanism 200M are deleted, and that the pump operation piston 110 and the motor operation piston 140 are changed to the pump operation piston 310 and the motor operation piston 320.

As in the second embodiment, the pump operation piston 310 and the motor operation piston 320 are mechanically connected to the operation end portion 35 of the pump movable swash plate 30 and the operation end portion 65 of the motor movable swash plate 60, respectively.

Further, in comparison with the stepless speed change structure 4A, the stepless speed change structure 5A according to the present embodiment has the neutral spring mechanism 330 in place of the neutral spring mechanism 120 (the first and second slide springs 121, 122).

The stepless speed change structure 5A can also include the biasing force adjusting mechanism 155. FIG. 23 shows a partial cross-sectional view of a stepless speed change structure 5B according to a modified example of the present embodiment, which includes the biasing force adjusting mechanism 155.

Sixth Embodiment

The following is a description of the stepless speed change structure according to still another embodiment of the present invention, with reference to the accompanying drawings. FIG. 24 shows a transmission schematic diagram of a work vehicle 100 to which a stepless speed change structure 6A according to the present embodiment is applied. Further, FIGS. 25 and 26 show, respectively, a partial cross-sectional view and a hydraulic circuit diagram of the stepless speed change structure 6A. In the figures, the same members as in the former embodiments are to be denoted with the same reference numerals, and any description thereof is to be appropriately omitted.

As shown in FIG. 24, the stepless speed change structure 6A is interposed in the travel system transmission path from the drive source 190 to a drive wheel 690 in the work vehicle 100. The reference numerals 660 and 665 in FIG. 24 are a forward/reverse switching mechanism and a sub-speed change mechanism, respectively, which are inserted in the above travel system transmission path. Also, the reference numeral 600 is a PTO (power take off) shaft, and the reference numerals 610 and 620 are a PTO clutch mechanism and a PTO speed change mechanism, respectively, which are inserted in the PTO system transmission path from the drive source 190 to the PTO shaft 600.

The stepless speed change structure 6A according to the present embodiment includes the HST 10, a planetary gear mechanism 300, the speed change operating member, the pump operation piston 110, the second slide direction spring 122, the first slide oil chamber 131, the larger volume operation spring 150, the smaller volume operating oil chamber 160, the first pressure control valve 171, and the control device that controls the operation of the first pressure control valve 171.

The planetary gear mechanism 300 includes a sun gear 302, a planetary gear 304 that meshes with the sun gear 302, an internal gear 306 that meshes with the planetary gear 304, and a carrier 308 that supports the planetary gear 304 in a rotatable manner around an axis and that rotates around an axis of the sun gear 302 in conjunction with a revolution of the planetary gear 304 around the sun gear 302, wherein the sun gear 302, the carrier 308 and the internal gear 306 form three planetary elements.

The planetary gear mechanism 300 is configured so that a first element out of the three planetary elements receives a reference rotational power operatively transmitted from the drive source 190, a second element received an HST output operatively transmitted from the motor shaft 45, and a third element outputs a combined rotational power combining the reference rotational power and the HST output.

As shown in FIG. 24, in the present embodiment, the internal gear 306 acts as the first element, the sun gear 302 acts as the second element, and the carrier 308 acts as the third acting.

FIG. 27 shows a relation, in the stepless speed change structure 6A, among the operating position of the speed change operating member, the tilting position of the pump movable swash plate 30, the tilting position of the motor movable swash plate 60, and the output speed of the stepless speed change structure 6A (that is, the rotational speed of the combined rotational power output from the third element of the planetary gear mechanism 300).

In the present embodiment, the gear ratio of the planetary gear mechanism 300 is so set that, when the pump movable swash plate 30 is positioned at the second tilting direction movement end (e.g., reverse direction movement end) so that the HST output to be input into the second element has the second operating direction highest speed (e.g., the reverse direction highest speed), the combined rotational power output from the third element (i.e., output of the stepless speed change structure 6A) has zero speed, and that as the pump movable swash plate 30 is operated from the second tilting direction movement end via the neutral position to the first tilting direction movement end (e.g., the forward direction movement end), the rotational speed of the combined rotational power (i.e., output of the stepless speed change structure 6A) is increased in one direction.

The first pressure control valve 171 supplies and discharges the pressure oil to and from the first slide oil chamber 131 and the smaller volume operating oil chamber 160 integrally.

As shown in FIGS. 25 and 26, the stepless speed change structure 6A according to the present embodiment has the pressure oil supply line 180 fluidly connected to the pressure oil source, and the first supply-discharge line 181 fluidly connected to the first slide oil chamber 131 and the smaller volume operating oil chamber 160.

In this case, the first pressure control valve 171 is so configured, in accordance with a control signal from the control device, as to selectively take a supplying position to cause the first supply-discharge line 181 to be fluidly connected to the pressure oil supply line 180, and a discharging position to cause the first supply-discharge line 181 to drain.

As shown in FIGS. 25 and 26, the stepless speed change structure 6A according to the present embodiment further includes the pump hydraulic servo mechanism 200P that moves the pump movable swash plate 30 in accordance with the movement of the pump operation piston 110, and the motor hydraulic servo mechanism 200M that moves the motor movable swash plate 60 in accordance with the movement of the motor operation piston 140. Further, as shown in FIG. 25, the stepless speed change structure 6A includes the biasing force adjusting mechanism 155.

As shown in FIG. 27, in the present embodiment, the biasing forces of the second slide spring 122 and larger volume operation spring 150 are so set that, after the pump operation piston 110 is positioned at the first slide direction movement end thereby to have the pump movable swash plate 30 positioned at the first tilting direction movement end, the motor operation piston 140 then starts sliding in the smaller volume direction VS thereby to move the motor movable swash plate 60 in the smaller volume direction.

The stepless speed change structure 6A having the above configuration operates as follows. As shown in FIG. 27 and described above, when the speed change operating member is positioned at the second operating direction operation end so that the pump operation piston 110 is positioned at the second slide direction movement end thereby to have the pump movable swash plate 30 positioned at the second tilting direction movement end, the combined rotational power output from the planetary gear mechanism 300 (the output of the stepless speed change structure 6A) has zero speed.

When the speed change operating member is operated in the area, sandwiching the neutral position (a position to make the HST 10's output zero speed), between the second operating direction operation end and the motor volume switching start position before the first operating direction operation end, the pump operation piston 110, with the motor operation piston 140 held at the maximum volume position thereby to hold the motor movable swash plate 60 at the maximum volume position, is pressed and moved in the first slide direction 51 from the second slide direction movement end to the first slide direction movement end in accordance with the operation of the speed change operating member in the first operating direction from the second operating direction operation end to the motor volume switching start position thereby to accordingly move the pump movable swash plate 30 from the second tilting direction movement end to the first tilting direction movement end.

In accordance with the change of the rotational speed of the output of the HST 10 caused by the movement of the pump movable swash plate 30 from the second tilting direction movement end to the first tilting direction movement end with the motor movable swash plate 60 held at the maximum volume position, the combined rotational power of the planetary gear mechanism 300 (the output of the stepless speed change structure 6A) is accelerated from the zero speed to the intermediate speed Fc (see FIG. 27).

When the speed change operating member is operated between the motor volume switching start position and the first operating direction operation end; the motor operation piston 140, with the pump operation piston 110 held at the first slide direction movement end thereby to keep the pump movable swash plate 30 positioned at the first operating direction movement end, is pressed and moved in the smaller volume direction VS from the maximum volume position to the minimum volume position in accordance with the operation of the speed change operating member in the first operating direction from the motor volume switching start position to the first operating direction operation end thereby to accordingly move the motor movable swash plate 60 from the maximum volume position to the minimum volume position.

In accordance with the change of the rotational speed of the output of the HST 10 caused by the movement of the motor movable swash plate 60 from the maximum volume position to the minimum volume position with the pump movable swash plate 30 held at the first tilting direction movement end, the combined rotational power of the planetary gear mechanism 300 (the output of the stepless speed change structure 6A) is accelerated from the intermediate speed Fc to the maximum speed Fmax (see FIG. 27).

In the present embodiment as well, the pump operation piston 110 (i.e., the pump movable swash plate 30) and the motor operation piston 140 (i.e., the motor movable swash plate 60) can be moved at different operation timings.

FIG. 28 shows a graph illustrating a relation among the operating position of the speed change operating member, the tilting position of the pump movable swash plate 30, the tilting position of the motor movable swash plate 60, and the output speed of the stepless speed change structure 6A, in a case where the pump operation piston 110 and the motor operation piston 140 are operated in accordance with a different operation pattern (first modified pattern).

As shown in FIG. 28, the first modified pattern is common to the operation pattern in the present embodiment in that, when the speed change operating member is operated in the area between the second operating direction operation end and the motor volume switching start position, the pump operation piston 110, with the motor operation piston 140 positioned at the maximum volume position thereby to keep the motor movable swash plate 60 held at the maximum volume position, has the pump movable swash plate 30 positioned at the tilting position that corresponds to the operating position of the speed change operating member. However, the first modified pattern is different from the operation pattern in the present embodiment in the tilting position of the pump movable swash plate 30 at the time when the speed change operating member is positioned at the motor volume switching start position.

That is, in the first modified example, the biasing forces of the second slide spring 122 and larger volume operation spring 150 are so set that, when the speed change operating member is operated in the first operating direction from the second operating direction operation end to the motor volume switching start position; with the motor operation piston 140 held at the maximum volume position, the pump operation piston 110 is pressed and moved in the first slide direction S1 from the second slide direction movement end to the intermediate position, when the speed change operating member is operated in the first operating direction from the motor volume switching start position to the first operating direction pump maximum volume position; the pump operation piston 110 is pressed and moved from the intermediate position to the first slide direction movement end, and the motor operation piston 140 is pressed and moved from the maximum volume position to the intermediate volume position, and when the speed change operating member is operated in the first operating direction from the first operating direction pump maximum volume position to the first operating direction operation end; with the pump operation piston 110 held at the first slide direction movement end, the motor operation piston 140 is pressed and moved from the intermediate volume position to the minimum volume position.

In the first modified pattern, in accordance with the change of the rotational speed of the output of the HST 10 caused by the movement of the pump movable swash plate 30 from the second tilting direction movement end to the first tilting direction movement end so that the pump movable swash plate 30 is moved from the second tilting direction movement end to the first tilting direction movement end in a state where the motor operation piston 140 is held at the maximum volume position thereby to keep the motor movable swash plate 60 held at the maximum volume position, the combined rotational power of the planetary gear mechanism 300 (the output of the stepless speed change structure 6A) is accelerated from zero speed to the first direction first intermediate speed Fc1 (see FIG. 28).

Then, in accordance with the change of the rotational speed of the output of the HST 10 caused by the movement of the pump operation piston 110 from the intermediate position to the first slide direction movement end thereby to move the pump movable swash plate 30 from the first tilting direction intermediate position to the first tilting direction movement end, and the movement of the motor operation piston 140 from the maximum volume position to the intermediate volume position thereby to move the motor movable swash plate 60 from the maximum volume position to the intermediate volume position, the combined rotational power of the planetary gear mechanism 300 (the output of the stepless speed change structure 6A) is accelerated from the first intermediate speed Fc1 to the second intermediate speed Fc2 (see FIG. 28).

Then, in accordance with the change of the rotational speed of the output of the HST 10 caused by the movement of the motor operation piston 140 from the intermediate volume position to the minimum volume position thereby to move the motor movable swash plate 60 from the intermediate volume position to the minimum volume position in a state where the pump operation piston 110 is held at the first slide direction movement end thereby to hold the pump movable swash plate 30 at the first tilting direction movement end, the combined rotational power of the planetary gear mechanism 300 (the output of the stepless speed change structure 6A) is accelerated from the second intermediate speed Fc2 to the maximum speed Fmax (see FIG. 28).

FIG. 29 shows a graph illustrating a relation among the operating position of the speed change operating member, the tilting position of the pump movable swash plate 30, the tilting position of the motor movable swash plate 60, and the output speed of the stepless speed change structure 6A, in a case where the pump operation piston 110 and the motor operation piston 140 are operated in accordance with another different operation pattern (second modified pattern).

The second modified pattern is common to the first modified pattern in that, when the speed change operating member is operated in the area between the second operating direction operation end and the motor volume switching start position, the pump operation piston 110, with the motor operation piston 140 positioned at the maximum volume position thereby to keep the motor movable swash plate 60 held at the maximum volume position, has the pump movable swash plate 30 positioned at the tilting position that corresponds to the operating position of the speed change operating member, and also in that, at the time point when the speed change operating member reaches the motor volume switching start position, the pump movable swash plate 30 is positioned at the first tilting direction intermediate position. However, the second modified pattern is different from the first modified pattern at the timing when the pump movable swash plate 30 is positioned at the first tilting direction movement end.

That is, in the second modified example, the biasing forces of the second slide spring 122 and larger volume operation spring 150 are so set that, when the speed change operating member is operated in the first operating direction from the second operating direction operation end to the motor volume switching start position; with the motor operation piston 140 held at the maximum volume position, the pump operation piston 110 is pressed and moved in the first slide direction S1 from the second slide direction movement end to the intermediate position, and when the speed change operating member is operated in the first operating direction from the motor volume switching start position to the first operating direction operation end; the pump operation piston 110 is pressed and moved from the intermediate position to the first slide direction movement end, and the motor operation piston 140 is pressed and moved from the maximum volume position to the minimum volume position.

In the second modified example, in accordance with the change of the rotational speed of the output of the HST 10 caused by the movement of the pump movable swash plate 30 in the first slide direction S1 from the second tilting direction movement end to the intermediate position so that the pump movable swash plate 30 is moved from the second tilting direction movement end to the first tilting direction intermediate position in a state where the motor operation piston 140 is held at the maximum volume position thereby to keep the motor movable swash plate 60 held at the maximum volume position, the combined rotational power of the planetary gear mechanism 300 (the output of the stepless speed change structure 6A) is accelerated from zero speed to the intermediate speed Fc (see FIG. 29).

Then, in accordance with the change of the rotational speed of the output of the HST 10 caused by the movement of the pump operation piston 110 from the intermediate position to the first slide direction movement end thereby to move the pump movable swash plate 30 from the first tilting direction intermediate position to the first tilting direction movement end, and the movement of the motor operation piston 140 from the maximum volume position to the minimum volume position thereby to move the motor movable swash plate 60 from the maximum volume position to the minimum volume position, the combined rotational power of the planetary gear mechanism 300 (the output of the stepless speed change structure 6A) is accelerated from the intermediate speed Fc1 to the maximum speed Fmax (see FIG. 29).

Seventh Embodiment

The following is a description of the stepless speed change structure according to still another embodiment of the present invention, with reference to the accompanying drawings. FIG. 30 is a partial cross-sectional view of a stepless speed change structure 7A according to the present embodiment, showing a cross-sectional view that corresponds to FIG. 25 in the sixth embodiment. In the figure, the same members as in the former embodiments are to be denoted with the same reference numerals, and any description thereof is to be appropriately omitted.

The stepless speed change structure 7A according to the present embodiment is different from the stepless speed change structure 6A according to the sixth embodiment mainly in that, the pump hydraulic servo mechanism 200P and the motor hydraulic servo mechanism 200M are deleted, and that the pump operation piston 110 and the motor operation piston 140 are changed to the pump operation piston 310 and the motor operation piston 320.

As in the second and fifth embodiments, the pump operation piston 310 and the motor operation piston 320 are mechanically connected to the operation end portion 35 of the pump movable swash plate 30 and the operation end portion 65 of the motor movable swash plate 60, respectively.

Further, in comparison with the stepless speed change structure 4A, the stepless speed change structure 7A according to the present embodiment has the neutral spring mechanism 330 in place of the neutral spring mechanism 120 (the first and second slide springs 121, 122).

1A-7A stepless speed change structure
10 hydrostatic transmission (HST)
30 pump movable swash plate (pump volume adjusting member)
60 motor movable swash plate (pump volume adjusting member)
82 charge oil path (charge line)
110,310 pump operation piston
120,330 neutral spring mechanism
121,122 first and second slide springs
131,132 first and second slide oil chambers
140,320 motor operation piston
150 larger volume operation spring
160 smaller volume operating oil chamber
171,172 first and second pressure control valves
180 pressure oil supply line
181,182 first and second supply-discharge lines
200P pump hydraulic servo mechanism
220P1,220P2 first and second servo oil chambers
230P pump servo switching valve
200M motor hydraulic servo mechanism
210M motor servo piston
220M smaller volume servo oil chamber
230M motor servo switching valve
240M larger volume servo spring
410 speed change operating member
430 pump operation connecting mechanism
450 pump spool
460 neutral spring mechanism
480 motor spool
490 larger volume operation spring
495 motor spool maximum volume position setting member
520 flexible portion
S1 first slide direction
S2 second slide direction
SV1 first servo direction
SV2 second servo direction
VS smaller volume direction
VL larger volume direction
SVS smaller volume servo direction
SVL larger volume servo direction
PA pump swing axis
MA motor swing axis

What is claimed is:

1. A stepless speed change structure including a hydrostatic transmission and a speed change operating member, wherein the hydrostatic transmission includes a variable displacement hydraulic pump so configured that a volume of a pump body changes in accordance with an operation of a pump volume adjusting member, and a variable displacement hydraulic motor so configured that a volume of a motor body changes in accordance with an operation of a motor volume adjusting member, and wherein the speed change operating member is configured to change a speed change state of the hydrostatic transmission, the stepless speed change structure comprising:

a pump operation piston that is movable bidirectionally in first and second slide directions on one side and the other side in an axial direction, and that is directly or indirectly engaged with an operation end portion of the pump volume adjusting member such that movements of the pump operation piston in the first and second slide directions cause the pump volume adjusting member to be operated in first and second operating directions, respectively;

a neutral spring mechanism that holds the pump operation piston at a neutral position when no external force is added to the pump operation piston and generates a biasing force toward the neutral position when the pump operation piston is moved in the first and second slide directions from the neutral position;

first and second slide oil chambers that are so configured that pressure oil, which has been supplied thereinto, presses and moves the pump operation piston in the first and second slide directions, respectively, against the biasing force of the neutral spring mechanism;

a motor operation piston that is movable bidirectionally in a smaller volume direction on one side and a larger volume direction on the other side in an axial direction, and that is directly or indirectly engaged with an operation end portion of the motor volume adjusting member such that movements of the motor operation piston in the smaller volume direction and the larger volume direction cause the motor volume adjusting member to be operated in a smaller volume direction and a larger volume direction, respectively;

a larger volume operation spring that biases the motor operation piston in the larger volume direction;

a smaller volume operating oil chamber that is so configured that pressure oil, which has been supplied thereinto, presses and moves the motor operation piston in the smaller volume direction against the biasing force of the larger volume operation spring;

a first pressure control valve that commonly switches supplying and discharging of pressure oil to and from the first slide oil chamber and the smaller volume operating oil chamber in accordance with the operation of the speed change operating member; and a second pressure control valve that switches supplying and discharging of pressure oil to and from the second slide oil chamber in accordance with the operation of the speed change operating member;

wherein biasing forces of the neutral spring mechanism and the larger volume operation spring are so set that, after pressure oil within the first slide oil chamber causes the pump operation piston to move in the first slide direction so that the neutral spring mechanism is brought into a predetermined retained-elastic state, pressure oil within the smaller volume operating oil chamber causes the motor operation piston to start moving in the smaller volume direction while compressing the larger volume operation spring.

2. The stepless speed change structure according to claim 1, wherein the neutral spring mechanism is brought into the predetermined retained-elastic state at the time when the pump operation piston has the pump volume adjusting member positioned at a first operating direction movement end.

3. The stepless speed change structure according to claim 1, wherein the neutral spring mechanism is brought into the predetermined retained-elastic state at the time when the pump operation piston has the pump volume adjusting member positioned at a predetermined position before a first operating direction movement end.

4. The stepless speed change structure according to claim 3, wherein the biasing forces of the neutral spring mechanism and the larger volume operation spring are so set that the motor operation piston causes the motor volume adjusting member to be positioned at a smaller volume direction movement end at the time when the pump operation piston causes the pump volume adjusting member to be positioned at the first operating direction movement end.

5. The stepless speed change structure according to claim 3, wherein the biasing forces of the neutral spring mechanism and the larger volume operation spring are so set that the motor operation piston causes the motor volume adjusting member to be positioned at a predetermined position before a smaller volume direction movement end at the time when the pump operation piston causes the pump volume adjusting member to be positioned at the first operating direction movement end.

6. The stepless speed change structure according to claim 1, further comprising:

a first supply-discharge line fluidly connected to the first slide oil chamber and the smaller volume operating oil chamber; and a second supply-discharge line fluidly connected to the second slide oil chamber, wherein the first pressure control valve is capable of taking a supplying position that fluidly connect the first supply-discharge line to a charge line for replenishing operation oil to the hydrostatic transmission, and a discharging position that has the first supply-discharge line drained, and wherein the second pressure control valve is capable of taking a supplying position that fluidly connects the second supply-discharge line to the charge line, and a discharging position that has the second first supply-discharge line drained.

7. The stepless speed change structure according to claim 1, further comprising:

a pump hydraulic servo mechanism that hydraulically operates the pump volume adjusting member in accordance with the movement of the pump operation piston, and a motor hydraulic servo mechanism that hydraulically operates the motor volume adjusting member in accordance with the movement of the motor operation piston.

8. The stepless speed change structure according to claim 7, wherein:

the motor hydraulic servo mechanism includes a motor servo piston, a larger volume servo spring, a spring chamber housing the larger volume servo spring, a smaller volume servo oil chamber and a motor servo switching valve, the motor servo piston is moved bidirectionally in a smaller volume servo direction on one side and in a larger volume servo direction on the other side in an axial direction in accordance with a switching movement of the motor servo switching valve, and is engaged with the end portion of the motor volume adjusting member such that, the motor servo piston operates the motor volume adjusting member in the smaller volume direction as being moved in the smaller volume servo direction, and has the motor volume adjusting member positioned at the minimum volume position when positioned at a minimum volume servo position, meanwhile the motor servo piston operates the motor volume adjusting member in the larger volume direction as being moved in the larger volume servo direction, and has the motor volume adjusting member at the maximum volume position when positioned at a maximum volume servo position, the larger volume servo spring biases the motor servo piston in the larger volume servo direction, the smaller volume servo oil chamber is so configured that pressure oil, which has been supplied into the smaller volume servo oil chamber, presses and moves the motor servo piston in the smaller volume servo direction against the biasing force of the larger volume servo spring, the motor servo switching valve is operatively connected to the motor operation piston in such a manner as to take a larger volume position and a smaller volume position, respectively, in accordance with the movement of the motor operation piston in the larger volume direction and smaller volume direction, and the smaller volume servo direction in which the larger volume servo spring biases the motor servo piston is identical to the larger volume direction in which the larger volume operation spring biases the motor operation piston.

9. The stepless speed change structure according to claim 1, wherein:

the pump operation piston is mechanically connected to the operation end portion of the pump movable swash plate in such a manner as to operates the pump volume adjusting member in the first and second operating directions, respectively, in accordance with the movements of the pump operation piston in the first and second slide directions, and the motor operation piston is mechanically connected to the operation end portion of the motor volume adjusting member in such a manner as to operate the motor volume adjusting member in the smaller volume direction and larger volume direction, respectively, in accordance with the movements of the motor operation piston in the smaller volume direction and the larger volume direction.

10. The stepless speed change structure according to claim 1, further comprising a biasing force adjusting mechanism capable of adjusting the biasing force of the larger volume operation spring.

11. The stepless speed change structure according to claim 10, further comprising that defines a housing space for the motor operation piston, wherein the motor operation piston is housed in the housing space in an axially bidirectionally movable manner while dividing the housing space into the smaller volume operating oil chamber and a spring chamber on the opposite side of the smaller volume operating oil chamber, the spring chamber housing the larger volume operation spring, wherein the biasing force adjusting mechanism has a spring receptor that is engaged with a proximal end side of the larger volume operation spring, which is opposite side of a distal end side with which the motor operation piston is engaged, and wherein the spring receptor is supported by the motor operation piston case in a fixed position adjustable manner.

* * * * *